United States Patent
Nakabayashi

(10) Patent No.: US 7,030,058 B1
(45) Date of Patent: Apr. 18, 2006

(54) MODIFIED PHOTOCATALYST SOL

(75) Inventor: Akira Nakabayashi, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/806,275

(22) PCT Filed: Nov. 22, 1999

(86) PCT No.: PCT/JP99/06522

§ 371 (c)(1),
(2), (4) Date: Mar. 27, 2001

(87) PCT Pub. No.: WO00/30747

PCT Pub. Date: Jun. 2, 2000

(30) Foreign Application Priority Data

| Nov. 20, 1998 | (JP) | ................................. | 10/330941 |
| Nov. 25, 1998 | (JP) | ................................. | 10/334519 |
| Dec. 21, 1998 | (JP) | ................................. | 10/363376 |
| Apr. 5, 1999 | (JP) | ................................. | 11/097471 |
| Jul. 27, 1999 | (JP) | ................................. | 11/212050 |

(51) Int. Cl.
*B01J 31/00* (2006.01)

(52) U.S. Cl. ...................... 502/401; 502/407; 502/439; 502/522

(58) Field of Classification Search ............... 502/401, 502/407, 439, 522
See application file for complete search history.

(56) References Cited

U.S. PATENT DOCUMENTS

| 5,283,307 A |   | 2/1994 | Larson |         |
| 5,547,823 A | * | 8/1996 | Murasawa et al. | ........... 430/531 |
| 5,595,813 A |   | 1/1997 | Ogawa et al. |         |
| 6,407,033 B1 | * | 6/2002 | Kimura et al. | .............. 502/350 |

FOREIGN PATENT DOCUMENTS

| JP | 60118236 |   | 6/1985 |
| JP | 2-180964 |   | 7/1990 |
| JP | 7-149520 | A | 6/1995 |
| JP | 08-103488 |   | 4/1996 |
| JP | 9-25123 | A | 1/1997 |
| JP | 9-100437 |   | 4/1997 |
| JP | 9-208899 |   | 8/1997 |
| JP | 09-227831 |   | 9/1997 |
| JP | 9-314052 |   | 12/1997 |
| JP | 10-183061 |   | 7/1998 |
| JP | 10-183062 | A | 7/1998 |
| JP | 10-287846 |   | 10/1998 |
| JP | 10-337478 | A | 12/1998 |
| JP | 2000-17230 |   | 1/2000 |
| JP | 2000 53421 |   | 2/2000 |
| WO | WO 96/29375 |   | 9/1996 |
| WO | WO 97/45502 | A | 12/1997 |

\* cited by examiner

*Primary Examiner*—Robert D. Harlan
(74) *Attorney, Agent, or Firm*—Dickstein, Shapiro, Morin & Oshinsky, LLP.

(57) ABSTRACT

Disclosed is a modified photocatalyst sol comprising a liquid medium having dispersed therein particles of a modified photocatalyst, wherein the modified photocatalyst particles are prepared by subjecting particles of a photocatalyst to a modification treatment with at least one modifier compound selected from the group consisting of different compounds each of which independently comprises at least one structural unit selected from the group consisting of a monooxydiorganosilane unit, a dioxyorganosilane unit and a difluoromethylene unit, and wherein the modified photocatalyst particles have a specific volume mean particle diameter. Also disclosed is a modified photocatalyst composition comprising the modified photocatalyst sol and a functional substance. Also disclosed are a film formed using the above-mentioned modified photocatalyst sol or modified photocatalyst composition, a functional composite comprising the film and a substrate covered with the film, and a shaped article produced by shaping the above-mentioned modified photocatalyst composition.

160 Claims, 3 Drawing Sheets

MODIFIED PHOTOCATALYST SOL

BACKGROUND OF THE INVENTION

1. Field of the Invention

The present invention relates to a modified photocatalyst sol. More particularly, the present invention is concerned with a modified photocatalyst sol comprising a liquid medium having dispersed therein particles of a modified photocatalyst, wherein the modified photocatalyst particles are prepared by subjecting particles of a photocatalyst to a modification treatment with at least one modifier compound selected from the group consisting of different compounds each independently comprising at least one structural unit selected from the group consisting of a monooxydiorganosilane unit, a dioxyorganosilane unit and a difluoromethylene unit, and wherein the modified photocatalyst particles have a specific volume mean particle diameter. The present invention is also concerned with a modified photocatalyst composition comprising the above-mentioned modified photocatalyst sol and a functional substance. When a film containing a modified photocatalyst is formed on the surface of a substrate by using the above-mentioned modified photocatalyst sol or modified photocatalyst composition, not only can the modified photocatalyst be strongly immobilized on the surface of the substrate under moderate conditions without suffering a lowering of the activity of the modified photocatalyst, but also any of the film formed and the substrate covered with the film are not deteriorated by the action of the modified photocatalyst. Further, the above-mentioned film exhibits excellent properties with respect to transparency, durability, staining resistance, hardness and the like. Therefore, the above-mentioned modified photocatalyst sol and modified photocatalyst composition are extremely useful for, e.g., preventing dirt from adhering to the surfaces of various substrates, and preventing fogging from occurring on the surfaces of various substrates.

The present invention is also concerned with a film formed using the above-mentioned modified photocatalyst sol or modified photocatalyst composition, a functional composite comprising the film and a substrate covered with the film, and a shaped article produced by shaping the above-mentioned modified photocatalyst composition.

2. Prior Art

When specific types of substances are irradiated with light having energy which is larger than the energy gap (band gap) between the conduction band and the valence band of these substances, i.e., irradiated with light (excitation light) having a wavelength smaller than a wavelength corresponding to the band gap of these substances, the light energy causes an excitation (photoexcitation) of the electrons in the valence band, so that an electron and a hole are, respectively, generated in the conduction band and the valence band. By using the reducing activity of the electron generated in the conduction band and/or using the oxidizing activity of the hole generated in the valence band, various chemical reactions can be performed.

That is, when the above-mentioned substances are irradiated with excitation light, they can function as catalysts. Therefore, the above-mentioned substances are called "photocatalysts." As a most representative example of such photocatalysts, titanium oxide is known.

As examples of chemical reactions catalyzed by the photocatalysts, there can be mentioned oxidative decomposition reactions of various organic substances. Therefore, when the photocatalysts are immobilized on the surfaces of various substrates, it is possible to cause various organic substances which have adhered to the surfaces of the substrates to undergo oxidative decomposition by light irradiation.

On the other hand, it is known that, when photocatalysts are irradiated with light, the hydrophilicity of the surface of the photocatalysts is increased. Therefore, when photocatalysts are immobilized on the surface of various substrates, it is possible to increase the hydrophilicity of the surface of the substrates by light irradiation.

In recent years, studies have been made for applying the above-mentioned properties of photocatalysts to various fields, such as the field of environmental clean-up, fields in which it is necessary to prevent dirt from adhering to the surface of various substrates, and fields in which it is necessary to prevent fogging from occurring on the surfaces of various substrates. For enabling such applications, the method for immobilizing photocatalysts on the surface of various substrates has a great importance.

With respect to the method for immobilizing a photocatalyst on the surface of a substrate, various proposals have been made. For example, Unexamined Japanese Patent Application Laid-Open Specification No. 60-044053 discloses a method for immobilizing a photocatalyst on the surface of a substrate, in which a thin film of a photocatalyst is formed on the surface of a substrate by sputtering.

Of these methods which have been proposed, one which has been attracting attention as being especially advantageous is a method for immobilizing a photocatalyst on the surface of a substrate, in which a composition containing a photocatalyst is coated on the surface of a substrate to thereby form a photocatalyst-containing film thereon.

In the above-mentioned method for immobilizing a photocatalyst by coating, it is required:

① that the photocatalyst be strongly immobilized on the surface of the substrate without suffering a lowering of the activity of the photocatalyst, and ② that any of the film formed and the substrate covered with the film formed be not deteriorated by the action of the photocatalyst.

Further, for broadening the application field of the above-mentioned method, it is desired:

③ that the immobilization can be performed under moderate conditions (for example, at room temperature to about 100° C.), and ④ that the film formed exhibits excellent properties with respect to transparency, durability, staining resistance, hardness and the like.

For immobilizing a photocatalyst by coating, various methods have conventionally been proposed.

For example, Unexamined Japanese patent Application Laid-Open Specification No. 60-118236 discloses a method in which a sol containing a photocatalyst precursor (for example an organotitanate) is coated on the surface of a substrate, and the resultant film is calcined to thereby convert the photocatalyst precursor into a photocatalyst while immobilizing the formed photocatalyst on the surface of the substrate. However, this method includes a step for forming crystalline microparticles of a photocatalyst, wherein this step requires calcination at high temperatures. Therefore, this method has a disadvantage in that, when the substrate has a large surface area, it is difficult to perform the immobilization of the photocatalyst.

As a method which uses a sol containing a photocatalyst (and which, hence, does not require a step for forming crystalline microparticles of a photocatalyst), Unexamined Japanese Patent Application Laid-Open Specification No. 6-278241 discloses a method for immobilizing a photocatalyst on the surface of a substrate, in which a water-peptized sol of titanium dioxide is coated on the surface of a substrate. However, since a titanium oxide sol cannot exhibit a film-forming property under moderate conditions, this method also requires calcination at high temperatures. Further, the film obtained by this method is brittle and easily broken and comes off from the substrate, so that it is impossible to allow the photocatalyst to exhibit its effect at the surface of the substrate.

Also, methods have been proposed in which a resin coating material containing a photocatalyst is coated on the surface of a substrate. For example, each of Unexamined Japanese Patent Application Laid-Open Specification Nos. 7-171408 and 9-100437 discloses a method in which a photocatalyst is incorporated into a resin coating material containing, as a film-forming element, a resin which is unlikely to be decomposed by the action of a photocatalyst, such as a fluoro resin or a silicone resin, and the resultant photocalyst-containing coating material is coated on the surface of a substrate. However, in the resin coating materials used in these methods, the dispersion of the photocatalyst is poor and, therefore, the coating materials become white turbid. Further, for obtaining a good film by these methods, it is necessary for the coating materials to contain a large amount of a resin, and this use of a large amount of a resin poses a problem in that the photocatalyst is embedded in the film and, hence, cannot exhibit a satisfactory activity.

As a method for solving these problems, Unexamined Japanese Patent Application Laid-Open Specification No. 9-314052 discloses a method which uses a combination of a resin coating material and photocatalyst particles having a controlled wettability with respect to the solvent contained in the resin coating material. In this method, the resin coating material is first coated on the surface of a substrate and, then, before the curing of the coating material is completed, the above-mentioned photocatalyst particles are coated on the coating material. However, this method is disadvantageous in that not only is the operation cumbersome, but also a homogeneous and transparent film cannot be obtained. The above-mentioned patent document also discloses a method intended to simplify the operation, specifically a method in which a mixture of a resin coating material and photocatalyst particles having a controlled wettability with respect to the solvent contained in the resin coating material is coated on the surface of a substrate. However, the photocatalyst cannot be prevented from being embedded in the film by using photocatalyst particles having a controlled wettability with respect to the solvent, and most of the photocatalyst particles are completely embedded in the film and, hence, cannot exhibit a satisfactory activity.

Thus, no method has yet been known which is for immobilizing a photocatalyst on the surface of a substrate by coating and which satisfies all of the above-mentioned requirements ① to ④.

SUMMARY OF THE INVENTION

In this situation, the present inventor has made extensive and intensive studies with a view toward developing a method for immobilizing a photocatalyst on the surface of a substrate wherein the method satisfies all of the above-mentioned requirements ① to ④.

As a result, it has unexpectedly been found that, when a film containing a modified photocatalyst is formed on the surface of a substrate either by using a modified photocatalyst sol comprising a liquid medium having dispersed therein particles of a modified photocatalyst, wherein the modified photocatalyst particles are prepared by subjecting particles of a photocatalyst to a modification treatment with at least one modifier compound selected from the group consisting of different compounds each independently comprising at least one structural unit selected from the group consisting of a monooxydiorganosilane unit, a dioxyorganosilane unit and a difluoromethylene unit, and wherein the modified photocatalyst particles have a specific volume mean particle diameter, or by using a modified photocatalyst composition comprising the above-mentioned modified photocatalyst sol and a functional substance, all of the above-mentioned requirements ① to ④ are satisfied and the modified photocatalyst is not embedded in the film and, hence, can exert a satisfactory effect at the surface of the film.

It has also been found that each of a film formed using the above-mentioned modified photocatalyst sol or modified photocatalyst composition, a functional composite comprising the film and a substrate covered with the film, and a shaped article produced by shaping the above-mentioned modified photocatalyst composition, enables the modified photocatalyst contained therein to exert a satisfactory effect at a surface of each of the film, the functional composite and the shaped article, thereby effectively preventing dirt from adhering to the surface thereof and effectively preventing fogging from occuring on the surface thereof.

Based on these novel findings, the present invention has been completed.

Accordingly, it is a primary object of the present invention to provide a modified photocatalyst sol and a modified photocatalyst composition comprising the modified photocatalyst sol and a functional substance, wherein the modified photocatalyst sol and the modified photocatalyst composition have an advantage in that when a film containing a modified photocatalyst is formed on the surface of a substrate by using the modified photocatalyst sol or modified photocatalyst composition, the modified photocatalyst can be strongly immobilized on the surface of the substrate under moderate conditions without suffering a lowering of the activity of the modified photocatalyst.

It is another object of the present invention to provide a film, a functional composite comprising the film and a substrate covered with the film, and a shaped article, each of which can effectively prevent dirt from adhering to the surface thereof and effectively prevent fogging from occuring on the surface thereof.

The foregoing and other objects, features and advantages of the present invention will be apparent from the following detailed description and appended claims taken in connection with the accompanying drawings.

DETAILED DESCRIPTION OF THE INVENTION

Figure 1:
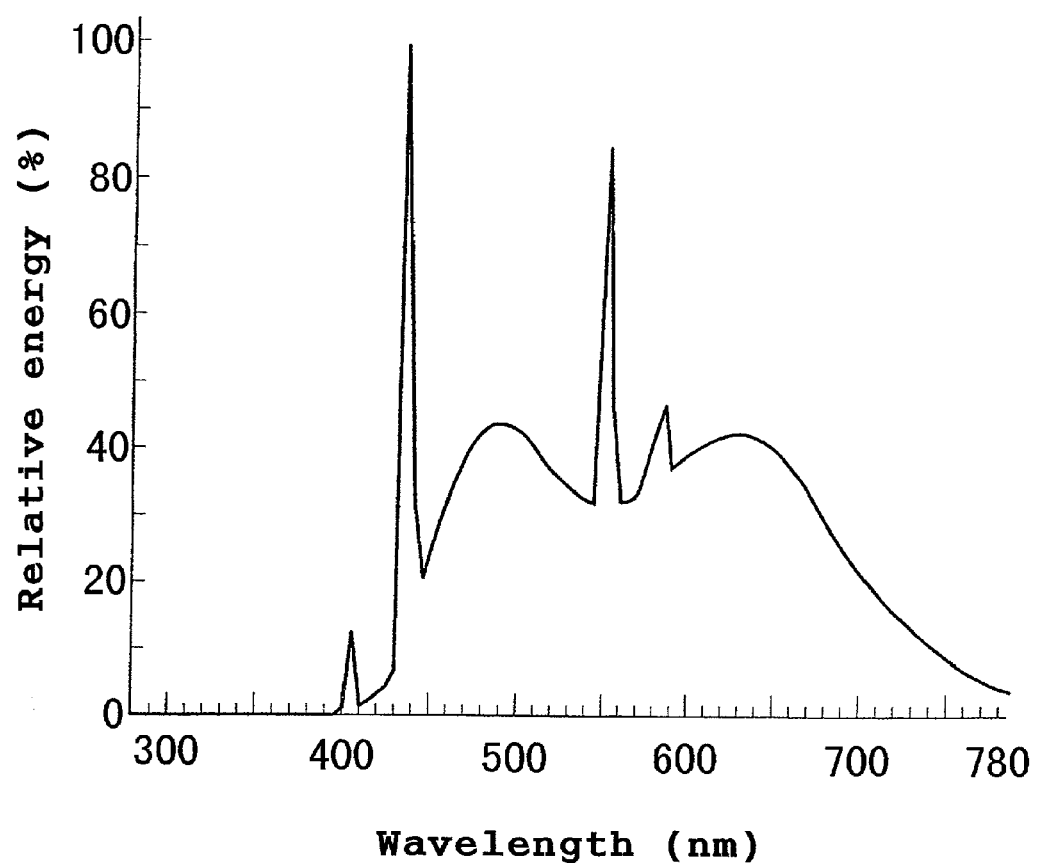
FIG. 1 is a graph showing the spectral energy distribution of light emitted from an FL20S•N-SDL NU fluorescent lamp (manufactured and sold by TOSHIBA LIGHTING AND TECHNOLOGY CO., LTD., Japan)

According to the present invention, there is provided a modified photocatalyst sol comprising a liquid medium having dispersed therein particles of a modified photocatalyst,
the particles of a modified photocatalyst being prepared by subjecting particles of a photocatalyst to a modification treatment with at least one modifier compound selected from the group consisting of different compounds each independently comprising at least one structural unit selected from the group consisting of a monooxydiorganosilane unit represented by formula (1), a dioxyorganosilane unit represented by formula (2), and a difluoromethylene unit represented by formula (3):

—(R$^1$R$^2$SiO)—      (1)

wherein each of R$^1$ and R$^2$ independently represents a hydrogen atom, a straight chain or branched C$_1$–C$_{30}$ alkyl group, a C$_5$–C$_{20}$ cycloalkyl group or a C$_6$–C$_{20}$ aryl group which is unsubstituted or substituted with at least one substituent selected from the group consisting of a C$_1$–C$_{20}$ alkyl group, a C$_1$–C$_{20}$ alkoxy group and a halogen atom,

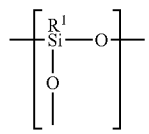

(2)

wherein R$^1$ is as defined for formula (1), and

—(CF$_2$)—      (3)

the modified photocatalyst particles having a volume mean particle diameter of 800 nm or less.

For easy understanding of the present invention, the essential features and various preferred embodiments of the present invention are enumerated below.

1. A modified photocatalyst sol comprising a liquid medium having dispersed therein particles of a modified photocatalyst,
the particles of a modified photocatalyst being prepared by subjecting particles of a photocatalyst to a modification treatment with at least one modifier compound selected from the group consisting of different compounds each of which independently comprises at least one structural unit selected from the group consisting of a monooxydiorganosilane unit represented by formula (1), a dioxyorganosilane unit represented by formula (2), and a difluoromethylene unit represented by formula (3):

—(R$^1$R$^2$SiO)—      (1)

wherein each of R$^1$ and R$^2$ independently represents a hydrogen atom, a straight chain or branched C$_1$–C$_{30}$ alkyl group, a C$_5$–C$_{20}$ cycloalkyl group or a C$_6$–C$_{20}$ aryl group which is unsubstituted or substituted with at least one substituent selected from the group consisting of a C$_1$–C$_{20}$ alkyl group, a C$_1$–C$_{20}$ alkoxy group and a halogen atom,

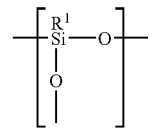

(2)

wherein R$^1$ is as defined for formula (1), and

—(CF$_2$)—      (3), the modified photocatalyst particles having a volume mean particle diameter of 800 nm or less.

2. The modified photocatalyst sol according to item 1 above, wherein the photocatalyst particles prior to the modification treatment have a volume mean particle diameter of 200 nm or less.

3. The modified photocatalyst sol according to item 1 or 2 above, wherein the modified photocatalyst particles have a volume mean particle diameter of 200 nm or less to the exclusion of moieties of the particles which moieties are derived from the modifier compound.

4. The modified photocatalyst sol according to any one of items 1 to 3 above, which, after allowed to stand at 30° C. for 100 days, maintains a volume mean particle diameter of the modified photocatalyst particles at 800 nm or less.

5. The modified photocatalyst sol according to any one of items 1 to 4 above, wherein the modifier compound has a sensitizing group.

6. The modified photocatalyst sol according to any one of items 1 to 5 above, wherein the modifier compound has at least one reactive group selected from the group consisting of an epoxy group, an acryloyl group, a methacryloyl group, an acid anhydride group, a keto group, a carboxyl group, a hydrazine group, an isocyanate group, an isothiocyanate group, a hydroxyl group, an amino group, a cyclic carbonate group and an ester group.

7. The modified photocatalyst sol according to item 6 above, wherein the modifier compound has at least one reactive group selected from the group consisting of a hydrazine group and a keto group.

8. The modified photocatalyst sol according to any one of items 1 to 7 above, wherein the modifier compound is self-emulsifiable or soluble in water.

9. The modified photocatalyst sol according to any one of items 1 to 8 above, wherein the modifier compound contains at least one silicon atom having bonded thereto at least one hydrogen atom.

10. The modified photocatalyst sol according to item 9 above, wherein the modification treatment is conducted in the presence of a dehydrogenation-condensation catalyst which has dehydrogenation-condensation activity with respect to the hydrogen atom bonded to the silicon atom of the modifier compound.

11. The modified photocatalyst sol according to item 10 above, wherein the dehydrogenation-condensation catalyst comprises at least one metal of the platinum group or a compound thereof.

12. The modified photocatalyst sol according to any one of items 9 to 11 above, wherein the modifier compound is a silicon compound having an average structural composition represented by the following formula (4):

$$H_p R_q Q_r X_s SiO_{(4-p-q-r-s)/2} \quad (4)$$

wherein:
  each R independently represents a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom,
  each Q independently represents a group having at least one function-imparting group selected from the group consisting of:
  1) at least one hydrophobic group selected from the group consisting of a straight chain or branched $C_1$–$C_{30}$ alkyl group, a $C_5$–$C_{20}$ cycloalkyl group and a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom, and a $C_1$–$C_{30}$ fluoroalkyl group;
  2) at least one hydrophilic group selected from the group consisting of a carboxyl group and a salt thereof, a phosphate group and a salt thereof, a sulfonic acid group and a salt thereof, and a polyoxyalkylene group;
  3) at least one reactive group selected from the group consisting of an epoxy group, an acryloyl group, a methacryloyl group, an acid anhydride group, a keto group, a hydrazine group, an isocyanate group, an isothiocyanate group, a hydroxyl group, an amino group, a cyclic carbonate group and an ester group; and
  4) at least one sensitizing group, each X independently represents a hydrolyzable group selected from the group consisting of a $C_1$–$C_{20}$ alkoxy group, a hydroxyl group, a hydroxyimino group, an enoxy group, an amino group, an amido group, a $C_1$–$C_{20}$ acyloxy group, an aminoxy group and a halogen atom, and
  p, q, r and s satisfy the following relationships:

$$0 < p < 4,$$

$$0 < q < 4,$$

$$0 \leq r < 4,$$

$$0 \leq s < 2, \text{ and}$$

$$(p+q+r+s) < 4.$$

13. The modified photocatalyst sol according to item 12 above, wherein the silicon compound is represented by the following formula (5):

$$(R^1 HSiO)_a (R^1{}_2 SiO)_b (R^1 QSiO)_c (R^1{}_3 SiO_{1/2})_d \quad (5)$$

wherein:
  $R^1$ is as defined for formula (1) and Q is as defined for formula (4),
  a represents an integer of 1 or more,
  each of b and c independently represents an integer of 0 or more,
  d is 0 or 2,
  wherein a, b and c satisfy the following relationship:

$(a+b+c)$: 10,000, and wherein when $(a+b+c) \geq 2$ and d is 0, the compound of formula (5) is a cyclic silicone compound, and when d is 2, the compound of formula (5) is a straight chain silicone compound.

14. A modified photocatalyst composition comprising the modified photocatalyst sol of any one of items 1 to 13 above and at least one functional substance.

15. The modified photocatalyst composition according to item 14 above, wherein the functional substance is a resin.

16. The modified photocatalyst composition according to item 15 above, wherein the resin is at least one resin selected from the group consisting of a silicone resin and a fluoro resin.

17. The modified photocatalyst composition according to item 15 above, wherein the modified photocatalyst sol is the modified photocatalyst sol of item 6 above, and the resin is capable of reacting with the reactive group of the modified photocatalyst sol.

18. The modified photocatalyst composition according to item 14 above, wherein the modified photocatalyst sol is the modified photocatalyst sol of item 7 above, and the functional substance is at least one compound selected from the group consisting of a polycarbonyl compound and a polyhydrazine compound.

19. The modified photocatalyst composition according to item 14 above, wherein the functional substance is a coating resin composition.

20. The modified photocatalyst composition according to item 14 above, wherein the functional substance is a compound having a surface energy larger than that of each modified photocatalyst particle.

21. The modified photocatalyst composition according to item 14 above, wherein the functional substance is a coating composition comprising a resin having a surface energy larger than that of each modified photocatalyst particle.

22. A modified photocatalyst composition comprising modified photocatalyst particles having a volume mean particle diameter of 800 nm or less and at least one functional substance, wherein the modified photocatalyst particles are obtained by removing the liquid medium from the modified photocatalyst sol of any one of items 1 to 13 above.

23. The modified photocatalyst composition according to item 22 above, wherein the functional substance is a compound having a surface energy larger than that of each modified photocatalyst particle.

24. The modified photocatalyst composition according to item 22 above, wherein the functional substance is a coating composition comprising a resin having a surface energy larger than that of each modified photocatalyst particle.

25. A modified photocatalyst/resin composite composition which is produced by polymerizing at least one compound selected from the group consisting of a vinyl compound and a hydrolyzable silane compound in the presence of the modified photocatalyst sol of any one of items 1 to 13 above.

26. A functional composite comprising a substrate and a film formed on the substrate, the film comprising the modified photocatalyst sol of any one of items 1 to 13 above.

27. A shaped article produced by shaping the modified photocatalyst composition of any one of items 14 to 18 above.

28. A functional composite comprising a substrate and a film formed on the substrate, the film comprising the modified photocatalyst composition of any one of items 14 to 19 above.
29. A shaped article produced by shaping the modified photocatalyst composition of item 20 above, which is anisotropic with respect to the distribution of the modified photocatalyst.
30. A functional composite comprising a substrate and a film formed on the substrate, the film comprising the modified photocatalyst composition of item 20 or 21 above and being anisotropic with respect to the distribution of the modified photocatalyst.
31. A shaped article produced by shaping the modified photocatalyst composition of item 22 above.
32. A functional composite comprising a substrate and a film formed on the substrate, the film comprising the modified photocatalyst composition of item 22 above.
33. A shaped article produced by shaping the modified photocatalyst composition of item 23 above, which is anisotropic with respect to the distribution of the modified photocatalyst.
34. A functional composite comprising a substrate and a film formed on the substrate, the film comprising the modified photocatalyst composition of item 23 or 24 above and being anisotropic with respect to the distribution of the modified photocatalyst.
35. A shaped article produced by shaping the modified photocatalyst/resin composite composition of item 25 above.
36. A functional composite comprising a substrate and a film formed on the substrate, the film comprising the modified photocatalyst/resin composite composition of item 25 above.

Hereinbelow, the present invention is described in detail.

The particles of a modified photocatalyst in the modified photocatalyst sol of the present invention are prepared by subjecting particles of a photocatalyst to a modification treatment with at least one modifier compound mentioned below.

In the present invention, the term "modification (of particles of a photocatalyst)" means "immobilization of the below-mentioned at least one modifier compound on the surface of particles of a photocatalyst". It is considered that the above-mentioned immobilization of the modifier compound on the surface of particles of a photocatalyst is achieved by van der Waals force (physical adsorption), Coulomb force or chemical bonding. Especially when the modification is achieved by chemical bonding, the interaction between the modifier compound and the photocatalyst advantageously becomes strong, so that the modifier compound can be strongly immobilized on the surface of the photocatalyst particles. Therefore, it is preferred that the modification is achieved by chemical bonding.

Examples of photocatalysts used in the present invention include $TiO_2$, $ZnO$, $SrTiO_3$, $CdS$, $GaP$, $InP$, $GaAs$, $BaTiO_3$, $BaTiO_4$, $BaTi_4O_9$, $K_2NbO_3$, $Nb_2O_5$, $Fe_2O_3$, $Ta_2O_5$, $K_3Ta_3Si_2O_3$, $WO_3$, $SnO_2$, $Bi_2O_3$, $BiVO_4$, $NiO$, $Cu_2O$, $SiC$, $SiO_2$, $MoS_2$, $InPb$, $RuO_2$ and $CeO_2$.

Further examples of photocatalysts include lamellar oxides containing at least one element selected from the group consisting of Ti, Nb, Ta and V (see, for example, Unexamined Japanese Patent Application Laid-Open Specification Nos. 62-74452, 2-172535, 7-24329, 8-89799, 8-89800, 8-89804, 8-198061, 9-248465, 10-99694 and 10-244165).

Still further examples of photocatalysts include photocatalysts obtained by a method in which at least one member selected from the group consisting of metals of Pt, Rh, Ru, Nb, Cu, Sn, Ni and Fe and oxides thereof is added to or immobilized on the above-mentioned photocatalysts; and photocatalysts obtained by coating the above-mentioned photocatalysts with porous calcium phosphate or the like (see Unexamined Japanese Patent Application Laid-Open Specification No. 10-244166).

Of these catalysts, $TiO_2$ (titanium oxide) is preferred because it has no toxicity and excellent chemical stability. There are known 3 types of titanium oxide crystals, i.e., anatase-type, rutile-type and brookite-type. In the present invention, any of these 3 types of titanium oxide crystals can be used.

It is preferred that the crystal particle diameter of the photocatalyst (primary particle diameter) is from 1 to 200 nm, more advantageously from 1 to 50 nm.

In the present invention, the form in which the photocatalyst to be subjected to the modification treatment is provided is a factor important for the modified photocatalyst sol to exhibit good dispersion stability, good film-forming properties and various functions. In the present invention, for the below-mentioned reason, it is preferred that the photocatalyst to be subjected to the modification treatment is not in the form of a powder but in the form of a sol. In general, in the case of a photocatalyst powder comprised of microparticles, single crystal particles (primary particles) are strongly aggregated to form secondary particles, thus causing a great loss of the surface properties of the primary particles. It is very difficult to disaggregate the secondary particles back into primary particles. By contrast, in the case of a photocatalyst sol, photocatalyst particles are not dissolved but present in a form close to the primary particle form, so that the surface properties of the primary particles can be effectively utilized. Therefore, a modified photocatalyst sol obtained from a photocatalyst sol exhibits not only good dispersion stability and good film-forming properties but also various functions. In the photocatalyst sol used in the present invention, the photocatalyst particles may be either in the form of primary particles or in the form of a mixture of primary particles and secondary particles. In general, in the photocatalyst sol used in the present invention, the photocatalyst particles are present in the form of a mixture of primary particles and secondary particles.

In the present invention, from the viewpoint of effectively utilizing the surface properties of the modified photocatalyst, it is preferred that the photocatalyst particles prior to the modification treatment have a volume mean particle diameter of 400 nm or less.

In the present invention, from the viewpoint of producing a transparent film from the modified photocatalyst sol, it is very preferred that the photocatalyst particles prior to the modification treatment have a volume mean particle diameter of 200 nm or less. It is more preferred that the photocatalyst particles prior to the modification treatment have a volume mean particle diameter of 1 to 100 nm, more advantageously 3 to 20 nm.

An explanation is made below by taking a titanium oxide sol as an example of a photocatalyst sol. As an example of a titanium oxide sol, there can be mentioned a titanium oxide hydrosol, in which titanium oxide particles are peptized in a dispersion medium consisting essentially of water (herein the term "dispersion medium consisting essentially of water" means a dispersion medium containing about 80% or more of water). The preparation of such a hydrosol is known, and such a hydrosol can be easily produced (see, for example, Unexamined Japanese Patent Application Laid-Open Specification Nos. 63-17221, 7-819, 9-165218 and 11-43327). For example, an aqueous solution of titanium sulfate or titanium tetrachloride is subjected to hydrolysis under heating to thereby form metatitanic acid. The obtained metatitanic acid is neutralized with aqueous ammonia to thereby deposit titanium oxide hydrate, and the obtained titanium oxide hydrate is subjected to filtration, washing and dehydration to thereby obtain an aggregate of titanium oxide particles. The obtained aggregate is peptized by the action of nitric acid, hydrochloric acid or ammonia, and, then, subjected to a hydrothermal treatment or the like to thereby obtain a titanium oxide hydrosol. Further examples of titanium oxide hydrosols include those hydrosols obtained by a method in which titanium oxide particles are peptized in water by the action of an acid or an alkali, and those hydrosols obtained by a method in which titanium oxide particles are dispersed in water under a strong shearing force and in which any of an acid and an alkali is not used and, if desired, a dispersant, such as sodium polyacrylate, is used. Also, by the method proposed in Unexamined Japanese Patent Application Laid-Open Specification No. 10-67516, there can be easily obtained a sol of anatase-type titanium oxide in which the particles have their surface modified with a peroxo group and exhibit excellent dispersion stability even in an aqueous solution having a pH around neutrality.

The above-described titanium oxide hydrosols are commercially available as titania sols. (Examples of commercially available titania sols include "STS-02", manufactured and sold by Ishihara Sangyo Kaisha, Ltd., Japan, and "TO-240", manufactured and sold by TANAKA TENSHA CO., LTD., Japan.)

Each of the above-described titanium oxide hydrosols has a solids content of 50% by weight or less, preferably 30% by weight or less, more preferably 0.1 to 30% by weight. Such a hydrosol has a relatively low viscosity (as measured at 20° C.). In the present invention, the hydrosol may have a viscosity in the range of from 2,000 cps to 0.5 cps. It is preferred that the hydrosol has a viscosity in the range of from 1,000 cps to 1 cps, more advantageously 500 cps to 1 cps.

In addition to the methods for producing titanium oxide sols, also known are methods for producing various other types of photocatalyst sols, for example, a cerium oxide sol (see Unexamined Japanese Patent Application Laid-Open Specification No. 8-59235) and a sol of a lamellar oxide containing at least one element selected from the group consisting of Ti, Nb, Ta and V (see, for example, Unexamined Japanese Patent Application Laid-Open Specification Nos. 9-25123, 9-67124, 9-227122, 9-227123 and 10-259023).

The above-mentioned photocatalyst sols are preferred since the modified photocatalyst sol of the present invention can be obtained simply by subjecting these photocatalyst sols to a modification treatment with the above-mentioned modifier compound.

The at least one modifier compound used in the present invention is selected from the group consisting of different compounds each independently comprising at least one structural unit selected from the group consisting of a monooxydiorganosilane unit represented by formula (1), a dioxyorganosilane unit represented by formula (2), and a difluoromethylene unit represented by formula (3):

$$—(R^1R^2SiO)—  \quad (1)$$

wherein each of $R^1$ and $R^2$ independently represents a hydrogen atom, a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom,

wherein $R^1$ is as defined for formula (1), and

$$—(CF_2)— \quad (3).$$

In the case of the use of a modifier compound which comprises at least one structural unit selected from the group consisting of a monooxydiorganosilane unit represented by formula (1) and a dioxyorganosilane unit represented by formula (2), the obtained modified photocatalyst exhibits various activities when irradiated with excitation light, wherein such various activities can be exhibited, for example, at the surface of a film which is formed from the modified photocatalyst sol or modified photocatalyst composition of the present invention and at the surface of a shaped article which is formed from the modified photocatalyst composition of the present invention. Further, when the modified photocatalyst has the monooxydiorganosilane unit represented by formula (1) and/or the dioxyorganosilane unit represented by formula (2), $R^1$ and $R^2$ groups in these units will be replaced by hydroxyl groups by the action of the modified photocatalyst. As a result of the replacement of $R^1$ and $R^2$ groups by hydroxyl groups, the surface of the above-mentioned film and shaped article increases hydrophilicity. Also, the formed hydroxyl groups undergo dehydration-condensation reaction with each other, so that the surface of the above-mentioned film and shaped article is caused to have very high hardness.

When a modifier compound which comprises a difluoromethylene unit represented by formula (3) is used, a film and a shaped article each having not only a photocatalyst activity but also very high hydrophobicity can be obtained from the modified photocatalyst sol or modified photocatalyst composition of the present invention.

In the present invention, it is preferred that the modifier compound has a sensitizing group.

The term "sensitizing group" means a group derived from any of various metal complexes and organic dyes wherein the metal complexes and organic dyes exhibit an absorption in the visible light region and/or the infrared light region (hereinafter, such metal complexes and organic dyes are referred to as "sensitizing dyes"). When a modifier compound having a sensitizing group is used, the modified photocatalyst sol of the present invention can exhibit a catalyst activity and a photoelectric conversion function not only when irradiated with ultraviolet light but also when irradiated with visible light and/or infrared light.

Examples of sensitizing dyes include xanthene dye, oxonol dye, cyanine dye, merocyanine dye, rhodacyanine dye, styryl dye, hemicyanine dye, phthalocyanine dye (including metal complexes thereof), porphyrin dye (including metal complexes thereof), triphenylmethane dye, perylene dye, coronene dye, azo dye, nitrophenol dye, complexes of ruthenium, osmium, iron and zinc (described in Unexamined Japanese Patent Application Laid-Open Specification No.

1-220380 and Japanese Patent Application prior-to-examination Publication (kohyo) No. 5-504023), and metal complexes, such as of Ruthenium Red and the like.

Of these sensitizing dyes, preferred are those dyes which have characteristics that an absorption is exhibited in the wavelength range of 400 nm or more and that the energy level (the oxidation-reduction potential of the excited state) of the lowest unoccupied molecular orbital is higher than the energy level of the conduction band of the photocatalyst. The above-mentioned characteristics of preferred sensitizing dyes can be confirmed by, for example, the measurement of the light absorption spectrum in the infrared, visible and ultraviolet regions, the measurement of the oxidation-reduction potential by an electrochemical method (see, for example, T. Tani, Photogr. Sci. Eng., 14, 72 (1970); R. W. Berriman et al., ibid., 17. 235 (1973); P. B. Gilman Jr., ibid., 18, 475 (1974)), the calculation of the energy level by using the molecular orbital method (see, for example, T. Tani et al., Photogr. Sci. Eng., 11, 129 (1967); D. M. Sturmer et al., ibid., 17. 146 (1973); ibid., 18, 49 (1974); R. G. Selby et al., J. Opt. Soc. Am., 33, 1 (1970)), and a method in which a wet-type Gratzel solar cell is produced using the photocatalyst and a sensitizing dye, and the solar cell is irradiated with light and observed with respect to the presence or absence of an electromotive force and to the efficiency.

Examples of preferred sensitizing dyes having the above-mentioned characteristics include compounds having a 9-phenyl xanthene skeleton, ruthenium complexes containing a 2,2'-bipyridine derivative as a ligand, compounds having a perylene skeleton, phthalocyanine type metal complexes and porphyrin type metal complexes.

With respect to the method for obtaining the modifier compound having a sensitizing group derived from a sensitizing dye, there is no particular limitation. For example, such a modifier compound can be obtained by reacting a modifier compound having the below-mentioned reactive group with a sensitizing dye which is reactive with the reactive group.

In the present invention, it is preferred that the modifier compound has at least one reactive group selected from the group consisting of an epoxy group, an acryloyl group, a methacryloyl group, an acid anhydride group, a keto group, a carboxyl group, a hydrazine group, an isocyanate group, an isothiocyanate group, a hydroxyl group, an amino group, a cyclic carbonate group and an ester group.

A modified photocatalyst sol which is obtained by using a modifier compound having the above-mentioned reactive group has cross-linking abilities and hence can form a film having excellent durability and the like.

It is especially preferred that the modifier compound has at least one reactive group selected from the group consisting of a hydrazine group and a keto group, wherein the hydrazine group is represented by formula (6)

$-NR^{12}NH_2$ (6)

wherein $R^{12}$ represents a hydrogen atom or a $C_1$–$C_{20}$ alkyl group.

The reason for this preference is because, when such a modifier compound is used, the modified photocatalyst sol of the present invention not only exhibits both good low-temperature curability and good storage stability, but is also susceptive to a hydrazone (semicarbazone) cross-linking reaction, which is useful for forming a film having excellent properties with respect to water resistance, staining resistance, hardness and the like.

In the present invention, it is preferred that the modifier compound is self-emulsifiable or soluble in water. Such a modifier compound can be obtained by introducing a hydrophilic group into a modifier compound. Examples of hydrophilic groups include a carboxyl group and a salt thereof, a phosphate group and a salt thereof, a sulfonic acid group and a salt thereof, and a polyoxyalkylene group. When a modifier compound having a hydrophilic group is used, the obtained modified photocatalyst has very good dispersion stability in water, so that there can be easily obtained a modified photocatalyst sol (hydrosol) of the present invention containing modified photocatalyst particles having a volume mean particle diameter of 800 nm or less.

Preferred examples of groups having the above-mentioned hydrophilic groups include a group having a polyoxyethylene group, which is represented by the following formula (7):

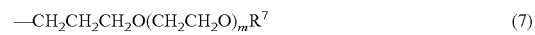

$-CH_2CH_2CH_2O(CH_2CH_2O)_m R^7$ (7)

wherein m represents an integer of from 1 to 1000 and $R^7$ represents a hydrogen atom or a straight chain or branched $C_1$–$C_{30}$ alkyl group;

a group having a sulfonic acid group or a salt thereof, which is represented by the following formula (8):

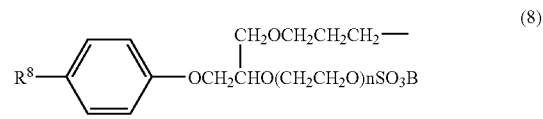

wherein n represents an integer of from 1 to 100; $R^8$ represents a straight chain or branched $C_1$–$C_{30}$ alkyl group; and B represents a hydrogen atom, an alkali metal atom or an unsubstituted or substituted ammonium ion represented by the following formula:

$HNR^9R^{10}R^{11}$ wherein each of $R^9$, $R^{10}$ and $R^{11}$ independently represents a hydrogen atom or a straight chain or branched $C_1$–$C_{20}$ alkyl group unsubstituted or substituted with a hydroxyl group; and a group having a carboxyl acid group or a salt thereof, which is represented by the following formula (9):

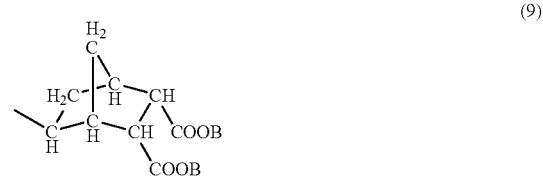

wherein each B independently represents a hydrogen atom, an alkali metal atom or an unsubstituted or substituted ammonium ion represented by the following formula:

$HNR^9R^{10}R^{11}$ wherein each of $R^9$, $R^{10}$ and $R^{11}$ independently represents a hydrogen atom or a straight chain or branched $C_1$–$C_{20}$ alkyl group unsubstituted or substituted with a hydroxyl group.

Examples of modifier compounds used for preparing the modified photocatalyst sol of the present invention wherein the modifier compounds comprise at least one structural unit represented by formula (1) and/or formula (2) above include:
- a silicon compound having a reactive group which bonds chemically with particles of a photocatalyst, such as an Si—H group, a hydrolysable silyl group (e.g., an alkoxysilyl group, a hydroxysilyl group, a halogenated silyl group, an acetoxysilyl group, an aminoxysilyl group and the like), an epoxy group, an acetoacetyl group, a thiol group or an acid anhydride group (with respect to the silicon compound having an Si—H group and the silicon compound having a hydrolysable silyl group, explanations will be made below); and
- a silicon compound having a hydrophilic group which exhibits high affinity to particles of a photocatalyst, such as a polyoxyalkylene group.

As examples of such silicon compounds, there can be mentioned:
- a silicon compound having at least one silicon atom directly bonded to a hydrogen atom (hereinafter referred to as a "silicon compound containing an Si—H group"), wherein the silicon compound has an average structural composition represented by the following formula (4):

$$H_pR_qQ_rX_sSiO_{(4-p-q-r-s)/2} \quad (4)$$

wherein:
  each R independently represents a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom,
  each Q independently represents a group having at least one function-imparting group selected from the group consisting of:
  1) at least one hydrophobic group selected from the group consisting of a straight chain or branched $C_1$–$C_{30}$ alkyl group, a $C_5$–$C_{20}$ cycloalkyl group and a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom, and a $C_1$–$C_{30}$ fluoroalkyl group;
  2) at least one hydrophilic group selected from the group consisting of a carboxyl group and a salt thereof, a phosphate group and a salt thereof, a sulfonic acid group and a salt thereof, and a polyoxyalkylene group;
  3) at least one reactive group selected from the group consisting of an epoxy group, an acryloyl group, a methacryloyl group, an acid anhydride group, a keto group, a hydrazine group, an isocyanate group, an isothiocyanate group, a hydroxyl group, an amino group, a cyclic carbonate group and an ester group; and
  4) at least one sensitizing group, each X independently represents a hydrolyzable group selected from the group consisting of a $C_1$–$C_{20}$ alkoxy group, a hydroxyl group, a hydroxyimino group, an enoxy group, an amino group, an amido group, a $C_1$–$C_{20}$ acyloxy group, an aminoxy group and a halogen atom, and
  p, q, r and s satisfy the following relationships:

$0 < p < 4$, $0 < q < 4$, $0 \leq r < 4$, $0 \leq s < 2$, and $(p+q+r+s) < 4$;

- a reaction product obtained by reacting the above-mentioned silicon compound containing an Si—H group with a vinyl silicone compound represented by the following formula (5'):

$$CH_2=CH-(R^1R^1SiO)_e-(R^1R^1Si)-CH=CH_2 \quad (5')$$

wherein:
  each $R^1$ independently represents a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom, and
  e represents an integer of from 1 to 10,000; and
- a silicon compound having a hydrolysable silyl group, which has an average structural composition represented by the following formula (10):

$$R_qX'_sSiO_{(4-q-s)/2} \quad (10)$$

wherein:
  each R independently represents a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom,
  each X' independently represents a hydrolyzable group selected from the group consisting of a $C_1$–$C_{20}$ alkoxy group, a hydroxyl group, an enoxy group, a $C_1$–$C_{20}$ acyloxy group, an aminoxy group and a $C_1$–$C_{20}$ oxime group, and
  q and s satisfy the following relationships:

$0 < q < 4$, $0 < s < 4$, and $0 < (q+s) \leq 4$.

Examples of modifier compounds used for preparing the modified photocatalyst sol of the present invention wherein the modifier compounds comprise at least one structural unit represented by formula (3) above include $C_1$–$C_{30}$ fluoroalkyl compounds and fluoroalkylene compounds each having a number average molecular weight of from 100 to 1,000,000 wherein each of the fluoroalkyl compounds and fluoroalkylene compounds has:
- a reactive group which forms a chemical bonding with particles of a photocatalyst, such as an Si—H group, a hydrolysable silyl group (e.g., an alkoxysilyl group, a hydroxysilyl group, a halogenated silyl group, an acetoxysilyl group, an aminoxysilyl group and the like), an epoxy group, an acetoacetyl group, a thiol group and an acid anhydride group; or
- a hydrophilic group which exhibit high affinity to particles of a photocatalyst, such as a polyoxyalkylene group.

As specific examples of such modifier compounds, there can be mentioned:
- a fluoroalkyl compound represented by the following formula (11):

$$CF_3(CF_2)_g-Y-(V)_w \quad (11)$$

wherein:
  g represents an integer of from 0 to 29;
  Y represents an organic group having a valence of w and a molecular weight of from 14 to 50,000;

w represents an integer of from 1 to 20;

each V independently represents a functional group selected from the group consisting of an epoxy group, a hydroxyl group, an acetoacetyl group, a thiol group, an acid anhydride group, a carboxyl group, a sulfonic acid group, a polyoxyalkylene group and a group represented by the following formula:

wherein:

each W independently represents a functional group selected from the group consisting of a $C_1$–$C_{20}$ alkoxy group, a hydroxyl group, a $C_1$–$C_{20}$ acyloxy group, a halogen atom, a hydrogen atom, a $C_1$–$C_{20}$ oxime group, an enoxy group, an aminoxy group and an amido group;

each R independently represents a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom; and x represents an integer of from 1 to 3 and y represents an integer of from 0 to 2, wherein x+y=3, and a fluoroolefin polymer represented by the following formula (12):

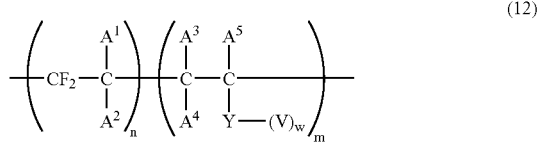

wherein:

each $A^1$ to $A^5$ independently represents an atom or group selected from the group consisting of a fluorine atom, a hydrogen atom, a chlorine atom, a $C_1$–$C_6$ alkyl group and a halogenated $C_1$–$C_6$ alkyl group;

m represents an integer of from 10 to 1,000,000;

n represents an integer of from 0 to 1,000,000;

Y represents an organic group having a valency of w and a molecular weight of from 14 to 50,000;

w represents an integer of from 1 to 20; and

V is as defined for formula (11) above.

As specific examples of such fluoroalkyl compounds and fluoroolefin polymers, there can be mentioned fluoroalkylsilanes (such as 2-perfluorooctylethyltrimethoxysilane), Nafion resins, and copolymers of a fluoroolefin (such as chlorotrifluoroethylene and tetrafluoroethylene) with a monomer (such as a vinyl ether, a vinyl ester, an allyl compound or the like) having a functional group, such as an epoxy group, a hydroxyl group, a carboxyl group, an acetoacetyl group, a thiol group, a cyclic acid anhydride group, a sulfonic acid group or a polyoxyalkylene group.

Further, as an example of the modifier compounds used for preparing the modified photocatalyst sol of the present invention wherein the modifier compounds comprise at least one structural unit represented by formula (1) and/or formula (2) and at least one structural unit represented by formula (3), there can be mentioned a silicon compound having a fluoroalkyl group and a reactive group which forms a chemical bonding with particles of a photocatalyst, such as an Si—H group, a hydrolysable silyl group (e.g., an alkoxysilyl group, a hydroxysilyl group, a halogenated silyl group, an acetoxysilyl group, an aminoxysilyl group and the like), an epoxy group, an acetoacetyl group, a thiol group or an acid anhydride group.

The modified photocatalyst sol of the present invention can be obtained by a method comprising:

mixing, in water and/or an organic solvent, (A) the above-mentioned photocatalyst with (B) the above-mentioned modifier compound, wherein the ratio of the weight (in terms of the weight of the solids content) of (A) to the weight of (B), i.e., (A)/(B) weight ratio, is from 0.001 to 10,000, preferably from 0.1 to 1,000, thereby obtaining a mixture; and keeping the obtained mixture at a temperature of from 0 to 200° C., preferably from 10 to 80° C., or subjecting the obtained mixture to (vacuum) distillation so as to change the ratio of the solvent in the mixture.

Examples of solvents usable in the above-mentioned modification of the photocatalyst include hydrophilic solvents, such as dioxane, tetrahydrofuran, dimethylacetamide, acetone, methyl ethyl ketone, ethylene glycol, butyl cellosolve, ethanol and methanol; and hydrophobic solvents, such as toluene, xylene and hexane.

The modified photocatalyst sol of the present invention can also be obtained by a method comprising subjecting a photocatalyst powder to a modification treatment with the above-mentioned modifier compound in the presence of water and/or an organic solvent and, then, dispersing the resultant product in water and/or an organic solvent. However, in this method, it is extremely difficult to conduct the modification treatment under conditions wherein the photocatalyst is in the form of primary particles. Further, the volume mean particle diameter of the resultant modified photocatalyst particles cannot be rendered small, so that the final sol becomes unstable.

In the present invention, it is preferred that the photocatalyst to be modified with the modifier compound by the above-mentioned method is a photocatalyst sol containing photocatalyst particles which have a volume mean particle diameter of 200 nm or less, more advantageously from 1 to 100 nm. For example, when titanium oxide is used as a photocatalyst, a photocatalyst sol containing photocatalyst particles which have such a small volume mean particle diameter can be obtained by a method in which titanium oxide hydrate is peptized in the presence of hydrochloric acid, nitric acid, ammonia or the like, and the resultant product is subjected to a hydrothermal treatment wherein the time for hydrothermal treatment is appropriately controlled. The shorter the time for the hydrothermal treatment, the smaller the volume mean particle diameter of the resultant particles of the photocatalyst.

In the present invention, it is preferred that during the above-mentioned modification treatment of the photocatalyst, the occurrence of aggregation of the photocatalyst particles due to the modification is small (more advantageously there is no occurrence of aggregation). Such a modification treatment can be achieved by using, as the modifier compound, the above-mentioned silicon compound containing an Si—H group.

That is, in the present invention, it is preferred that the modified photocatalyst particles of the modified photocatalyst sol have moieties derived from the modifier compound and have portions which are exclusive of the modifier compound-derived moieties and which have a volume mean particle diameter of 200 nm or less. (Such a morphology of the modified photocatalyst particles can be confirmed by observation of a sample prepared from a modified photocatalyst sol (which sol has been diluted so as to have a modified photocatalyst content of 0.01% by weight or less) by means of a transmission electron microscope (TEM). Further, a modified photocatalyst sol which maintains such a morphology of the modified photocatalyst particles for a long period of time is extremely preferred, because the mechanical characteristics and the like of a film obtained from such a sol are very stable (in this respect, for example, it is preferred that, after the modified photocatalyst sol is allowed to stand at 30° C. for 100 days, the volume mean particle diameter of the modified photocatalyst particles is maintained at 800 nm or less).

As an example of the modifier compound useful for preparing such a modified photocatalyst sol, there can be mentioned the above-mentioned silicon compound containing an Si—H group.

In the present invention, the binding between the photocatalyst and the modifier compound can be confirmed by the following method. For example, when the above-mentioned modification treatment is conducted using the Si—H group-containing silicon compound of formula (4) above as the modifier compound, hydrogen gas is generated from the mixture of the photocatalyst and the modifier compound, and an increase in the volume mean particle diameter of the photocatalyst (which is caused by the binding of the modifier compound to the photocatalyst) is observed. Further, in this case, when the titanium oxide is used as the photocatalyst, an decrease in amount of the Ti—OH group, which occurs during the above-mentioned modification treatment, is observed in terms of a decrease in absorbance at 3630 to 3640 cm$^{-1}$ in the IR spectrum.

Thus, when the Si—H group-containing silicon compound is used as the modifier compound in the present invention, it can be easily confirmed that the modified photocatalyst sol of the present invention is not a simple mixture of the photocatalyst and the Si—H group-containing compound, but comprises a reaction product of the photocatalyst and the modifier compound, which are bonded to each other through an interaction, such as a chemical bonding. For this reason, the use of the Si—H group-containing silicon compound as the modifier compound is very advantageous. By virtue of the binding between the photocatalyst and the Si—H group-containing silicon compound, the modified photocatalyst sol exhibits excellent dispersion stability, chemical stability and durability.

As an example of the Si—H group-containing silicon compound of formula (4) above, there can be mentioned an Si—H group-containing silicon compound having an average structural composition represented by the following formula (5):

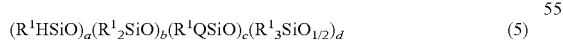

wherein:
$R^1$ is as defined for formula (1) and Q is as defined for formula (4),
a represents an integer of 1 or more,
each of b and c independently represents an integer of 0 or more,
d is 0 or 2,
wherein a, b and c satisfy the following relationship:

$(a+b+c) \leq 10,000$, and wherein when $(a+b+c) \geq 2$ and d is 0, the compound of formula (5) is a cyclic silicone compound, and when d is 2, the compound of formula (5) is a straight chain silicone compound.

As another example of the Si—H group-containing silicone compound of formula (4), there can be mentioned a compound comprising: recurring units, each independently represented by formula (4') below; and recurring units, each having a terminal group A, and each independently represented by formula (4") below, wherein each terminal group A is bonded to the silicon atom of the recurring unit through an oxygen atom.

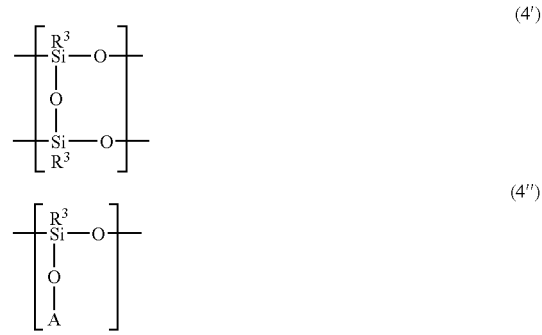

wherein:
each $R^3$ independently represents a hydrogen atom; a hydrocarbon group selected from the group consisting of a straight chain or branched $C_1$–$C_{30}$ alkyl group, a $C_5$–$C_{20}$ cycloalkyl group, a $C_6$–$C_{20}$ aryl group which is unsubstituted or substituted with a $C_1$–$C_{20}$ alkyl group, a $C_1$–$C_{20}$ alkoxy group or a halogen atom; or a group having at least one function-imparting group selected from the group consisting of:
1) at least one hydrophobic group selected from the group consisting of a straight chain or branched $C_1$–$C_{30}$ alkyl group, a $C_5$–$C_{20}$ cycloalkyl group and a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom, and a $C_1$–$C_{30}$ fluoroalkyl group;
2) at least one hydrophilic group selected from the group consisting of a carboxyl group and a salt thereof, a phosphate group and a salt thereof, a sulfonic acid group and a salt thereof, and a polyoxyalkylene group;
3) at least one reactive group selected from the group consisting of an epoxy group, an acryloyl group, a methacryloyl group, an acid anhydride group, a keto group, carboxyl group, a hydrazine group, an isocyanate group, an isothiocyanate group, a hydroxyl group, an amino group, a cyclic carbonate group and an ester group; and
4) at least one sensitizing group, and
each A independently represents a group selected from the group consisting of —SiR$^4$, R$^5$R$^6$ (each of R$^4$, R$^5$ and R$^6$ independently represents a hydrogen atom or a hydrocarbon group selected from the group consisting of a straight chain or branched $C_1$–$C_{30}$ alkyl group, a $C_5$–$C_{20}$ cycloalkyl group, a $C_6$–$C_{20}$ aryl group which is unsubstituted or substituted with a $C_1$–$C_{20}$ alkyl group, a $C_1$–$C_{20}$ alkoxy group or a halogen atom), a hydrogen atom, a straight chain or branched $C_1$–$C_{30}$ alkyl group, a $C_5$–$C_{20}$ cycloalkyl group, and a $C_6$–$C_{20}$ aryl group which is unsubstituted or substituted with a $C_1$–$C_{20}$ alkyl group, a $C_1$–$C_{20}$ alkoxy group or a halogen atom, with the proviso that the compound comprising the recurring units of formula (4') above and recurring units of formula (4'') above has at least one Si—H group.

The above-mentioned compound comprising the recurring units of formula (4') above and terminal group A—containing recurring units of formula (4'') above, wherein each terminal group A is bonded to the silicon atom of the recurring unit through an oxygen atom, can be obtained by, for example, the following method. In a solvent (such as dioxane), trichlorosilane and/or organotrichlorosilane (and, optionally, diorganodichlorosilane) and water are reacted with each other to effect a hydrolysis polycondensation. Then, the resultant reaction mixture is further reacted with an alcohol and/or a silylating agent represented by formula (13):

(13)

wherein each of $R^4$, $R^5$ and $R^6$ independently represents a hydrogen atom, a straight chain or branched $C_1$–$C_{30}$ alkyl group, a $C_5$–$C_{20}$ cycloalkyl group, or a $C_6$–$C_{20}$ aryl group which is unsubstituted or substituted with a $C_1$–$C_{20}$ alkyl group, a $C_1$–$C_{20}$ alkoxy group or a halogen atom; and Z represents a halogen atom or a hydroxyl group, to thereby obtain a compound comprising the recurring units of formula (4') above and the recurring units of formula (4'') above.

If desired, a function-imparting group can be introduced into the obtained compound by the blow-described hydrosilylation reaction.

In the Si—H group-containing silicon compound of formula (4) above, the Si—H group is a functional group which is necessary to modify the photocatalyst with high selectivity under moderate conditions. On the other hand, hydrolyzable group X in formula (4) also can be utilized to modify the photocatalyst, but tends to cause side reactions to thereby lower the stability of the resultant modified photocatalyst sol. Therefore, it is preferred that the amount of hydrolyzable group X is as small as possible. It is preferred that the Si—H group-containing silicon compound of formula (4) contains substantially no hydrolyzable group X.

Further, the Si—H group-containing silicon compound of formula (4) above, which has a function-imparting group (O), can be advantageously used for imparting various functions to the modified photocatalyst sol of the present invention. It is preferred that the function-imparting group (O) is a group represented by the following formula:

wherein:
Y represents a W-valent organic group having a molecular weight of from 14 to 50,000,
Z represents at least one group selected from the group consisting of the above-mentioned function-imparting groups 1) to 4), and
W is an integer of from 1 to 20.

For example, when the Si—H group-containing silicon compound of formula (4) above has, as the function-imparting group (Q), at least one hydrophilic group 2) defined in formula (4) above which is selected from the group consisting of a carboxyl group and a salt thereof, a phosphate group and a salt thereof, a sulfonic acid group and a salt thereof, and a polyoxyalkylene group, the photocatalyst can be very stably dispersed in water, and, hence, such an Si—H group-containing silicon compound can be advantageously used for easily obtaining a modified photocatalyst sol (hydrosol) of the present invention, in which the volume mean particle diameter of the modified photocatalyst particles is 800 nm or less.

Preferred examples of the above-mentioned hydrophilic group include a polyoxyethylene group represented by formula (7) above; a sulfonic acid group or a salt thereof, which is represented by formula (8) above; and a carboxyl group or a salt thereof, which is represented by formula (9) above.

Further, when the Si—H group-containing silicon compound of formula (4) above has, as the function-imparting group (O), a $C_1$–$C_{30}$ fluoroalkyl group (hydrophobic group) (i.e., the Si—H group-containing silicon compound which has a monooxydiorganosilane unit represented by formula (1) and/or a dioxyorganosilane unit represented by formula (2), and a difluoromethylene unit represented by formula (3)), the surface energy of the photocatalyst becomes very small, and, hence, such an Si—H group-containing silicon compound can be advantageously used for obtaining a modified photocatalyst sol which not only has the below-described self-stratifying or self-gradating property (which is the ability to distribute anisotropically the modified photocatalyst), but also can be used for forming a coating having a very high water repellency.

When the Si—H group-containing silicon compound of formula (4) above has, as the function-imparting group (Q), at least one reactive group 3) defined in formula (4) above which is selected from the group consisting of an epoxy group, an acryloyl group, a methacryloyl group, an acid anhydride group, a keto group, a carboxyl group, a hydrazine group, an isocyanate group, an isothiocyanate group, a hydroxyl group, an amino group, a cyclic carbonate group and an ester group, the modified photocatalyst exhibits cross-linking ability, so that the sol containing such a modified photocatalyst can be advantageously used for forming a coating having an excellent durability.

It is especially preferred that the above-mentioned reactive group is a group which has a monovalent group containing the hydrazine group represented by formula (6) above and/or a monovalent group containing a keto group. The reason for this is that, when such a reactive group is used, the modified photocatalyst sol of the present invention exhibits not only excellent curability even at low temperatures but also excellent storage stability, and is capable of forming a hydrazone (semicarbazone) cross-linkage which is advantageous for obtaining a coating having various excellent properties, such as water resistance, staining resistance and hardness.

When the Si—H group-containing silicon compound of formula (4) above has, as the function-imparting group (Q), at least one sensitizing group 4) defined in formula (4) above, the modified photocatalyst of the modified photocatalyst sol of the present invention can be excited to exert a catalytic activity or an optoelectronic conversion activity through not only the irradiation of the ultraviolet rays but also the irradiation of the visible rays and/or the infrared rays.

As the function-imparting group (Q), at least one of the groups exemplified above can be used. Particularly, when a hydrosol of a photocatalyst is used for producing the modified photocatalyst, and the hydrophilic group 2) defined in formula (4) above and any of the other function-imparting groups 2), 3) and 4) defined in formula (4) above are used in combination, the resultant modified photocatalyst sol having function-imparting groups becomes advantageously stable.

As examples of the method for producing the Si—H group-containing silicon compound of formula (4) above, which has a function-imparting group (Q) (i.e., a silicon compound having an average structural composition represented by formula (4a) below), there can be mentioned:

(a) a method in which an Si—H group-containing silicon compound having an average structural composition represented by formula (14) below and a carbon-to-carbon unsaturated bond-containing compound are subjected to hydrosilylation reaction, wherein the carbon—carbon unsaturated bond-containing compound has at least one function-imparting group selected from the group consisting of groups 1) to 4) defined in formula (4); and (b) a method in which an Si—H group-containing compound having an average structural composition represented by formula (14) below and a carbon—carbon unsaturated bond-containing compound are subjected to a hydrosilylation reaction, wherein the carbon—carbon unsaturated bond-containing compound has a reactive group 3) defined in formula (4), to thereby obtain an Si—H group-containing compound having a reactive group, and, then, the reactive group of the Si—H group-containing compound is reacted with a function-imparting compound having a reactive group, the formula (4a) being:

$$H_pR_qQ_rX_sSiO_{(4-p-q-r-s)/2} \quad (4a)$$

wherein:
each of R, Q and X is as defined for formula (4) above, and
p, q, r and s satisfy the following relationships:

$0<p<4$, $0<q<4$, $0<r<4$, $0 \leq s<2$, and $(p+q+r+s)<4$, and the formula (14) being:

$$H_{(p+r)}R_qX_sSiO_{(4-p-q-r-s)/2} \quad (14)$$

wherein:
each of R and X is as defined for formula (4) above, and
p, q, r and s satisfy the following relationships:

$0<p<4$, $0<q<4$, $0<r<4$, $0 \leq s<2$, and $(p+q+r+s)<4$.

First, an explanation is made below with respect to the above-mentioned method (a) for producing an Si—H group-containing silicon compound having a function-imparting group.

With respect to the carbon—carbon unsaturated bond-containing compound which can be used, in method (a) above, for introducing into the Si—H group containing compound of formula (14) a function-imparting group which is a hydrophobic group selected from the group consisting of a straight chain or branched $C_1-C_{30}$ alkyl group, a $C_5-C_{20}$ cycloalkyl group, or a $C_6-C_{20}$ aryl group which is unsubstituted or substituted with a $C_1-C_{20}$ alkyl group, a $C_1-C_{20}$ alkoxy group or a halogen atom, examples of such carbon—carbon unsaturated bond-containing compound include olefins, such as propylene, 1-butene, 1-hexene, 1-octene, isobutene, 2-methyl-1-butene, 2-hexene, cyclohexene and 5-norbornene; allyl esters, such as allyl acetate, allyl propionate, allyl 2-ethylhexanoate and allyl benzoate; allyl ethers, such as allyl methyl ether, allyl ethyl ether, allyl n-hexyl ether, allyl cyclohexyl ether, allyl 2-ethylhexyl ether and allyl phenyl ether; (meth)acrylic esters, such as methyl (meth)acrylate, ethyl (meth)acrylate, butyl (meth)acrylate, 2-ethylhexyl (meth)acrylate, cyclohexyl (meth)acrylate and phenyl (meth)acrylate; carboxylic acid vinyl esters, such as vinyl acetate, vinyl propionate, vinyl lactate, vinyl stearate and vinyl benzoate; vinyl ethers, such as methyl vinyl ether, ethyl vinyl ether, butyl vinyl ether, isobutyl vinyl ether and cyclohexyl vinyl ether; styrene; (meth)acrylonitrile; and crotonic esters. Among these, from the viewpoint of reactivity, the olefins having an olefinic linkage at the terminal thereof, 5-norbornene, allyl esters and allyl ethers are preferred.

With respect to the carbon—carbon unsaturated bond-containing compound which can be used for introducing into the Si—H bond-containing compound of formula (14) a $C_1-C_{30}$ fluoroalkyl group as a function-imparting group, examples of such carbon—carbon unsaturated bond-containing compounds include an olefin, an allyl ether, an allyl ester, a vinyl ether and a (meth)acrylic ester, each independently having a perfluoroalkyl group represented by the following formula (15):

$$-(CF_2)_gCF_3 \quad (15)$$

Wherein g is an integer of from 0 to 29.

With respect to the carbon—carbon unsaturated bond-containing compound which can be used for introducing a hydrophilic group into the Si—H group-containing compound represented by formula (14), examples of such carbon—carbon unsaturated bond-containing compounds include an olefin, an allyl ether, a vinyl ether, a vinyl ester, a (meth)acrylic ester, a styrene derivative, each independently having at least one hydrophilic group selected from the group consisting of a carboxyl group and a salt thereof, a phosphate group and a salt thereof, a sulfonic acid group and a salt thereof, a polyoxyalkylene group and a cyclic acid anhydride.

Preferred examples of carbon—carbon unsaturated bond-containing compounds having the above-mentioned hydrophilic group include an allyl ether containing a polyoxyethylene group, which is represented by the following formula (16):

$$CH_2=CHCH_2O(CH_2CH_2O)_mR^7 \quad (16)$$

wherein m represents an integer of from 1 to 1000 and $R^7$ represents a hydrogen atom or a straight chain or branched $C_1-C_{30}$ alkyl group;

an allyl ether containing a sulfonic acid group or a salt thereof, which is represented by the following formula (17):

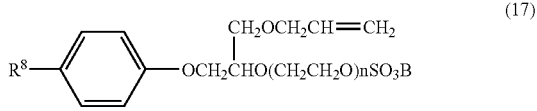

(17)

wherein n represents an integer of from 1 to 100; $R^8$ represents a straight chain or branched $C_1$–$C_{30}$ alkyl group; and B represents a hydrogen atom, an alkali metal atom or an unsubstituted or substituted ammonium ion represented by the following formula:

$HNR^9R^{10}R^{11}$ wherein each of $R^9$, $R^{10}$ and $R^{11}$ independently represents a hydrogen atom or a straight chain or branched $C_1$–$C_{20}$ alkyl group unsubstituted or substituted with a hydroxyl group; and 5-norbornene-2,3-dicarboxylic anhydride.

Examples of carbon—carbon unsaturated bond-containing compounds used for introducing a reactive group into the above-mentioned silicon compound containing an Si—H group represented by formula (14) include olefins, allyl ethers, allyl esters, vinyl ethers, vinyl esters, (meth)acrylic esters and styrene derivatives, each of which has at least one reactive group selected from the group consisting of an epoxy group, a (meth)acryloyl group, an acid anhydride group, a keto group, a carboxyl group, a hydrazine group, an isocyanate group, an isothiocyanate group, a hydroxyl group, an amino group, a cyclic carbonate group and an ester group.

Preferred specific examples of carbon—carbon unsaturated bond-containing compounds having the above-mentioned reactive group include allyl glycidyl ether, glycidyl (meth)acrylate, allyl (meth)acrylate, diallyl ether, diallyl phthalate, vinyl (meth)acrylate, vinyl crotonate, ethylene glycol di(meth)acrylate, maleic anhydride, 5-norbornene-2,3-dicarboxylic anhydride, 5-hexen-2-one, allyl isocyanate, allyl alcohol, ethylene glycol monoallyl ether, allylamine, allyl isothiocyanate, allylsemicarbazide, (meth)acrylonohydrazide, and 4-allyloxymethyl-2-oxo-1,3-dioxolane.

Examples of carbon—carbon unsaturated bond-containing compounds used for introducing a sensitizing group into the above-mentioned silicon compound containing an Si—H group represented by formula (14) include olefins, allyl ethers, allyl esters, vinyl ethers, vinyl esters, (meth)acrylic esters and styrene derivatives, each of which has the above-mentioned sensitizing group. Such a compound can be easily obtained by reacting a carbon—carbon unsaturated bond-containing compound having the above-mentioned reactive group with a sensitizing dye which is reactive with the above-mentioned reactive group.

For example, when the reactive group of the carbon—carbon unsaturated bond-containing compound is selected from the group consisting of an epoxy group, a (cyclic) acid anhydride group, an isocyanate group, an isothiocyanate group, a cyclic carbonate group, an ester group, a keto group and a (meth)acryloyl group, a sensitizing dye is used which has at least one functional group selected from the group consisting of an amino group, a carboxyl group, a hydroxyl group, a hydrazine group and a (meth)acryloyl group.

On the other hand, when the reactive group of the carbon—carbon unsaturated bond-containing compound is selected from the group consisting of an amino group, a carboxyl group, a hydroxyl group, a hydrazine group and a (meth)acryloyl group, a sensitizing dye is used which has at least one functional group selected from the group consisting of an epoxy group, a (cyclic) acid anhydride group, an isocyanate group, an isothiocyanate group, a cyclic carbonate group, an ester group, a keto group and a (meth)acryloyl group.

The reaction of the carbon—carbon unsaturated bond-containing compound having the above-mentioned reactive group with a sensitizing dye which is reactive with the above-mentioned reactive group is effected under conditions wherein the reaction temperature, reaction pressure, reaction solvent and the like are appropriately selected, depending on the type of the reactive group in the carbon—carbon unsaturated bond-containing compound and the type of the functional group in the sensitizing dye. Further, from the viewpoint of the stability of the sensitizing dye, it is preferred that the reaction is effected at a temperature of 300° C. or less, more advantageously from 0 to 150° C.

In method (a), the hydrosilylation reaction between the above-mentioned carbon—carbon unsaturated bond-containing compound and the above-mentioned silicon compound containing an Si—H group (which compound has an average structural composition represented by formula (14)) can be effected by contacting the carbon—carbon unsaturated bond-containing compound with the silicon compound containing an Si—H group at a temperature of from 0 to 200° C., in the absence or presence of an organic solvent and preferably in the presence of a catalyst.

As catalysts for the hydrosilylation reaction, platinum group metal-containing catalysts, i.e., compounds of ruthenium, rhodium, palladium, osmium, iridium or platinum are suitable. Of these, platinum compounds and palladium compounds are preferred. Examples of such platinum compounds include platinum (II) chloride, hydrogen tetrachloroplatinate (II), platinum (IV) chloride, hydrogen hexachloroplatinate (IV), ammonium hexachloroplatinate (IV), potassium hexachloroplatinate (IV), platinum (II) hydroxide, platinum (IV) dioxide, dichloro(dicyclopentadienyl)platinum (II), a platinum-vinylsiloxane complex, a platinum-phosphine complex, a platinum-olefin complex and metallic platinum, wherein metallic platinum is used either without a carrier or in such a form as carried on a carrier, such as alumina, silica, activated carbon or the like. Examples of palladium compounds used as catalysts for the hydrosilylation reaction include palladium (11) chloride and palladium (11) oxide.

Examples of organic solvents usable for the hydrosilylation reaction include aromatic hydrocarbons, such as toluene and xylene; aliphatic hydrocarbons, such as hexane, cyclohexane and heptane; esters, such as ethyl acetate and n-butyl acetate; ketones, such as acetone, methyl ethyl ketone and methyl isobutyl ketone; ethers, such as tetrahydrofuran and dioxane; amides, such as dimethylacetamide and dimethylformamide; halogen compounds, such as chloroform, methylene chloride and carbon tetrachloride; dimethyl sulfoxide and nitrobenzene. These solvents can be used individually or in combination.

Next, an explanation is made below with respect to method (b) mentioned above as one of the methods for obtaining a silicon compound containing an Si—H group which compound has a function-imparting group.

As examples of carbon—carbon unsaturated bond-containing compounds having a reactive group, which are used in method (b), there can be mentioned the same compounds as described above in connection with method (a). In method (b), the hydrosilylation reaction between the above-mentioned carbon—carbon unsaturated bond-containing compound containing a reactive group and the above-mentioned silicon compound containing an Si—H group (which compound has an average structural composition represented by formula (14)) can be effected under the same conditions as those for the hydrosilylation reaction in method (a).

According to method (b), by effecting the above-mentioned hydrosilylation reaction, there can be obtained a silicon compound containing an Si—H group and a reactive group wherein the silicon compound has an average structural composition represented by the following formula (18):

(18)

wherein:
    each of R and X is as defined for formula (4),
    each $Q^3$ independently represents a monovalent group having at least one reactive group selected from the group consisting of an epoxy group, an acryloyl group, a methacryloyl group, an acid anhydride group, a keto group, a hydrazine group, an isocyanate group, an isothiocyanate group, a hydroxyl group, an amino group, a cyclic carbonate group and an ester group, and
    p, q, r and s satisfy the following relationships:

$0<p<4$, $0<q<4$, $0 \leq r<4$, $0 \leq s<2$, and $(p+q+r+s)<4$.

Further, in method (b), with respect to the function-imparting group-containing compound to be reacted with the silicon compound containing an Si—H group and a reactive group (which compound has an average structural composition represented by formula (18)), for example, when the reactive group of the silicon compound containing an Si—H group and a reactive group is selected from the group consisting of an epoxy group, an acid anhydride group, an isocyanate group, an isothiocyanate group, a cyclic carbonate group, an ester group, a keto group and a (meth)acryloyl group, a function-imparting group-containing compound is used which has at least one functional group selected from the group consisting of an amino group, a carboxyl group, a hydroxyl group, a hydrazine group and a (meth)acryloyl group. On the other hand, when the reactive group of the silicon compound containing an Si—H group and a reactive group is selected from the group consisting of an amino group, a carboxyl group, a hydroxyl group, a hydrazine group and a (meth)acryloyl group, a function-imparting group-containing compound is used which has at least one functional group selected from the group consisting of an epoxy group, an acid anhydride group, an isocyanate group, an isothiocyanate group, a cyclic carbonate group, an ester group, a keto group and a (meth)acry-loyl group. The above-mentioned function-imparting group is the same as function-imparting group Q in formula (4) above (representing an average structural composition).

The reaction of the silicon compound containing an Si—H group and a reactive group (which compound has an average structural composition represented by formula (18)) with a function-imparting group-containing compound which is reactive with the silicon compound is effected under conditions wherein the reaction temperature, reaction pressure, reaction solvent and the like are appropriately selected, depending on the type of the reactive group in the silicon compound and the type of the functional group in the function-imparting group-containing compound. Further, from the viewpoint of the stability of the Si—H group, it is preferred that the reaction is effected at a temperature of 300° C. or less, more advantageously from 0 to 150° C.

In the present invention, as examples of methods for obtaining the modified photocatalyst sol containing photocatalyst particles modified with a modifier compound having the above-mentioned function-imparting group, there can be mentioned:

(I) a method in which a photocatalyst sol is subjected to a modification treatment with the silicon compound containing an Si—H group and a function-imparting group (which compound has an average structural composition represented by formula (4a) above) in the above-mentioned manner; and (II) a method in which a photocatalyst sol is subjected to a modification treatment with the silicon compound containing an Si—H group and a reactive group (which compound has an average structural composition represented by formula (18) above), and the resultant modification product is subjected to a reaction with the above-mentioned function-imparting group-containing compound which is reactive with the reactive group.

In method (II) above, the reaction of the modification product (photocatalyst sol modified with the silicon compound containing an Si—H group and a reactive group) with the function-imparting group-containing compound which is reactive with the reactive group can be effected under the same conditions as those for the reaction of the silicon compound containing an Si—H group and a reactive group with a function-imparting group-containing compound which is reactive with the reactive group of the silicon compound wherein the reaction is conducted in method (b).

It is preferred that the modification treatment of the particles of a photocatalyst with a silicon compound containing an Si—H group (which compound has an average structural composition represented by formula (4) above) is conducted at a temperature of from 0 to 100° C. under conditions wherein a compound which functions as a dehydrogenation-condensation catalyst for an Si—H group is immobilized on the surface of the particles of the photocatalyst.

In the case of the use of the above-mentioned compound (catalyst compound) which functions as a dehydrogenation-condensation catalyst for an Si—H group, the modification treatment of the particles of a photocatalyst with a silicon compound containing an Si—H group may be conducted either by a method in which the catalyst compound is previously immobilized on the surface of the photocatalyst particles by using photoreduction method or the like, or by a method in which the modification treatment is conducted in the presence of the catalyst compound which is not previously immobilized on the surface of the photocatalyst particles. In the latter, during the modification reaction, the catalyst compound is immobilized on the surface of the photocatalyst particles by physical adsorption, photoreduction or the like and, then, the photocatalyst particles are modified with the silicon compound containing an Si—H group.

The term "compound which functions as a dehydrogenation-condensation catalyst for an Si—H group" means a compound which accelerates the dehydrogenation-condensation reaction of an Si—H group with an active hydrogen-containing group which is present on the surface of the particles of the photocatalyst or with water or the like, wherein examples of active hydrogen-containing groups include a hydroxyl group (a Ti—OH group when the photocatalyst is titanium oxide), a thiol group, an amino group and a carboxyl group. When the compound which functions as a dehydrogenation-condensation catalyst for an Si—H group is immobilized on the surface of the particles of the photocatalyst, the modification of the particles of the photocatalyst selectively occurs under moderate conditions.

Examples of compounds which function as dehydrogenation-condensation catalysts for an Si—H group include metals belonging to the platinum group (i.e., ruthenium, rhodium, palladium, osmium, iridium and platinum) and compounds thereof, and metals and compounds of silver, iron, copper, cobalt, nickel, tin and the like. Of these, preferred are metals of the platinum group and compounds thereof, especially metallic platinum and platinum compounds.

Hereinbelow, an explanation is made with respect to the method for immobilizing a dehydrogenation condensation catalyst on the photocatalyst, taking as an example the case where platinum is immobilized on the photocatalyst in a sol thereof by photoreduction method.

First, a platinum solution is added to a photocatalyst sol in an amount of 0.001 to 5% by weight, in terms of a solids content of the platinum solution, to obtain a mixture. With respect to the platinum solution, it is preferred that the pH of the platinum solution is adjusted to approximately the same as that of the photocatalyst sol so that the change in zeta potential of the photocatalyst sol can be suppressed as much as possible, so as to maintain a monodispersion of the photocatalyst sol.

The above-described platinum solution means a solution comprising a platinum compound and a solvent. Examples of platinum compounds include platinum (II) chloride, hydrogen tetrachloroplatinate (II), platinum (IV) chloride, hydrogen hexachloroplatinate (IV), ammonium hexachloroplatinate (IV), potassium hexachloroplatinate (IV), platinum (II) hydroxide, platinum (IV) dioxide, dichloro(dicyclopentadienyl) platinum (II), a platinum-vinylsiloxane complex, a platinum-phosphine complex, and a platinum-olefin complex. Examples of solvents include water, ethanol, propanol, isopropanol, dioxane, tetrahydrofuran and toluene. With respect to the concentration of the platinum compound in the platinum solution, it is preferred that the concentration is from 0.001 to 80% by weight.

Then, the mixture of the photocatalyst sol and the platinum solution is irradiated with a light having a wavelength such that an electron and a hole are, respectively, generated in the conduction band and the valence band of the photocatalyst, while stirring. It is preferred that the light contains the ultraviolet rays. Examples of light sources include an ultraviolet lamp, a BLB lamp, a xenon lamp, a mercury lamp and a fluorescent lamp.

There is no particular limitation with respect to the method for the light irradiation. However, even when the above-mentioned mixture is placed in a transparent container, the light is caused to be absorbed in the walls of the container. Therefore, it is preferred to irradiate the light through an opening of the container.

It is preferred that the distance between the light source and the container is in the range of from several to several tens of centimeters. When the distance is too small, there is a danger that the surface of the above-described mixture is dried by the heat emitted from the light source. On the other hand, when the distance is too large, the illumination intensity becomes disadvantageously low. The irradiation time varies depending on the illumination intensity of the light source. Generally, when the irradiation is performed for several seconds to several tens of minutes, platinum is firmly immobilized on the photocatalyst particles.

In the modified photocatalyst sol of the present invention, the modified photocatalyst is dispersed in water and/or an organic solvent, with high stability.

In the modified photocatalyst sol of the present invention, the modified photocatalyst particles have a volume mean particle diameter of 800 nm or less. The volume mean particle diameter herein is not measured with respect to the modified photocatalyst particles isolated from the modified photocatalyst sol, but is measured with respect to the modified photocatalyst particles dispersed in the modified photocatalyst sol.

When the modified photocatalyst particles have a volume mean particle diameter of more than 800 nm, the dispersion stability of the modified photocatalyst sol becomes poor. In addition, not only the modified photocatalyst sol per se but also even a modified photocatalyst composition comprising the modified photocatalyst sol and a resin cannot be used as a coating composition.

In the present invention, for achieving a further improvement in the dispersion stability of the modified photocatalyst sol and an efficient exertion of various functions, such as the film-forming ability, of the modified catalyst sol, it is preferred that the modified photocatalyst particles have a volume mean particle diameter of 400 nm or less, more advantageously 200 nm or less, still more advantageously from 1 to 100 nm, and especially advantageously from 5 to 80 nm.

As described above, in the present invention, the volume mean particle diameter is measured with respect to the modified photocatalyst particles (which may contain the secondary particles) dispersed in the modified photocatalyst sol. On the other hand, conventionally, in many cases, the value referred to simply as a "particle diameter" with respect to titanium dioxide and the like is not a particle diameter measured with respect to the secondary particles formed by coagulation of the primary particles, but is a particle diameter measured only with respect to the primary particles.

The modified photocatalyst sol of the present invention is a sol comprising the above-described modified photocatalyst particles dispersed in a liquid medium. In the modified photocatalyst sol of the present invention, the content of the modified photocatalyst particles is preferably 0.01 to 70% by weight, more preferably 0.1 to 50% by weight, based on the weight of the modified photocatalyst sol.

With respect to the type of the liquid medium, there is particular no limitation, and water and/or an organic solvent may be used. Examples of organic solvents include a hydrophilic organic solvent, such as dioxane, tetrahydrofuran, dimethylacetamide, acetone, methyl ethyl ketone, ethylene glycol, butylcellosolve, ethanol and methanol; and a hydrophobic organic solvent, such as toluene, xylene and hexane.

When a photocatalyst hydrosol (that is, a sol in which the photocatalyst particles are peptized in a dispersion medium consisting essentially of water (herein the term "dispersion medium consisting essentially of water" means a dispersion medium containing about 80% or more of water)) is used for obtaining the modified photocatalyst, an aqueous sol of the modified photocatalyst can be obtained. From the thus obtained aqueous sol of the modified photocatalyst, it is possible to obtain a modified photocatalyst organosol (that is, a sol in which the modified photocatalyst particles are stably dispersed in a dispersion medium comprised essentially of an organic solvent (herein the term "dispersion medium consisting essentially of an organic solvent" means a dispersion medium containing about 80% or more of the organic solvent)) by substituting the dispersion medium of the aqueous sol with an organic solvent.

Examples of method for substituting the dispersion medium of the aqueous sol of the modified photocatalyst with an organic solvent include:
(i) a method in which an organic solvent is added to the aqueous sol of the modified photocatalyst and, then, water is removed by heating under reduced or atmospheric pressure,
(ii) a method in which water in the aqueous sol of the modified photocatalyst is removed by heating under reduced or atmospheric pressure, followed by addition of an organic solvent, and
(iii) a method in which the modified photocatalyst particles in the aqueous sol of the modified photocatalyst sol are extracted with an organic solvent.

Examples of organic solvents used for substituting water contained in the aqueous sol include aromatic hydrocarbons, such as toluene and xylene; alcohols, such as ethanol and n-butanol; polyhydric alcohols, such as ethylene glycol and propylene glycol; glycol derivatives, such as butylcellosolve, ethylcellosolve, butylcellosolve acetate, propylene glycol monoethyl ether and propylene glycol monopropyl ether; aliphatic hydrocarbons, such as hexane, cyclohexane and heptane; esters, such as ethyl acetate and n-butyl acetate; ketones, such as acetone, methyl ethyl ketone and methyl isobutyl ketone; ethers, such as tetrahydrofuran and dioxane; amides, such as dimethylacetamide and dimethylformamide; amines, such as dibutylamine and triethanolamine; halides, such as chloroform, methylene chloride and carbon tetrachloride; dimethyl sulphoxide; nitrobenzene; acids; bases; and a mixture of at least two of the above-described organic solvents. Among these, when method (i) above is used for the solvent substitution, preferred are hydrophilic organic solvents, such as butylcellosolve, propylene glycol monoethyl ether, dioxane, tetrahydrofuran, dimethylacetamide, methyl ethyl ketone, ethylene glycol and ethanol, and when method (iii) above is employed for the solvent substitution, preferred are hydrophobic organic solvents, such as toluene, xylene, hexane and ethyl acetate.

The modified photocatalyst sol of the present invention as such may be used as a modified photocatalyst-containing coating composition. Alternatively, it may be used in the below-described photocatalyst composition comprising the modified photocatalyst sol and at least one functional substance.

In the photocatalyst composition of the present invention, it is preferred that the ratio of the weight (C) of the above-described modified photocatalyst sol to the weight (D) of the functional substance (each of the weights (C) and (D) is in terms of the weight of solids), i.e., (C)/(D) weight ratio, is in the range of from 0.0001 to 100, more advantageously from 0.001 to 10.

Hereinbelow, an explanation is made with respect to the photocatalyst composition comprising the modified photocatalyst sol and the functional substance, taking as an example the use of a resin as the functional substance.

With respect to the resin used as the functional substance in the photocatalyst composition of the present invention, any synthetic resin and any natural resin may be used. There is no particular limitation with respect to the form of the resin, and the resin may be in the form of pellets or in the form of a solution or dispersion thereof in a solvent. It is most preferred that the resin is in the form of a coating resin composition.

With respect to the coating resin composition, there is no particular limitation, and any conventional coating resin composition may be used as the functional substance. Examples of coating resin compositions include an oil paint, a lacquer, a solvent type synthetic resin paint (containing a synthetic resin, such as an acrylic resin, an epoxy resin, an urethane resin, a fluoro resin, a silicone-acrylic resin, an alkyd resin, an aminoalkyd resin, a vinyl resin, an unsaturated polyester resin and a chlorinated rubber), an aqueous synthetic resin paint (such as an emulsion type paint and an aqueous resin type paint), a non-solvent type synthetic resin paint (such as a powder paint), an inorganic paint, and an electrical insulating paint.

Among these coating resin compositions, preferred are compositions containing a silicone resin, a fluoro resin and a combination thereof, each of which is unlikely to be decomposed by the action of the photocatalyst.

Examples of silicone resins include alkoxysilanes, organoalkoxysilanes, hydrolysis reaction products thereof (polysiloxanes), and mixtures thereof with colloidal silica; resins, such as an acrylic-silicone resin, an epoxy-silicone resin or a urethane-silicone resin, wherein the resin contains 1 to 80% by weight of silicone; and resin compositions comprising 1 to 80% by weight of an alkoxysilane, an organoalkoxysilane, a hydrolysis reaction product thereof (polysiloxane) and/or colloidal silica, and the balance of a resin other than a silicone resin. The above-mentioned silicone resins can be in any form of a solution thereof in a solvent, a dispersion thereof in a solvent, or a powder thereof. Further, the silicone resins may contain various additives, such as a cross-linking agent, a catalyst and the like.

Examples of alkoxysilanes and organoalkoxysilanes include tetraalkoxysilanes, such as tetramethoxysilane, tetraethoxysilane, tetra-n-propoxysilane, tetra-i-propoxysilane and tetra-n-butoxysilane; trialkoxysilanes, such as methyltrimethoxysilane, methyltriethoxysilane, ethyltrimethoxysilane, ethyltriethoxysilane, n-propyltrimethoxysilane, n-propyltriethoxysilane, i-propyltrimethoxysilane, 1-propyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, cyclohexyltrimethoxysilane, cyclohexyltriethoxysilane, phenyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-isocyanatopropyltrimethoxysilane, 3-isocyanatopropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meth) acryloxypropyltrimethoxysilane, 3-(meth) acryloxypropyltriethoxysilane, 3-ureidopropyltrimethoxysilane and 3-ureidopropyltriethoxysilane; dialkoxysilanes, such as dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n- octyldiethoxysilane, dicyclohexyldimethoxysilane, dicyclohexyldiethoxysilane, diphenyldimethoxysilane and diphenyldiethoxysilane; and monoalkoxysilanes, such as trimethylmethoxysilane and trimethylethoxysilane; and the like. Among these, preferred are trialkoxysilanes, such as methyltrimethoxysilane and methyltriethoxysilane; and di-alkoxysilanes, such as dimethyldimethoxysilane and dimethyldiethoxysilane. The above-mentioned alkoxysilanes and organoalkoxysilanes may be used individually or in combination.

When the hydrolysis reaction product (polysiloxane) of the alkoxysilane and/or organoalkoxysilane is used as the coating resin compositions, the weight average molecular weight (MW) of the partial polycondensation product obtained by the hydrolysis reaction is preferably in the range of from 400 to 100,000, more preferably from 800 to 50,000.

Examples of the above-mentioned fluoro resins include PTFE; ploy(vinylidene fluoride); resins, such as an acrylic-fluoro resin, an epoxy-fluoro resin, and a urethane-fluoro resin, wherein the resin contains 1 to 80% by weight of fluorine; copolymers of a fluoro-olefin and a carbon—carbon unsaturated compound such as a vinyl ether, a vinyl ester, an allyl compound, and a (meth)acrylate ester; and the like. The above-mentioned fluoro resins may be in any form of a solution thereof in a solvent, a dispersion thereof in a solvent, or a powder thereof. Further, the fluoro resins may contain various additives, such as a crosslinking agent, a catalyst and the like.

When the modified photocatalyst particles of the modified photocatalyst sol are those which have been prepared by subjecting particles of a photocatalyst to a modification treatment with a modifier compound which has at least one reactive group selected from the group consisting of an epoxy group, an acryloyl group, a methacryloyl group, an acid anhydride group, a keto group, a carboxyl group, a hydrazine group, an isocyanate group, an isothiocyanate group, a hydroxyl group, an amino group, a cyclic carbonate group and an ester group, it is preferred to mix the modified photocatalyst sol with a compound or resin which has a functional group capable of reacting with the reactive group of the modified photocatalyst sol, to thereby form a modified photosensitive catalyst composition. In the modified photocatalyst composition thus produced, the reactive group of the modified photocatalyst sol is occasionally, partly reacted with the functional group of the above-mentioned compound or resin (during the storage of the mixture at 40° C. or low for 8 hours, the ratio of the reaction of the reactive group with the functional group is 50% or less). However, the greater part of the modified photocatalyst composition as prepared above remains in the form of a mixture of the modified photocatalyst sol and the above-mentioned compound or resin.

Among the above-mentioned modified photocatalyst compositions, a modified photocatalyst sol which has at least one reactive group selected from the group consisting of a hydrazine group and a keto group and a modified photocatalyst composition which has at least one functional substance selected from the group consisting of a polyhydrazine compound and a polycarbonyl compound, are preferred. The reason for this preference is because such modified photocatalyst compositions not only exhibit both good low-temperature curability and good storage stability, but are also susceptive to a hydrazone cross-linking reaction or a semicarbazone cross-linking reaction, which is useful for forming a film having excellent properties with respect to water resistance, staining resistance, hardness and the like.

Examples of the above-mentioned polyhydrazine compounds include polyhydrazides, polysemicarbazides and polyhydrazides of carbonic acid.

Of these polyhydrazine compounds, preferred are adipodihydrazide, and the polysemicarbazide derivative proposed in International Patent Application Publication No. WO96/01252.

Examples of the above-mentioned polycarbonyl compounds include a copolymer having carbonyl groups, a carbonyl group-containing polyurethane obtained by using as a raw material a monohydric or polyhydric alcohol having a carbonyl group, such as hydroxyacetone (see Unexamined Japanese Patent Application Laid-Open Specification No. 2-238015), a poly(vinyl alcohol) acetoacetate and a hydroxyalkyl cellulose acetoacetate. These compounds can be used individually or in combination.

Of these polycarbonyl compounds, preferred is a carbonyl group-containing copolymer which is obtained by copolymerizing (a) a carbonyl group-containing ethylenically unsaturated monomer and (b) an ethylenically unsaturated monomer copolymerizable with monomer (a). More preferred is a copolymer which is obtained by copolymerizing 0.1 to 30% by weight of monomer (a) with 99.9 to 70% by weight of monomer (b) copolymerizable with monomer (a).

Examples of carbonyl group-containing ethylenically unsaturated monomers (a) include diacetone acrylamide, diacetone methacrylamide, acrolein, vinyl methyl ketone, acetoacetoxyethyl methacrylate, acetoacetoxyethyl acrylate and formylstyrene. These compounds can be used individually or in combination.

Examples of ethylenically unsaturated monomers (b) copolymerizable with monomer (a) include an acrylic ester, a methacrylic ester, an ethylenically unsaturated monomer having a carboxyl group, an ethylenically unsaturated monomer having an epoxy group, a monomeric acrylamide derivative, a monomeric methacrylamide derivative and a vinyl cyanide derivative.

Examples of (meth)acrylic esters include an alkyl (meth)acrylate having a $C_1$–$C_{18}$ alkyl group, a hydroxyalkyl (meth)acrylate having a $C_1$–$C_{18}$ hydroxyalkyl group, a (poly)oxyethylene (meth)acrylate having a (poly)oxyethylene group comprising 1 to 100 ethylene oxide unit(s), a (poly)oxypropylene (meth)acrylate having a (poly)oxypropylene group comprising 1 to 100 propylene oxide unit(s), and a (poly)oxyethylene di(meth)acrylate having a (poly)oxyethylene group comprising 1 to 100 ethylene oxide unit(s).

Specific examples of (meth)acrylic esters (having a $C_1$–$C_{18}$ alkyl group) include methyl (meth)acrylate, ethyl (meth)acrylate, n-butyl (meth)acrylate, 2-ethylhexyl (meth)acrylate, methylcyclohexyl (meth)acrylate and dodecyl (meth)acrylate.

Specific examples of hydroxyalkyl (meth)acrylates include 2-hydroxyethyl (meth)acrylate, 2-hydroxypropyl (meth)acrylate and 2-hydroxycyclohexyl (meth)acrylate.

Specific examples of (poly)oxyethylene (meth)acrylates include ethylene glycol (meth)acrylate, ethylene glycol (meth)acrylate monomethyl ether, diethylene glycol (meth)acrylate, diethylene glycol (meth)acrylate monomethyl ether, tetraethylene glycol (meth)acrylate and methoxytetraethylene glycol (meth)acrylate.

Specific examples of (poly)oxypropylene (meth)acrylates include propylene glycol (meth)acrylate, propylene glycol (meth)acrylate monomethyl ether, dipropylene glycol (meth)acrylate, dipropylene glycol (meth)acrylate monomethyl ether, tetrapropylene glycol (meth)acrylate and tetrapropylene glycol (meth)acrylate monomethyl ether.

Specific examples of (poly)oxyethylene di(meth)acrylates include ethylene glycol di(meth)acrylate, diethylene glycol di(meth)acrylate and tetraethylene glycol di(meth)acrylate.

Specific examples of ethylenically unsaturated monomers having a carboxyl group include acrylic acid, methacrylic acid, itaconic acid, fumaric acid, maleic acid, a half ester of maleic acid, and crotonic acid.

Specific examples of monomeric (meth)acrylamide derivatives include (meth)acrylamide, N-methylol (meth)acrylamide and N-butoxymethyl (meth)acrylamide.

Specific examples of vinyl cyanide derivatives include (meth)acrylonitrile.

Specific examples of ethylenically unsaturated monomers having an epoxy group include glycidyl (meth)acrylate, 2,3-epoxycyclohexyl (meth)acrylate and allyl glycidyl ether.

Further examples of monomers (b) include olefins, such as ethylene, propylene and isobutylene; dienes, such as butadiene; haloolefins, such as vinyl chloride and vinylidene chloride; vinyl esters of a carboxylic acid, such as vinyl acetate, vinyl propionate, vinyl n-butyrate, vinyl benzoate, vinyl p-t-butylbenzoate, vinyl pivalate, vinyl 2-ethylhexanoate, vinyl esters of Versatic Acids and vinyl laurate; isopropenyl esters of a carboxylic acid, such as isopropenyl acetate and isopropenyl propionate; vinyl ethers, such as ethyl vinyl ether, isobutyl vinyl ether and cyclohexyl vinyl ether; aromatic vinyl compounds, such as styrene and vinyltoluene; allyl esters, such as allyl acetate and allyl benzoate; allyl ethers, such as allyl ethyl ether and allyl phenyl ether; γ-(meth)acryloxypropyltrimethoxysilane, 4-(meth)acryloyloxy-2,2,6,6-tetramethylpiperidine, 4-(meth)acryloyloxy-1,2,2,6,6-pentamethyl-piperidine, perfluoromethyl (meth)acrylate, perfluoropropyl (meth)acrylate, perfluoropropylmethyl (meth)acrylate, vinylpyrrolidone, trimethylolpropane tri(meth)acrylate, and allyl (meth)acrylate. These compounds can be used individually or in combination.

It is preferred that the polycarbonyl compound is produced by suspension polymerization, emulsion polymerization or solution polymerization. It is more preferred that the polycarbonyl compound is in the form of a latex obtained by emulsion polymerization. In this case, it is preferred that an emulsifier having a reactivity (polymerizability) is used in the emulsion polymerization to produce a latex, because the modified photocatalyst composition of the present invention which contains the thus produced latex has excellent water resistance.

The production of the above-mentioned polycarbonyl compound is performed in the presence of a radical polymerization catalyst. The above-described radical polymerization catalyst is a water- or oil-soluble persulfate, peroxide, azobis compound or the like, which is capable of decomposing to form a radical by heating or by a reducing agent, so as to cause radical addition polymerization of an ethylenically unsaturated monomer. Examples of radical polymerization catalysts include potassium persulfate, sodium persulfate, ammonium persulfate, hydrogen peroxide, t-butyl hydroperoxide, t-butyl peroxybenzoate, 2,2'-azobisisobutylonitrile, 2,2'-azobis(2-amidinopropane) hydrochloride and 2,2'-azobis(2,4-dimethylvalero-nitrile). Usually, the radical polymerization catalyst is used in an amount of from 0.1 to 1% by weight, based on the weight of the ethylenically unsaturated monomer. Usually, it is preferred that the polymerization is conducted under atmospheric pressure at 65 to 90° C. However, depending on the properties (such as the vapor pressure at the polymerization temperature) of the monomer, the polymerization may be conducted under high pressure. When it is desired to increase the polymerization rate or it is desired to conduct the polymerization at a low temperature, i.e., 70° C. or less, it is preferred that a reducing agent, such as sodium bisulfite, ferrous chloride, an ascorbate or Rongalit is used in combination with the radical polymerization catalyst. Further, if desired, a chain transfer agent, such as dodecylmercaptan, can be used for controlling the molecular weight of the polycarbonyl compound.

It is preferred that during or after the polymerization for preparing the above-mentioned polycarbonyl compound, the polycarbonyl compound is modified with the above-mentioned at least one compound selected from the group consisting of an alkoxysilane, an organoalkoxysilane, a hydrolysis-condensation product (polysiloxane) of an alkoxysilane and/or organoalkoxysilane and a colloidal silica, wherein the compound for modification of the polycarbonyl compound is used in an amount sufficient for modifying 0.1 to 80% by weight of the polycarbonyl compound. The use of the thus obtained modified carbonyl compound in the modified photocatalyst composition of the present invention is advantageous in that a film having excellent weatherability can be obtained from the modified photocatalyst composition.

The modified photocatalyst composition of the present invention can be obtained by, for example:
a method in which the modified photocatalyst sol of the present invention with the above-described functional substance (e.g., the above-mentioned resin), and
a method in which the radical polymerization of an ethylenically unsaturated monomer (e.g., the ethylenically unsaturated monomer described above as an example of monomers used for obtaining the above-described copolymer having a carbonyl group) and/or the condensation polymerization of a hydrolyzable silane (e.g., the above-described at least one compound selected from the group consisting of an alkoxysilane, an organoalkoxysilane, and a hydrolysis-condensation product of an alkoxysilane and/or an organoalkoxysilane) is performed in the presence of the modified photocatalyst sol of the present invention.

With respect to the modified photocatalyst sol used for obtaining the modified photocatalyst composition of the present invention, it is preferred that the modified photocatalyst sol contains a group (such as a (meth)acryloyl group) having a reactivity with an ethylenically unsaturated monomer and/or a group (such as a hydroxysilyl group) having a reactivity with a hydrolyzable silane compound. By the use of such a modified photocatalyst sol, it becomes possible to obtain the modified photocatalyst composition in the form of a modified photocatalyst/resin composite composition in which the modified photocatalyst and the resin are bonded to each other through a chemical bonding.

In the present invention, it is preferred that a compound having a surface energy larger than that of each modified photocatalyst particle in the modified photocatalyst sol is used as the above-mentioned functional substance. The modified photocatalyst composition containing such a large surface energy compound exhibits a self-stratifying or self-gradating property with respect to the distribution of the modified photocatalyst (i.e., the ability to distribute anisotropically the photocatalyst). Hereinafter, such a modified photocatalyst composition is frequently referred to as a "self-stratifying or self-gradating type photocatalyst composition". By virtue of this self-stratifying or self-gradating property, the self-stratifying or self-gradating type photocatalyst composition can be used for forming on a substrate a film or producing a shaped article (such as a structural part), which is anisotropic with respect to the distribution of the modified photocatalyst. More specifically, during the formation of the above-mentioned film or shaped article, a gradient is automatically formed in the self-stratifying or self-gradating type photocatalyst composition with respect to the concentration of the modified photocatalyst particles, wherein the concentration of the modified photocatalyst particles in the resultant film or shaped article increases from the inner portion thereof (in the case of the film, the "inner portion" means the surface contacting the substrate, and in the case of the shaped article, the "inner portion" means the central portion thereof) toward the exposed surface thereof. The property to cause such a phenomenon is hereinafter, frequently referred to as "self-stratifying or self-gradating property". With respect to the film or shaped article obtained from the self-stratifying or self-gradating type modified photocatalyst composition, the amount of the modified photocatalyst particles at the exposed surface thereof is from 5 to 100% by weight, preferably from 50 to 100% by weight, based on the total weight of the modified photocatalyst particles, and the amount of the modified photocatalyst particles in the inner portion thereof is 0 to 50% by weight, preferably 0 to 10% by weight, based on the total weight of the modified photocatalyst particles. Further, the concentration ratio of the modified photocatalyst particles at the exposed surface to the modified photocatalyst particles at the inner portion is 1.5 or more.

For achieving the above-mentioned self-stratifying or self-gradating property, it is important that the volume mean particle diameter of the modified photocatalyst particles be 800 nm or less. When the volume mean average particle diameter is more than 800 nm, the self-stratifying or self-gradating property of the modified photocatalyst sol becomes very low. In the self-stratifying or self-gradating type modified photocatalyst composition of the present invention, it is preferred that the volume mean particle diameter of the modified photocatalyst particles is 200 nm or less, more advantageously from 1 nm to 100 nm, still more advantageously from 5 nm to 50 nm.

With respect to the self-stratifying or self-gradating type modified photocatalyst composition of the present invention, it is considered that the low surface energy of the modified photocatalyst due to the above-mentioned structural units (1) to (3) is one of the factors which cause the modified photocatalyst of the present invention to exhibit the self-stratifying or self-gradating property. This means that the functional substance used in the self-stratifying or self-gradating type modified photocatalyst composition of the present invention needs to have a surface energy larger than that of each modified photocatalyst particle, preferably by 2 dyne/cm or more.

The above-mentioned surface energy of each of the modified photocatalyst and the functional substance can be measured, for example, by the following method. The surface energy is measured using films or shaped articles (such as a structural part), which are, respectively, produced from the modified photocatalyst sol and the functional substance. Specifically, deionized water was dripped onto the surface of the film or the shaped article. Then, the contact angle (e) of the water, relative to the surface of the film or the shaped article, is measured at 20° C., and the surface energy of the film or the shaped article is calculated from the contact angle using the following Sell and Neumann's empirical formula:

$$\cos\theta = \frac{(0.015\gamma s - 2) \times \sqrt{\gamma s \times \gamma l} + \gamma l}{\gamma l \times (0.015 \times \sqrt{\gamma s \times \gamma l} - 1)}$$

wherein γs represents the surface energy (dyne/cm) of the film or shaped article (which is used for measuring the contact angle of water) and γl represents the surface energy of water, i.e., 72.8 dyne/cm (20° C.).

With respect to the functional substance (having a high surface energy) used in the self-stratifying or self-gradating type modified photocatalyst composition of the present invention, there is no particular limitation, and various monomers, synthetic resins, natural resins and the like can be used, as long as the functional substance has a high surface energy satisfying the above-mentioned requirement. Hereinafter, such a functional substance is referred to as a "high surface energy substance". The high surface energy substance may be a substance which is curable by drying, heating, moisture absorption, light irradiation or the like after the formation of a film or a shaped article.

It is preferred that the high surface energy substance used in the above-mentioned self-stratifying or self-gradating type modified photocatalyst composition of the present invention is a composition which contains a component insusceptive to decomposition by the action of the modified photocatalyst (hereinafter referred to as "indecomposable component"), and which, when formulated into a film or a shaped article, is capable of providing a structure wherein the concentration of the indecomposable component increases from the inner portion toward the exposed surface. Examples of such compositions include a silicone resin composition and a fluoro resin composition. These compositions can be used independently or in combination.

As examples of the above-mentioned silicone resin compositions and fluoro resin compositions, there can be mentioned a composition comprising a fluoro resin and/or an acrylic resin and 0.1 to 50% by weight of an alkoxysilane, an organoalkoxysilane and/or a hydrolysis-condensation product (polysiloxane) of an alkoxysilane and/or organoalkoxysilane, such as the composition proposed in Unexamined Japanese Patent Application Laid-Open Specification No. 10-72569. These resin compositions may contain an additive, such as a crosslinking agent, a catalyst and the like.

Further, with respect to the form of the self-stratifying or self-gradating type modified photocatalyst composition, there is no particular limitation. For example, the self-stratifying or self-gradating type modified photocatalyst composition may be either in a pellet form or in the form of a solution thereof or a dispersion thereof in a solvent. It is most preferred that the self-stratifying or self-gradating type modified photocatalyst composition is in the form of a coating composition containing a resin.

It is preferred that, in the self-stratifying or self-gradating type modified photocatalyst composition of the present invention, the ratio of the weight (in terms of the weight of the solids content) of (C') the modified photocatalyst to the weight of (D') the high surface energy compound, i.e., (C')/(D') weight ratio, is from 0.0001 to 10, more advantageously from 0.001 to 1. Even if the content of the modified photocatalyst is very small so that the (C')/(D') weight ratio is from 0.0001 to 0.2, the film or shaped article formed from the above-mentioned modified photocatalyst composition can exhibit satisfactory properties with respect to the photocatalyst activity and/or the hydrophilicity or hydrophobicity when irradiated with light.

The film obtained from the self-stratifying or self-gradating type modified photocatalyst composition has a structure wherein the modified photocatalyst particles exhibit a concentration gradient in which the concentration of the particles increases from the inside film surface (in contact with the substrate) toward the outside film surface. Such a film exhibits good adhesion to a substrate, so that the film can provide a functional composite which exhibits extremely excellent durability and photocatalyst activity.

In the present invention, modified photocatalyst particles having a volume mean particle diameter of 800 nm or less, which are obtained by removing the liquid medium from the modified photocatalyst sol, may be mixed with the above-mentioned high surface energy compound to thereby obtain a modified photocatalyst composition having a self-stratifying or self-gradating property with respect to the distribution of the modified photocatalyst particles. Such a composition can be easily handled mainly in a pellet form and is very suitable for obtaining a shaped article having a structure wherein the modified photocatalyst particles exhibit a concentration gradient in which the concentration of the modified photocatalyst particles increases from the inner portion of the shaped article toward the surface portion of the shaped article.

An explanation is made below with respect to the method for obtaining a film or shaped article from the above-mentioned modified photocatalyst sol, the modified photocatalyst composition comprising the modified photocatalyst sol and a functional substance, or the self-stratifying or self-gradating type modified photocatalyst composition comprising the modified photocatalyst (obtained from the modified photocatalyst sol) and a compound having a surface energy larger than that of the modified photocatalyst. For example, when each of the above-mentioned sol and compositions is provided in the form of a coating composition, the coating composition is applied onto a substrate and dried and, then, if desired, subjected to heat treatment or the like to thereby obtain a functional composite which exhibits desired properties when irradiated with light, wherein the desired properties include hydrophilicity or hydrophobicity, photocatalyst activity and a photoelectric conversion function. Examples of methods for applying the coating composition onto a substrate include a spray coating method, a flow coating method, a roll coating method, a brush coating method, a dip coating method, a spin coating method, a screen printing method, a casting method, a gravure printing method and a flexographic printing method.

Further, when the form of the modified photocatalyst composition (including the self-stratifying or self-gradating type thereof) is a pellet, the pellet is subjected to extrusion molding, injection molding, press molding or the like to thereby obtain a shaped article which exhibits desired properties when irradiated with light, wherein the desired properties include hydrophilicity or hydrophobicity, photocatalyst activity and a photoelectric conversion function.

When the film or shaped article obtained from the modified photocatalyst sol or the modified photocatalyst composition of the present invention (including the self-stratifying or self-gradating type thereof) is irradiated with light having energy which is larger than the band gap energy of the photocatalyst contained therein (wherein, in the case where the modified photocatalyst contains a sensitizing dye, the above-mentioned light may be absorbed by the sensitizing dye), the film or shaped article exhibits desired properties, such as hydrophilicity or hydrophobicity, photocatalyst activity and a photoelectric conversion function.

In the film or shaped article obtained from the modified photocatalyst sol or the modified photocatalyst composition of the present invention (including the self-stratifying or self-gradating type thereof), modifier compound-derived moieties are present on the surface of the modified photocatalyst particles, wherein the modifier compound-derived moieties comprise a structural unit having a molecular skeleton which is not decomposed by the photocatalyst activity (which structural unit is represented by at least one of the above-mentioned formulae (1) to (3)), so that a resin which is contained (as a binder or a structural material) in the film or shaped article is not degraded by the photocatalyst activity.

Further, when a modifier compound having the structural unit represented by the above-mentioned formula (3) is used, a film or structural material having a very high hydrophobicity can be obtained from the modified photocatalyst sol or the modified photocatalyst composition (including the self-stratifying or self-gradating type thereof).

In the present invention, as examples of light having energy which is larger than the band gap energy of the photocatalyst and light which can be absorbed by a sensitizing dye, there can be mentioned light obtained in the general residential environment (such as sunlight and room light), black light, and light emitted from a xenon lamp or a mercury lamp or the like.

Further, if desired, additives generally added to conventional coating compositions and the like may be chosen according to various purposes and added to the modified photocatalyst sol or the modified photocatalyst composition of the present invention (including the self-stratifying or self-gradating type modified photocatalyst composition). Examples of these additives include a pigment, a filler, a dispersant, a light stabilizer, a wetting agent, an antifoaming agent, a plasticizer, a film-forming auxiliary, a rust preventive agent, a dye, a preservative and the like. Such additives can be used individually or in combination.

Each of a shaped article formed from the modified photocatalyst sol or the modified photocatalyst composition of the present invention (including the self-stratifying or self-gradating type modified photocatalyst composition), and a functional composite obtained by forming a film on a substrate wherein the film comprises the modified photocatalyst sol or the modified photocatalyst composition (including the self-stratifying or self-gradating type thereof), can exhibit desired properties, such as hydrophilicity or hydrophobicity, photocatalyst activity and a photoelectric conversion function. Therefore, in another aspect of the present invention, there are provided a shaped article formed from the modified photocatalyst sol or the modified photocatalyst composition (including the self-stratifying or self-gradating type modified photocatalyst composition), and a functional composite obtained by forming a film on a substrate wherein the film comprises the modified photocatalyst sol or the modified photocatalyst composition (including the self-stratifying or self-gradating type modified photocatalyst composition).

When the above-mentioned shaped article or functional composite provided in the present invention exhibits a photocatalyst activity, such as the activity to decompose organic substances, such a shaped article or functional composite exhibits various functions, such as an antibacterial function, a staining resistance function, a smell preventive function and an Nox-decomposing function. Therefore, such a shaped article or functional composite can be used in various fields, such as environmental clean-up, for example, clean-up of the atmosphere, water or the like.

When the above-mentioned shaped article or functional composite provided in the present invention has a characteristic that, when its surface is irradiated with light, water exhibits a contact angle against the surface of 60° or less (preferably 10° or less) at 20° C., i.e., the surface exhibits hydrophilicity, such a shaped article or functional composite (a hydrophilic shaped article or hydrophilic film, and a substrate covered with a hydrophilic film) can be utilized in, for example, the techniques for preventing fogging from occurring on a mirror or a glass, the techniques for preventing dirt from adhering to a building exterior, the antistatic techniques or the like. Therefore, the shaped article or functional composite can be advantageously used in various application fields, such as a window glass, a mirror, a lens, a goggle, a cover, an insulator, a building material, an building exterior, an building interior, a structural member, an exterior and a coating for vehicles, an exterior for machines and other articles, various display apparatuses, lighting equipment, residential equipment, tableware, kitchenware, household electric appliances, magneto-optical memory media, optical memory media, and the like.

When the above-mentioned shaped article or functional composite provided in the present invention has a characteristic that, when its surface is irradiated with light, water exhibits a contact angle against the surface of 70° or more (preferably 90° or more) at 20° C., i.e., the surface exhibits hydrophobicity, such a shaped article or functional composite (a hydrophobic shaped article or hydrophobic film, and a substrate covered with a hydrophobic film) can be utilized in, for example, the techniques for imparting water-repellent properties, the techniques for preventing adhesion of aqueous dirt, the techniques for preventing dirt adhesion by washing with a flow of water, and the techniques for preventing adhesion of ice and snow. Therefore, the shaped article or functional composite can be advantageously used in various application fields, such as a window glass, a windshield, a mirror, a lens, a goggle, a cover, an insulator, a building material, a building exterior, a building interior, a structural member, an exterior and a coating for vehicles, an exterior for machines and other articles, various display apparatuses, lighting equipment, residential equipment, tableware, kitchenware, household electric appliances, a roofing material, an antenna, an electricity transmission cable, equipment for sliding on ice and snow, and the like.

When the above-mentioned shaped article or functional composite provided in the present invention exhibits a photoelectric conversion function, such a shaped article or functional composite can convert, for example, solar energy into electric power. Therefore, such a shaped article or functional composite can be used in various application fields, such as an optical semiconductor electrode used for a wet-type solar cell or the like.

Further, with respect to a member provided in the present invention which member has a characteristic that its wettability with respect to water can be changed by light irradiation (change from hydrophobic to hydrophilic or change from hydrophilic to hydrophobic), such a member can be very advantageously used in, for example, an offset printing plate.

BEST MODE FOR CARRYING OUT THE INVENTION

The present invention will be described in more detail with reference to the following Examples, Reference Examples and Comparative Examples, which should not be construed as limiting the scope of the present invention.

In the Examples, Reference Examples and Comparative Examples, various properties were measured and evaluated as follows.

(1) Measurement of the Volume Mean Particle Diameter:

An appropriate amount of a solvent was added to a sample sol or composition containing particles so that the sample was diluted to have a solids content of from 1 to 20% by weight. With respect to the resultant diluted sample, the volume mean particle diameter of the particles contained therein was measured by means of a wet-type particle size analyzer (Microtrac UPA-9230, manufactured and sold by Nikkiso Co., Ltd., Japan).

(2) Measurement of the Weight Average Molecular Weight:

The weight average molecular weight was measured by gel permeation chromatography (GPC), utilizing a calibration curve obtained with respect to standard dimethyl silicone samples.

The GPC was conducted under the following conditions.

Apparatus: chromatograph model HLC-8020 LC-3A (manufactured and sold by Tosoh Corporation, Japan);

Columns: TSKgel G1000H$_{XL}$, TSKgel G2000H$_{XL}$ and TSKgel G4000H$_{XL}$ (each of which is manufactured and sold by Tosoh Corporation, Japan), connected in series;

Data processor: data processor model CR-4A (manufactured and sold by Shimadzu Corporation, Japan);

Eluent: chloroform;

Flow rate: 1.0 ml/min;

Method for preparing a sample for GPC:

A sample compound to be analyzed by GPC was dissolved in an appropriate amount of chloroform so that the concentration of the sample compound in the resultant solution fell within the range of from 0.5 to 2% by weight, thereby obtaining a sample solution. The obtained sample solution was subjected to GPC.

(3) Infrared Absorption (IR) Spectrum:

IR spectrum was obtained by means of infrared spectrometer model FT/IR-5300 (manufactured and sold by Japan Spectroscopic Co., Ltd., Japan).

(4) Measurement of the Viscosity:

The viscosity was measured using a Brookfield viscometer equipped with a rotor (No. 2) under conditions wherein the revolution speed of the rotor was 60 rpm and the temperature was 20° C.

(5) Measurement of the Surface Energy of a Film or Shaped Article:

The contact angle (θ) of water against the surface of a film or shaped article was measured by the method described in item (7) below. From the obtained contact angle, the surface energy of the film or shaped article was calculated, using the following Sell and Neumann's empirical formula:

$$\cos\theta = \frac{(0.015\gamma s - 2) \times \sqrt{\gamma s \times \gamma l} + \gamma l}{\gamma l \times (0.015 \times \sqrt{\gamma s \times \gamma l} - 1)}$$

wherein γs represents the surface energy (dyne/cm) of the film or shaped article, and γl represents the surface energy of water, i.e., 72.8 dyne/cm (20° C.).

(6) Measurement of the Distribution of a Modified Photocatalyst in a Coating:

A modified photocatalyst composition was cast on a film for an overhead projector (hereinafter referred to as "OHP film") so as to have a coating thickness of 20 μm. The OHP film having formed thereon a coating was dried at room temperature for 2 days and, then, subjected to heat-drying at 50° C. for 3 days, to thereby obtain a smooth coating on the surface of the OHP film.

The OHP film (carrying the coating) was embedded in an epoxy resin by using Quetol 812 set (manufactured and sold by NISSHIN EM CO., LTD, Japan). The OHP film embedded in the epoxy resin was cut together with the coating (and epoxy resin), and the resultant cross-sections of the OHP film and coating were analyzed by means of an energy-dispersive X-ray spectrometer (X-ray spectrometer model DX-4, manufactured and sold by Nihon Philips Corporation, Japan). The distribution of the modified photocatalyst in the coating was evaluated based on the concentrations (measured by the X-ray spectrometer) of the modified photocatalyst at various portions of the cross-section of the coating.

(7) Measurement of the Contact Angle of Water Against the Surface of a Film or Shaped Article:

A drop of deionized water was placed on the surface of a film or shaped article and allowed to stand at 20° C. for 1 minute. Then, the contact angle of the water drop against the surface of the film or shaped article was measured by means of Contact Angle Meter model CA-X150, manufactured and sold by KYOWA INTERFACE SCIENCE CO., LTD, Japan.

The smaller the contact angle of water against the surface of the film or shaped article, the more hydrophilic the surface of the film or shaped article.

(8) How the Hydrophilicity or Hydrophobicity of the Surface of a Film or Shaped Article is Changed by Ultraviolet Light Irradiation:

The surface of a film or shaped article was irradiated with ultraviolet light (hereinafter referred to as "UV") emitted from FL20S BLB black light (manufactured and sold by TOSHIBA LIGHTING AND TECHNOLOGY CO., LTD., Japan) for 1 day or 3 days, and the contact angle of water against the surface of the film or shaped article was measured by the method described in item (7) above. The obtained contact angle was compared to that obtained prior to the UV irradiation.

With respect to the UV irradiation, the intensity of UV was adjusted to 1 mW/cm$^2$, as measured by means of UV Radiometer Model UVR-2 (manufactured and sold by TOPCON CO., LTD., Japan), which was used in combination with Detector Model UD-36 (manufactured and sold by TOPCON CO., LTD., Japan), which is a photodetector for detecting light having a wavelength of from 310 to 400 nm.

(9) How the Hydrophilicity or Hydrophobicity of the Surface of a Film or Shaped Article is Changed by Sunlight Irradiation:

The surface of a film or shaped article was irradiated with sunlight for 3 hours, and the contact angle of water against the surface of the film or shaped article was measured by the method described in item (7) above. The obtained contact angle was compared to that obtained prior to the irradiation.

The sunlight irradiation was conducted using sunlight transmitted through a glass plate so that the intensities of UV and visible light contained in the sunlight were adjusted to 0.3 mW/cm$^2$ and 3 mW/cm$^2$, respectively, wherein the intensity of UV was measured by means of the above-mentioned UV Radiometer Model UVR-2 used in combination with the above-mentioned photodetector Model UD-36, and the intensity of visible light was measured by means of the above-mentioned UV Radiometer Model UVR-2 used in combination with Detector Model UD-40 (manufactured and sold by TOPCON CO., LTD., Japan), which is a photodetector for detecting light having a wavelength of from 370 to 490 nm.

(10) How the Hydrophilicity or Hydrophobicity of the Surface of a Film or Shaped Article is Changed by Irradiation with Light Containing Almost no UV:

The surface of a film or shaped article was irradiated with light containing almost no UV, which was emitted from an FL20S•N-SDL NU fluorescence lamp (manufactured and sold by TOSHIBA LIGHTING AND TECHNOLOGY CO., LTD., Japan), for 24 hours. (The spectral energy distribution of this light is shown in FIG. 1. FIG. 1 shows that this light contains visible light having a wavelength of from 380 to 390 nm but contains almost no UV (i.e., light having a wavelength of less than 380 nm).) Subsequently, the contact angle of water against the surface of the film or shaped article was measured by the method described in item (7) above. The obtained contact angle was compared to that obtained prior to the irradiation.

With respect to the irradiation with light containing almost no UV, the intensity of visible light contained in the light was adjusted to 0.3 mW/cm$^2$, as measured by means of the above-mentioned UV Radiometer Model UVR-2 used in combination with the above-mentioned Detector Model UD-40).

(11) Evaluation of the Photocatalyst Activity Exhibited at the Surface of a Film or Shaped Article:

A 5% by weight ethanol solution of methylene blue was coated on the surface of a film or shaped article, and the resultant coating was irradiated with UV emitted from the above-mentioned FL20S BLB black light for 5 days.

With respect to the UV irradiation, the intensity of UV was adjusted to 1 mW/cm$^2$, as measured by means of the above-mentioned UV Radiometer Model UVR-2 used in combination with the above-mentioned Detector Model UD-36.

The surface of the film or shaped article after the UV irradiation was visually observed with respect to the degree of fading of the blue color of methylene blue (in other words, the degree of decomposition of methylene blue by the action of the photocatalyst).

The photocatalyst activity exhibited at the surface of the film or shaped article was evaluated, based on the degree of decomposition of methylene blue, by the following 3 criteria:

⊚: methylene blue is completely decomposed;

Δ: blue color of methylene blue slightly remains; and

X: almost no decomposition of methylene blue is observed.

(12) Solvent Resistance of a Film:

A modified photocatalyst composition was spray-coated on a glass plate in a thickness of 30 Mm. The coated glass plate was dried at room temperature for 1 week, thereby forming a transparent and smooth film on the surface of the glass plate.

The film was peeled off from the glass plate, and put into a wire mesh bag (wherein the wire mesh was of 200-mesh size), and the wire mesh bag containing the film was immersed in acetone at room temperature for 24 hours.

The retention ratio of the weight of the film was calculated by the following formula:

$$\begin{array}{r}\text{Retention ratio}\\\text{of the weight}\\\text{of the film}\end{array} = 100 \times \frac{\text{Weight of the film after immersion in acetone}}{\text{Weight of the film prior to immersion in acetone}}$$

The higher the retention ratio of the weight of the film, the higher the solvent resistance of the film.

REFERENCE EXAMPLE 1

Synthesis of Water-Soluble Silicon Compound (1) Containing an Si—H Group 500 g of dioxane and 500 g of KF9901 (trade name of a methylhydrogensiloxane-dimethylsiloxane copolymer; Si—H group content: 7.14 mmol/g which is a value described in the catalog, weight average molecular weight: 3,900) (manufactured and sold by Shin-Etsu Chemical Co., Ltd., Japan) were charged into a reactor equipped with a reflux condenser, a thermometer and a stirrer, and the resultant mixture in the reactor was heated to 80° C. while stirring.

1,370 g of Uniox MUS-8 (trade name of a polyoxyethylene allyl methyl ether; weight average molecular weight: 800 which is a value described in the catalog) (manufactured and sold by Nippon Oil & Fats Co., Ltd., Japan) and 5 g of a 5% by weight isopropanol solution of hydrogen hexachloroplatinate(IV) hexahydrate were dissolved in 2,310 g of dioxane. The resultant solution was charged into the above-mentioned reactor over approximately one hour at 80° C. while stirring, and the resultant mixture in the reactor was stirred at 80° C. for 2 hours and, then, cooled to room temperature, thereby obtaining a solution of silicon compound (1) containing an Si—H group (hereinafter referred to simply as "compound (1)").

When 100 g of water was added to 4 g of the above-obtained solution of compound (1), the resultant aqueous mixture was homogeneous and transparent.

On the other hand, 8 g of butyl cellosolve was added to and mixed with 4 g of the solution of compound (1), and, then, 8 ml of a 1 N aqueous sodium hydroxide solution was added thereto, so that hydrogen gas was generated, and the volume of the generated hydrogen gas was 37 ml as measured at 23° C. The Si—H group content of compound (1), as calculated from the volume of the generated hydrogen gas, was 0.36 mmol per g of the solution of compound (1) (approximately 3.5 mmol per g of KF9901).

REFERENCE EXAMPLE 2

Synthesis of Silicon Compound (2) Containing an Si—H Group, which is Self-Emulsifiable in Water 170 g of dioxane and 100 g of HMS-301-100GM (trade name of a methylhydrogensiloxane-dimethylsiloxane copolymer; Si—H group content: 4.523 mmol/g, weight average molecular weight: 5,400) (manufactured and sold by CHISSO Corporation, Japan) were charged into a reactor equipped with a reflux condenser, a thermometer and a stirrer, and the resultant mixture in the reactor was heated to 80° C. while stirring.

50 g of Uniox MUS-8 (which is the same as in Reference Example 1 above), 25 g of 5-norbornene-2,3-dicarboxylic anhydride and 1.07 g of a 5% by weight isopropanol solution of hydrogen hexachloroplatinate (IV) hexahydrate were dissolved in 170 g of dioxane. The resultant solution was charged into the above-mentioned reactor over approximately one hour at 80° C. while stirring, and the resultant mixture in the reactor was stirred at 80° C. for 3 hours and, then, cooled to room temperature, thereby obtaining a solution of silicon compound (2) containing an Si—H group (hereinafter referred to simply as "compound (2)").

When 100 g of water was added to 4 g of the above-obtained solution of compound (2), the resultant aqueous mixture was a dispersion which was slightly white turbid.

On the other hand, 8 g of butyl cellosolve was added to and mixed with 2.119 g of the solution of compound (2), and, then, 8 ml of a 1 N aqueous sodium hydroxide solution was added thereto, so that hydrogen gas was generated, and the volume of the generated hydrogen gas was 31.0 ml as measured at 22° C. The Si—H group content of compound (2), as calculated from the volume of the generated hydrogen gas, was 0.588 mmol per g of the solution of compound (2) (approximately 2.58 mmol per g of HMS-301-100GM).

EXAMPLE 1

200 g of Tinoc A-6 (trade name of an ammonia-peptized sol of anatase-type titanium oxide; volume mean particle diameter of particles dispersed in the sol: 13 nm, $TiO_2$ content: 6% by weight, average crystallite diameter: 10 nm which is a value described in the catalog) (manufactured and sold by TAKI CHEMICAL CO., LTD., Japan) was charged into a reactor equipped with a reflux condenser, a thermometer and a stirrer. Subsequently, 12.5 g of the solution of compound (1) obtained in Reference Example 1 was charged into the reactor over approximately 30 minutes at 30° C. while stirring, and the resultant mixture in the reactor was stirred for 3 hours at 30° C. to effect a reaction of Tinoc A-6 with compound (1) and modify the $TiO_2$ particles of Tinoc A-6 to thereby obtain a sol containing particles of modified titanium oxide (hereinafter referred to as "modified $TiO_2$ particles") well dispersed therein, wherein the volume mean particle diameter of the modified $TiO_2$ particles was 20 nm. During the reaction of Tinoc A-6 with compound (1), hydrogen gas was generated. The volume of the generated hydrogen gas was 125 ml as measured at 23° C.

The obtained sol was applied onto a KRS-5 plate to thereby form a film on the plate, and the film was dried at 50° C. for 2 hours. The resultant dry film was taken as a sample, and subjected to IR spectrometry. The IR spectrum obtained by the spectrometry showed that the absorption at 3,630 to 3,640 $cm^{-1}$ ascribed to a hydroxyl group directly bonded to a Ti atom (hereinafter referred to as "Ti—OH group") of $TiO_2$ particles in Tinoc A-6 disappeared, wherein the above-mentioned absorption had been observed in the IR spectrum of $TiO_2$ prior to the modification of the $TiO_2$ particles.

When the obtained sol was allowed to stand still at 30° C. for 100 days, the volume mean particle diameter of the modified $TiO_2$ particles was still as small as 23 nm.

The obtained sol was spray-coated on a glass plate in a thickness of 2 μm. The coated glass plate was dried at room temperature for one week, thereby forming a transparent and smooth film on the surface of the glass plate. The surface of the film was evaluated by examining how the hydrophilicity or hydrophobicity of the film surface was changed by UV irradiation (specifically, the evaluation was made with respect to the change in the contact angle of water against the film surface). The surface of the film was also evaluated with respect to the photocatalyst activity. The results are shown in Table 1.

EXAMPLE 2

200 g of Nanotitania NTB-1 (trade name of a hydrochloric acid-peptized sol of brookite-type titanium oxide; volume mean particle diameter of particles dispersed in the sol: 8 nm, $TiO_2$ content: 15% by weight) (manufactured and sold by Showa Denko K.K., Japan) was charged into a reactor equipped with a reflux condenser, a thermometer and a stirrer. Subsequently, 70.2 g of the solution of compound (1) obtained in Reference Example 1 was charged into the reactor over approximately 30 minutes at 30° C. while stirring, and the resultant mixture in the reactor was stirred for 10 hours at 30° C. to effect a reaction of Nanotitania NTB-1 with compound (1) and modify the $TiO_2$ particles of Nanotitania NTB-1 to thereby obtain a sol containing modified $TiO_2$ particles well dispersed therein, wherein the volume mean particle diameter of the modified $TiO_2$ particles was 15 nm. During the reaction of Nanotitania NTB-1 with compound (1), hydrogen gas was generated. The volume of the generated hydrogen gas was 274 ml as measured at 23° C.

An IR spectrum was obtained in substantially the same manner as in Example 1. The obtained IR spectrum showed that the absorption ascribed to a Ti—OH group of $TiO_2$ particles in Nanotitania NTB-1 disappeared, wherein the above-mentioned absorption had been observed in the IR spectrum of $TiO_2$ prior to the modification of the $TiO_2$ particles.

When the obtained sol was allowed to stand still at 30° C. for 100 days, the volume mean particle diameter of the modified $TiO_2$ particles was still as small as 21 nm.

Using the obtained sol, a transparent and smooth film was formed on the surface of a glass plate in substantially the same manner as in Example 1. The surface of the film was evaluated by examining how the hydrophilicity or hydrophobicity of the film surface was changed by UV irradiation. The surface of the film was also evaluated with respect to the photocatalyst activity. The results are shown in Table 1.

EXAMPLE 3

420 g of TO-240 (trade name of a sol of anatase-type titanium oxide (wherein the surface of each $TiO_2$ particle dispersed in the sol is modified with peroxo groups); volume mean particle diameter of particles dispersed in the sol: 15 nm, $TiO_2$ content: 2.4% by weight) (manufactured and sold by TANAKA TENSHA CO., LTD., Japan) was charged into a reactor equipped with a reflux condenser, a thermometer and a stirrer. Subsequently, 23.4 g of the solution of compound (1) obtained in Reference Example 1 was charged into the reactor over approximately 30 minutes at 30° C. while stirring, and the resultant mixture in the reactor was stirred for 10 hours at 30° C. to effect a reaction of TO-240 with compound (1) and modify the $TiO_2$ particles of TO-240 to thereby obtain a sol containing modified $TiO_2$ particles well dispersed therein, wherein the volume mean particle diameter of the modified $TiO_2$ particles was 17 nm. During the reaction of TO-240 with compound (1), hydrogen gas was generated. The volume of the generated hydrogen gas was 67.5 ml as measured at 23° C.

When the obtained sol was allowed to stand still at 30° C. for 100 days, the volume mean particle diameter of the modified $TiO_2$ particles was still as small as 17 nm.

Using the obtained sol, a transparent and smooth film was formed on the surface of a glass plate in substantially the same manner as in Example 1. The surface of the film was evaluated by examining how the hydrophilicity or hydrophobicity of the film surface was changed by UV irradiation. The surface of the film was also evaluated with respect to the photocatalyst activity. The results are shown in Table 1.

EXAMPLE 4

316 g of Jupiter F6-APS (trade name of a sol of anatase-type titanium oxide (wherein the surface of each $TiO_2$ particle dispersed in the sol is modified with an apatite); volume mean particle diameter of particles dispersed in the sol: 36 nm, $TiO_2$ content: 23.7% by weight) (manufactured and sold by Showa Denko K.K., Japan) was charged into a reactor equipped with a reflux condenser, a thermometer and a stirrer. Subsequently, 78 g of the solution of compound (1) obtained in Reference Example 1 was charged into the reactor over approximately 30 minutes at 30° C. while stirring, and the resultant mixture in the reactor was stirred for 10 hours at 30° C. to effect a reaction of Jupiter F6-APS with compound (1) and modify the $TiO_2$ particles of Jupiter F6-APS to thereby obtain a sol containing modified $TiO_2$ particles well dispersed therein, wherein the volume mean particle diameter of the modified $TiO_2$ particles was 61 nm. During the reaction of Jupiter F6-APS with compound (1), hydrogen gas was generated. The volume of the generated hydrogen gas was 85.7 ml as measured at 23° C.

An IR spectrum was obtained in substantially the same manner as in Example 1. The obtained IR spectrum showed that the absorption ascribed to a Ti—OH group of $TiO_2$ particles in Jupiter F6-APS disappeared, wherein the above-mentioned absorption had been observed in the IR spectrum of $TiO_2$ prior to the modification of the $TiO_2$ particles.

When the obtained sol was allowed to stand still at 30° C. for 100 days, the volume mean particle diameter of the modified $TiO_2$ particles was still as small as 80 nm.

Using the obtained sol, a transparent and smooth film was formed on the surface of a glass plate in substantially the same manner as in Example 1. The surface of the film was evaluated by examining how the hydrophilicity or hydrophobicity of the film surface was changed by UV irradiation. The surface of the film was also evaluated with respect to the photocatalyst activity. The results are shown in Table 1.

EXAMPLE 5

100 g of STS-02 (trade name of a hydrochloric acid-peptized sol of anatase-type titanium oxide; volume mean particle diameter of particles dispersed in the sol: 18 nm, $TiO_2$ content: 30% by weight, average crystallite diameter: 7 nm which is a value described in the catalog, viscosity: 175 cps) (manufactured and sold by Ishihara Sangyo Kaisha, Ltd., Japan) and 50 g of water were charged into a reactor equipped with a reflux condenser, a thermometer and a stirrer, and the resultant mixture in the reactor was heated to 50° C. while stirring. Subsequently, 31 g of the solution of compound (1) obtained in Reference Example 1 was charged into the reactor over approximately 30 minutes at 50° C. while stirring, and the resultant mixture in the reactor was stirred for 3 hours at 50° C. to effect a reaction of STS-02 with compound (1) and modify the $TiO_2$ particles of STS-02 and, then, cooled to room temperature, to thereby obtain a sol containing modified $TiO_2$ particles well dispersed therein, wherein the volume mean particle diameter of the modified $TiO_2$ particles was 49 nm. During the reaction of STS-02 with compound (1), hydrogen gas was generated. The volume of the generated hydrogen gas was 200 ml as measured at 24° C.

An IR spectrum was obtained in substantially the same manner as in Example 1. The obtained IR spectrum showed that the absorption ascribed to a Ti—OH group of $TiO_2$ particles in STS-02 disappeared, wherein the above-mentioned absorption had been observed in the IR spectrum of $TiO_2$ prior to the modification of the $TiO_2$ particles.

48 g of butyl cellosolve was added to 44 g of the above-obtained sol at room temperature (23° C.) over approximately 10 minutes while stirring, and the resultant mixture was subjected to evaporation under reduced pressure using an evaporator so as to remove the water in the mixture. Subsequently, an appropriate amount of butyl cellosolve was added to the mixture so that the solids content of the resultant mixture became 6% by weight, to thereby obtain an organosol comprising butyl cellosolve (as a dispersion medium) having well dispersed therein modified $TiO_2$ particles, wherein the volume mean particle diameter of the modified $TiO_2$ particles was 53 nm.

When 10 g of the obtained organosol was diluted with 10 g of toluene and allowed to stand still at room temperature for 6 months, the organosol was stable and there was no occurrence of an aggregation of the modified $TiO_2$ particles.

On the other hand, using the obtained organosol, a transparent and smooth film was formed on the surface of a glass plate in substantially the same manner as in Example 1. The surface of the film was evaluated by examining how the hydrophilicity or hydrophobicity of the film surface was changed by UV irradiation. The surface of the film was also evaluated with respect to the photocatalyst activity. The results are shown in Table 1.

EXAMPLE 6

300 g of Tinoc A-6 (which is the same as in Example 1) was charged into a reactor equipped with a reflux condenser, a thermometer and a stirrer. Subsequently, 8.8 g of the solution of compound (2) obtained in Reference Example 2 was charged into the reactor over approximately 30 minutes at 30° C. while stirring, and the resultant mixture in the reactor was stirred for 24 hours at 30° C. to effect a reaction of Tinoc A-6 with compound (2) and modify the $TiO_2$ particles of Tinoc A-6 to thereby obtain a sol containing modified $TiO_2$ particles well dispersed therein, wherein the volume mean particle diameter of the modified $TiO_2$ particles was 48 nm. During the reaction of Tinoc A-6 with compound (2), hydrogen gas was generated. The volume of the generated hydrogen gas was 93 ml as measured at 23° C.

An IR spectrum was obtained in substantially the same manner as in Example 1. The obtained IR spectrum showed that the absorption ascribed to a Ti—OH group of $TiO_2$ particles in Tinoc A-6 disappeared, wherein the above-mentioned absorption had been observed in the IR spectrum of $TiO_2$ prior to the modification of the $TiO_2$ particles. Further, the IR spectrum also confirmed that the cyclic acid anhydride groups (derived from 5-norbornene-2,3-dicarboxylic anhydride used for producing compound (2)) were cleaved by ring-opening reaction.

When the obtained sol was allowed to stand still at 30° C. for 100 days, the volume mean particle diameter of the modified $TiO_2$ particles was still as small as 78 nm.

Using the obtained sol, a transparent and smooth film was formed on the surface of a glass plate in substantially the same manner as in Example 1. The surface of the film was evaluated by examining how the hydrophilicity or hydrophobicity of the film surface was changed by UV irradiation. The surface of the film was also evaluated with respect to the photocatalyst activity. The results are shown in Table 2.

EXAMPLE 7

300 g of Tinoc A-6 (which is the same as in Example 1) was charged into a reactor equipped with a reflux condenser, a thermometer and a stirrer. Subsequently, 19.7 g of the solution of compound (2) obtained in Reference Example 2 was charged into the reactor over approximately 30 minutes at 30° C. while stirring, and the resultant mixture in the reactor was stirred for 24 hours at 30° C. to effect a reaction of Tinoc A-6 with compound (2) and modify the $TiO_2$ particles of Tinoc A-6 to thereby obtain a sol containing modified $TiO_2$ particles well dispersed therein, wherein the volume mean particle diameter of the modified $TiO_2$ particles was 190 nm. During the reaction of Tinoc A-6 with compound (2), hydrogen gas was generated. The volume of the generated hydrogen gas was 72 ml as measured at 23° C.

An IR spectrum was obtained in substantially the same manner as in Example 1. The obtained IR spectrum showed that the absorption ascribed to a Ti—OH group of $TiO_2$ particles in Tinoc A-6 disappeared, wherein the above-mentioned absorption had been observed in the IR spectrum of $TiO_2$ prior to the modification of the $TiO_2$ particles. Further, the IR spectrum also confirmed that the cyclic acid anhydride groups (derived from 5-norbornene-2,3-dicarboxylic anhydride used for producing compound (2)) were cleaved by a ring-opening reaction.

When the obtained sol was allowed to stand still at 30° C. for 100 days, the volume mean particle diameter of the modified $TiO_2$ particles was still as small as 198 nm.

Using the obtained sol, a transparent and smooth film was formed on the surface of a glass plate in substantially the same manner as in Example 1. The surface of the film was evaluated by examining how the hydrophilicity or hydrophobicity of the film surface was changed by UV irradiation. The surface of the film was also evaluated with respect to the photocatalyst activity. The results are shown in Table 2.

REFERENCE EXAMPLE 3

Preparation of a Sol Containing Flake-Shaped $TiO_2$ Particles 10 g of ST-21 (trade name of titanium oxide powder; average crystallite diameter: 20 nm which is a value described in the catalog) (manufactured and sold by Ishihara Sangyo Kaisha Ltd., Japan) and 7.2 g of cesium carbonate were mixed together in a mortar. The resultant mixture was transferred to a covered platinum crucible, and subjected to calcination by heating at 800° C. for 30 minutes using an electric furnace, to thereby decompose the carbonate salt. The resultant calcination product was transferred to and ground in a mortar, and, then, again calcined at 800° C. for 40 hours to thereby obtain cesium titanate ($Cs_xTi_{(2-x/4)}O_4$) (x=0.68) (orthorhombic crystalline powder).

300 g of a 1 N aqueous hydrochloric acid solution was added to 9 g of the obtained cesium titanate, and the resultant mixture was stirred at room temperature for 3 days. The resultant reaction mixture was filtered (through a 5C filter paper) to thereby obtain a residue. The obtained residue was washed with ion-exchanged water, and the washed residue was dried at 100° C. for 3 hours to thereby obtain 5.1 g of titanic acid ($H_xTi_{(2-x/4)}O_4 \cdot nH_2O$) (x=0.68) (crystalline powder), in which cesium ions in the above-obtained cesium titanate were replaced by hydrogen ions. It is known that crystals of titanic acid have a lamellar structure.

1,000 g of a 0.1 mol/l aqueous solution of tetrabutylammonium hydroxide was added to 5 g of the obtained titanic acid, and the resultant mixture was shaken at 150 rpm by means of a shaker, to thereby obtain a sol containing $TiO_2$ particles (in the form of fine flakes), wherein the volume mean particle diameter of the $TiO_2$ particles was 110 nm.

EXAMPLE 8

500 g of the sol obtained in Reference Example 3 (containing flake-shaped $TiO_2$ particles) was charged into a reactor equipped with a reflux condenser, a thermometer and a stirrer. Subsequently, 5.8 g of the solution of compound (1) obtained in Reference Example 1 was charged into the reactor over approximately 30 minutes at 30° C. while stirring, and the resultant mixture in the reactor was stirred for 10 hours at 30° C. to effect a reaction of the sol with compound (1) and modify the flake-shaped $TiO_2$ particles of the sol to thereby obtain a sol containing modified $TiO_2$ particles well dispersed therein, wherein the volume mean particle diameter of the modified $TiO_2$ particles was 120 nm. During the reaction of the sol with compound (1), hydrogen gas was generated. The volume of the generated hydrogen gas was 13.7 ml as measured at 23° C.

When the obtained sol was allowed to stand still at 30° C. for 100 days, the volume mean particle diameter of the modified $TiO_2$ particles was still as small as 143 nm.

Using the obtained sol, a transparent and smooth film was formed on the surface of a glass plate in substantially the same manner as in Example 1. The surface of the film was evaluated by examining how the hydrophilicity or hydrophobicity of the film surface was changed by UV irradiation. The surface of the film was also evaluated with respect to the photocatalyst activity. The results are shown in Table 2.

REFERENCE EXAMPLE 4

Synthesis of an Si—H Group-Containing Silicon Compound (3) which is Self-Emulsifiable in Water and has a Ladder Shaped Skeleton 1,400 g of dioxane, 25.9 g of trichlorosilane and 51.6 g of methyltrichlorosilane were charged into a reactor equipped with a reflux condenser, a thermometer and a stirrer, followed by stirring at room temperature for approximately 10 minutes. To the resultant mixture was dropwise added a mixed solvent of 14.5 g of water and 58 g of dioxane over approximately 30 minutes while stirring and maintaining the temperature at 25 to 30° C., followed by further stirring at 25 to 30° C. for approximately 30 minutes and, then, at 60° C. for 3 hours, to thereby effect a polycondensation reaction of the silanes.

The resultant reaction mixture was cooled to 25 to 30° C., followed by addition of 65.5 g of trimethylchlorosilane. To the resultant was added a mixed solvent of 5.4 g of water and 22 g of dioxane over approximately 30 minutes while stirring and maintaining the temperature at 25 to 30° C., followed by further stirring at 25 to 30° C. for approximately 2 hours, to thereby perform a further polycondensation reaction.

The resultant reaction mixture was taken out of the reactor and the solvent was distilled off at approximately 60° C. under reduced pressure, thereby obtaining an Si—H group-containing silicon compound having a ladder shaped skeleton and a weight average molecular weight of 3,900 (hereinafter referred to as a "ladder type silicon compound"). The obtained ladder type silicon compound was subjected to IR spectrometry. In the IR spectrum of this compound, absorptions at 1,130 $cm^{-1}$ and 1,050 $cm^{-1}$, which are ascribed to the ladder sheped skeleton, were observed.

0.4 g of the ladder type silicon compound obtained above was dissolved in 8 g of butyl cellosolve, and, then, 8 ml of a 1 N aqueous sodium hydroxide solution was added thereto, so that hydrogen gas was generated, and the volume of the generated hydrogen gas was 46.2 ml as measured at 24° C. The Si—H group content of the above-mentioned ladder type silicon compound, as calculated from the volume of the generated hydrogen gas, was 4.52 mmol per g of the above-mentioned ladder type silicon compound.

Subsequently, 10 g of the above-mentioned ladder type silicon compound and 20 g of tetrahydrofuran were charged into a reactor equipped with a reflux condenser, a thermometer and a stirrer, and the resultant mixture was stirred while maintaining the temperature at 30° C. To the resultant mixture was added 0.2 g of a 2.2% by weight xylene solution of a platinum-divinyltetramethyldisiloxane complex, and, then, a solution obtained by dissolving 1.5 g of Adeca Rea Soap SE-10N (trade name of a compound represented by the following formula (19):

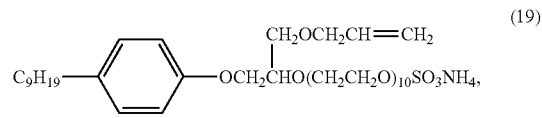

manufactured and sold by ASAHI DENKA KOGYO K.K., Japan) in 13.5 g of tetrahydrofuran was added to the mixture over approximately 2 hours while stirring and maintaining the temperature at 30° C., followed by further stirring at 30° C. for 3 hours, thereby obtaining a solution of an Si—H group-containing silicon compound (3) which is self-emulsifiable in water and has a ladder shaped skeleton (hereinafter referred to simply as "compound (3)").

8 g of butyl cellosolve was added to and mixed with 1.75 of the solution of compound (3), and, then, 8 ml of a 1 N aqueous sodium hydroxide was added thereto, so that hydrogen gas was generated, and the volume of the generated hydrogen gas was 43.4 ml as measured at 22° C. The Si—H group content of compound (3), as calculated from the volume of the generated hydrogen gas, was 0.961 mmol per g of the solution of compound (3) (approximately 4.35 mmol per g of compound (3)).

REFERENCE EXAMPLE 5

Synthesis of an Si—H Group-Containing Silicon Compound (4) which is Self-Emulsifiable in Water and has a Ladder Shaped Skeleton 445 g of dioxane and 25.9 g of methyltrichlorosilane were charged into a reactor equipped with a reflux condenser, a thermometer and a stirrer, followed by stirring at room temperature for approximately 10 minutes. To the resultant mixture was dropwise added a mixed solvent of 4.7 g of water and 18.8 g of dioxane over approximately 30 minutes while stirring and maintaining the temperature at 25 to 30° C., followed by further stirring at 25 to 30° C. for approximately 30 minutes and, then, at 60° C. for 3 hours, to thereby effect a polycondensation reaction.

The resultant reaction mixture was cooled to 25 to 30° C., followed by addition of 25.1 g of dimethylchlorosilane. To the resultant mixture was added a mixed solvent of 1.56 g of water and 6.24 g of dioxane over approximately 30 minutes while stirring and maintaining the temperature at 25 to 30° C., followed by further stirring at 25 to 30° C. for approximately 2 hours, to thereby perform a further polycondensation reaction.

The resultant reaction mixture was taken out of the reactor and the solvent was distilled off at approximately 60° C. under reduced pressure, thereby obtaining an Si—H group-containing silicon compound having a ladder shaped skeleton and a weight average molecular weight of 3,100 (hereinafter referred to as a "ladder type silicon compound"). The obtained Si—H group-containing silicon compound was subjected to IR spectrometry. In the IR spectrum of this compound, absorptions at 1,130 cm$^{-1}$ and 1,050 cm$^{-1}$, which are ascribed to the ladder shaped skeleton, were observed.

0.44 g of the ladder type silicon compound obtained above was dissolved in 8 g of butyl cellosolve, and, then, 8 ml of a 1 N aqueous sodium hydroxide solution was added thereto, so that hydrogen gas was generated, and the volume of the generated hydrogen gas was 40.9 ml as measured at 22° C. The Si—H group content of the above-mentioned ladder type silicon compound, as calculated from the volume of the generated hydrogen gas, was 3.75 mmol per g of the above-mentioned ladder type silicon compound.

Subsequently, 10 g of the above-mentioned ladder type silicon compound and 15 g of dioxane were charged into a reactor equipped with a reflux condenser, a thermometer and a stirrer, and then, the temperature was elevated to 80° C. while stirring. Then, a solution obtained by dissolving 3 g of Uniox MUS-8 (which is the same as used in Reference Example 1) and 0.1 g of a 5% by weight isopropanol solution of hydrogen hexachloro-platinate(IV) hexahydrate in 2.25 g of dioxane was added to the mixture over approximately one hour at 80° C. while stirring, followed by further stirring at 80° C. for 2 hours and subsequent cooling to room temperature, thereby obtaining a solution of an Si—H group-containing silicon compound (4) which is self-emulsifiable in water and has a ladder shaped skeleton (hereinafter referred to simply as "compound (4)").

8 g of butyl cellosolve was added to and mixed with 1.42 g of the solution of compound (4), and, then, 8 ml of a 1 N aqueous sodium hydroxide was added thereto, so that hydrogen gas was generated, and the volume of the generated hydrogen gas was 28.0 ml as measured at 22° C. The Si—H group content of the solution containing compound (4), as calculated from the volume of the generated hydrogen gas, was 0.795 mmol per g of the solution (4) (approximately 2.98 mmol per g of compound (4)).

EXAMPLE 9

500 g of Tinoc A-6 (which is the same as used in Example 1) was charged into a reactor equipped with a reflux condenser, a thermometer and a stirrer. Subsequently, 15 g of the solution of compound (3) obtained in Reference Example 4 was charged into the reactor over approximately 30 minutes at 30° C. while stirring, and the resultant mixture in the reactor was stirred for 24 hours at 30° C. to effect a reaction of Tinoc A-6 with compound (3) and modify the TiO$_2$ particles of Tinoc A-6 to thereby obtain a sol containing modified TiO$_2$ particles well dispersed therein, wherein the volume mean particle diameter of the modified TiO$_2$ particles was 53 nm. During the reaction of Tinoc A-6 with compound (3), hydrogen gas was generated. The volume of the generated hydrogen gas was 40 ml as measured at 23° C.

Using the obtained sol, a film was formed in the same manner as in Example 1, and the formed film was subjected to spectrometry in substantially the same manner as in Example 1. The IR spectrum obtained by the spectrometry showed that the absorption ascribed to the Ti—OH group of TiO$_2$ particles in Tinoc A-6 disappeared, wherein the above-mentioned absorption had been observed in the IR spectrum of TiO$_2$ prior to the modification of the TiO$_2$ particles.

When the obtained sol was allowed to stand still at 30° C. for 100 days, the volume mean particle diameter of the modified TiO$_2$ particles was still as small as 63 nm.

Using the obtained sol, a transparent and smooth film was formed on the surface of a glass plate in substantially the same manner as in Example 1. The surface of the film was evaluated by examining how the hydrophilicity or hydrophobicity of the film surface was changed by UV irradiation. The surface of the film was also evaluated with respect to the photocatalyst activity. The results are shown in Table 2.

EXAMPLE 10

500 g of Tinoc A-6 (which is the same as used in Example 1) was charged into a reactor equipped with a reflux condenser, a thermometer and a stirrer. Subsequently, 10.8 g of the solution of compound (4) obtained in Reference Example 5 was charged into the reactor over approximately 30 minutes at 30° C. while stirring, and the resultant mixture in the reactor was stirred for 8 hours at 30° C. to effect a reaction of Tinoc A-6 with compound (4) and modify the TiO$_2$ particles of Tinoc A-6 to thereby obtain a sol containing modified TiO$_2$ particles well dispersed therein, wherein the volume mean particle diameter of the modified TiO$_2$ particles was 29 nm. During the reaction of Tinoc A-6 with compound (4), hydrogen gas was generated. The volume of the generated hydrogen gas was 100 ml as measured at 23° C.

Using the obtained sol, a film was formed in the same manner as in Example 1, and the formed film was subjected to spectrometry in substantially the same manner as in Example 1. The IR spectrum obtained by the spectrometry showed that the absorption ascribed to the Ti—OH group of TiO$_2$ particles in Tinoc A-6 disappeared, wherein the above-mentioned absorption had been observed in the IR spectrum of TiO$_2$ prior to the modification of the TiO$_2$ particles.

When the obtained sol was allowed to stand still at 30° C. for 100 days, the volume mean particle diameter of the modified TiO$_2$ particles was still as small as 30 nm.

Using the obtained sol, a transparent and smooth film was formed on the surface of a glass plate in substantially the same manner as in Example 1. The surface of the film was evaluated by examining how the hydrophilicity or hydrophobicity of the film surface was changed by UV irradiation. The surface of the film was also evaluated with respect to the photocatalyst activity. The results are shown in Table 2.

EXAMPLE 11

50 g of Tinoc A-6 (which is the same as used in Example 1) was charged into a reactor equipped with a reflux condenser, a thermometer and a stirrer. Subsequently, 6 g of Aciplex™-SS950 (trade name of a 5% by weight ethanol/water (weight ratio of ethanol to water=1:1) solution of a fluoro resin having a sulfonic acid group, manufactured and sold by Asahi Kasei Kogyo Kabushiki Kaisha, Japan) was charged into the reactor over approximately 30 minutes at 30° C. while stirring, and the resultant mixture in the reactor was stirred for 8 hours at 30° C. to cause adsorption of Aciplex™-SS950 on Tinoc A-6 and modify the $TiO_2$ particles of Tinoc A-6 to thereby obtain a sol containing modified $TiO_2$ particles well dispersed therein, wherein the mean volume particle diameter of the modified $TiO_2$ particles was 150 nm.

When the obtained sol was allowed to stand still at 30° C. for 100 days, the mean volume particle diameter of the modified $TiO_2$ particles was still as small as 147 nm.

Using the obtained sol, a transparent and smooth film was formed on the surface of a glass plate in substantially the same manner as in Example 1. The surface of the film was evaluated by examining how the hydrophilicity or hydrophobicity of the film surface was changed by UV irradiation. The surface of the film was also evaluated with respect to the photocatalyst activity. The results are shown in Table 3.

EXAMPLE 12

150 g of the organosol obtained in Example 5 was added to 100 g of Bistrator-L NSC-200A (trade name of an organic solvent-based silicone-acrylic coating agent (solids content: 20% by weight) (undercoating agent for a conventional coating agent containing a photocatalyst), manufactured and sold by Nippon Soda Co., Ltd., Japan) over approximately 10 minutes at room temperature while stirring, thereby obtaining a modified photocatalyst composition.

The obtained modified photocatalyst composition was spray-coated on a glass plate in a thickness of 30 μm. The coated glass plate was dried at room temperature for a week, and then, at 50° C. for 5 days, thereby forming a transparent and smooth film on the surface of the glass plate. The surface of the film was evaluated by examining how the hydrophilicity or hydrophobicity of the film surface was changed by UV irradiation. The surface of the film was also evaluated with respect to the photocatalyst activity. The results are shown in Table 3.

COMPARATIVE EXAMPLE 1

A transparent and smooth film was formed on the surface of a glass plate in substantially the same manner as in Example 12, except that Bistrator-L NSC-200A (which is the same as used in Example 12) alone was used instead of the modified photocatalyst composition obtained in Example 12. The surface of the film was evaluated by examining how the hydrophilicity or hydrophobicity of the film surface was changed by UV irradiation. The surface of the film was also evaluated with respect to the photocatalyst activity. The results are shown in Table 3.

COMPARATIVE EXAMPLE 2

To 250 g of Polydurex G633 (trade name of an aqueous acrylic-silicone emulsion (solids content: 46% by weight, pH: 8.8), manufactured and sold by Asahi Kasei Kogyo Kabushiki Kaisha, Japan) was added, as a film-forming auxiliary, 22.8 g of CS-12 (trade name of 2,2,4-trimethyl-1,3-pentanediol monoisobutyrate, manufactured and sold by CHISSO Corporation, Japan) over 20 minutes at room temperature while stirring. To the resultant mixture, also as a film-forming auxiliary, 22.8% of an aqueous solution of butyl cellosolve (50% by weight) as added over 20 minutes at room temperature while stirring, followed by further stirring at room temperature for 3 hours, thereby obtaining an acrylic-silicone emulsion containing film-forming auxiliaries, wherein the solids content of the emulsion was 38.6% by weight.

A transparent and smooth film was formed on the surface of a glass plate in substantially the same manner as in Example 12, except that the above-mentioned emulsion was used instead of the modified photocatalyst composition obtained in Example 12. The surface of the film was evaluated by examining how the hydrophilicity or hydrophobicity of the film surface was changed by UV irradiation. The surface of the film was also evaluated with respect to the photocatalyst activity. The results are shown in Table 3.

EXAMPLE 13

75 g of the sol obtained in Example 6 was added to 100 g of the acrylic-silicone emulsion containing film-forming auxiliaries, which was obtained in Comparative Example 2, over approximately 10 minutes at room temperature while stirring, thereby obtaining a modified photocatalyst composition.

Using the obtained modified photocatalyst composition, a transparent and smooth film was formed on the surface of a glass plate in substantially the same manner as in Example 12. The surface of the film was evaluated by examining how the hydrophilicity or hydrophobicity of the film surface was changed by UV irradiation. The surface of the film was also evaluated with respect to the photocatalyst activity. The results are shown in Table 3.

COMPARATIVE EXAMPLE 3

A film was formed on the surface of a glass plate in substantially the same manner as in Example 1, except that a sol obtained by diluting 100 g of STS-02 (which is the same as used in Example 5) with 50 g of water was used instead of the modified photocatalyst sol obtained in Example 1. However, since the formed film was cracked, it was impossible to evaluate the surface of the film by examining how the hydrophilicity or hydrophobicity of the film surface was changed by UV irradiation, and it was also impossible to evaluate the surface of the film with respect to the photocatalyst activity.

To 68 g of the obtained sol was added 100 g of butyl cellosolve over approximately 10 nimutes at room temperature while stirring, and then, water was distilled off under reduced pressure by means of an evaporator, thereby obtaining an organosol. However, the particles in the obtained organosol was not stably dispersed in the liquid medium, and precipitated. That is, it was impossible to obtain an organosol having an excellent dispersibility.

COMPARATIVE EXAMPLE 4

30 g of ST-01 (trade name of an anatase-type titanium oxide powder; average crystallite diameter: 7 nm which is a value described in the catalog) (manufactured and sold by Ishihara Sangyo Kaisha, Ltd., Japan) and 120 g of water were charged into a reactor equipped with a reflux condenser, a thermometer and a stirrer, and the resultant mixture in the reactor was heated to 50° C. while stirring. Subsequently, 31 g of the solution of compound (1) obtained in Reference Example 1 was charged into the reactor over approximately 30 minutes at 50° C. while stirring, and the resultant mixture in the reactor was stirred at 50° C. for 3 hours, and then, cooled to room temperature. The particles in the resultant reaction mixture were precipitated and separated from the liquid phase, wherein the volume mean particle diameter of the particles was 3 μm or more.

To the resultant mixture was added 200 g of butyl cellosolve, and then, water was distilled off under reduced pressure by means of an evaporator, thereby obtaining an organosol. However, the particles in the obtained organosol was not stably dispersed in the liquid medium, and precipitated. That is, it was impossible to obtain an organosol having an excellent dispersibility. Therefore, it was impossible to form a film on a glass plate using this organosol.

COMPARATIVE EXAMPLE 5

100 g of STS-02 (trade name of a hydrochloric acid-peptized sol of an anatase-type titanium oxide; volume mean particle diameter: 18 nm, $TiO_2$ content: 30% by weight, average crystallite diameter: 7 nm which is a value described in the catalog) (manufactured and sold by Ishihara Sangyo Kaisha, Ltd., Japan) and 100 g of water were charged into a reactor equipped with a reflux condenser, a thermometer and a stirrer. Subsequently, a solution obtained by dissolving 7.5 g of methyltrimethoxysilane in 7.5 g of dioxane was charged into the reactor over approximately 30 minutes at 30° C. while stirring, and the resultant mixture in the reactor was further stirred at 30° C. for 3 hours to effect a reaction of STS-02 with methyltrimethoxysilane and modify the $TiO_2$ particles to thereby obtain a sol containing particles of modified titanium oxide (hereinafter referred to as "modified $TiO_2$ particles"), wherein the volume mean particle diameter of the $TiO_2$ particles was 900 nm.

Using the obtained sol, a film was formed in the same manner as in Example 1, and the formed film was subjected to spectrometry in substantially the same manner as in Example 1. The IR spectrum obtained by the spectrometry showed that the absorption ascribed to the Ti—OH group of $TiO_2$ particles in STS-02 became small but did not disappear, wherein the above-mentioned absorption had been observed in the IR spectrum of $TiO_2$ prior to the modification of the $TiO_2$ particles. This means that the Ti—OH group still remained in STS-02 in a considerably large amount.

Using the obtained sol, a film was formed on the surface of a glass plate in substantially the same manner as in Example 1. However, only a film which is white turbid and has a large surface roughness was obtained.

When the obtained modified titanium oxide sol was allowed to stand still at 30° C. for 2 months, the sol was gelled. Therefore, it was impossible to evaluate the surface of the film.

COMPARATIVE EXAMPLE 6

200 g of Tinoc A-6 (which is the same as used in Example 1) was charged into a reactor equipped with a reflux condenser, a thermometer and a stirrer. Subsequently, a solution obtained by dissolving 3 g of methyltrimethoxysilane in 3 g of dioxane was charged into the reactor over approximately 30 minutes at 30° C. while stirring, and the resultant mixture in the reactor was stirred for 3 hours at 30° C. to effect a reaction of Tinoc A-6 with methyltrimethoxysilane and modify the $TiO_2$ particles of Tinoc A-6 to thereby obtain a sol containing modified $TiO_2$ particles, wherein the volume mean particle diameter of the modified $TiO_2$ particles was 1 μm.

Using the obtained sol, a film was formed in the same manner as in Example 1, and the formed film was subjected to spectrometry in substantially the same manner as in Example 1. The IR spectrum obtained by the spectrometry showed that the absorption ascribed to the Ti—OH group the $TiO_2$ particles of Tinoc A-6 became small but did not disappear, wherein the above-mentioned absorption had been observed in the IR spectrum of $TiO_2$ prior to the modification of the $TiO_2$ particles. This means that the Ti—OH group remained in Tinoc A-6 in a considerably large amount.

When the obtained modified titanium oxide sol was allowed to stand still at 30° C. for one week, the sol was gelled. Therefore, it was impossible to evaluate the surface of the film.

COMPARATIVE EXAMPLE 7

100 g of STS-02 (which is the same as used in Example 5) was charged into a reactor equipped with a reflux condenser, a thermometer and a stirrer. Subsequently, 6 g of Acciplex-SS950™ (which is the same as used in Example 11) was charged into the reactor over approximately 30 minutes at 30° C. while stirring, and the resultant mixture in the reactor was stirred at 30° C. for 8 hours to cause adsorption of Aciplex™-SS950 on STS-02 and modify the $TiO_2$ particles of STS-02 to thereby obtain a sol containing modified $TiO_2$ particles, wherein the volume mean particle diameter of the modified $TiO_2$ particles was 3 μm or more.

Since the obtained modified titanium oxide sol gradually precipitated with time, it was impossible to spray-coat the sol.

TABLE 1

(The hydrophilicity or hydrophobicity of the film surface before and after the UV irradiation, and the photocatalyst activity)

| Evaluation item | Example 1 | Example 2 | Example 3 | Example 4 | Example 5 |
|---|---|---|---|---|---|
| Contact angle of water (before the irradiation) | 37° | 20° | 4° | 6° | 33° |
| Contact angle of water (one day after the irradiation) | 0° | 95° | 114° | 0° | 3° |
| Contact angle of water (3 days after the irradiation) | 0° | 0° | 0° | 0° | 0° |
| Photocatalyst activity | ⊚ | ⊚ | ⊚ | ⊚ | ⊚ |

TABLE 2

(The hydrophilicity or hydrophobicity of the film surface before and after the UV irradiation, and the photocatalyst activity)

| Evaluation item | Example 6 | Example 7 | Example 8 | Example 9 | Example 10 |
|---|---|---|---|---|---|
| Contact angle of water (before the irradiation) | 98° | 18° | 34° | 17° | 32° |

TABLE 2-continued (The hydrophilicity or hydrophobicity of the film surface before and after the UV irradiation, and the photocatalyst activity)

| Evaluation item | Example 6 | Example 7 | Example 8 | Example 9 | Example 10 |
|---|---|---|---|---|---|
| Contact angle of water (one day after the irradiation) | 0° | 43° | 4° | 0° | 0° |
| Contact angle of water (3 days after the irradiation) | 0° | 0° | 0° | 0° | 0° |
| Photocatalyst activity | ⊚ | ⊚ | ⊚ | ⊚ | ⊚ |

TABLE 3

(The hydrophilicity or hydrophobicity of the film surface before and after the UV irradiation, and the photocatalyst activity)

| Evaluation item | Example 11 | Example 12 | Comparative Example 1 | Comparative Example 2 | Example 13 |
|---|---|---|---|---|---|
| Contact angle of water (before the irradiation) | 60° | 84° | 95° | 89° | 95° |
| Contact angle of water (one day after the irradiation) | 65° | 96° | 96° | 89° | 84° |
| Contact angle of water (3 days after the irradiation) | 65° | 6° | 94° | 89° | 8° |
| Photocatalyst activity | ⊚ | ⊚ | x | x | ⊚ |

REFERENCE EXAMPLE 6

Synthesis of an Si—H Group-Containing Silicon Compound (5) Having a Keto Group 500 g of dioxane and 500 g of KF9901 (which is the same as used in Reference Example 1) were charged into a reactor equipped with a reflux condenser, a thermometer and a stirrer, and the resultant mixture in the reactor was heated to 60° C. while stirring.

16.3 g of a 0.25% by weight dioxane solution of dichloro (dicyclopentadienyl)platinum (II) was charged into the reactor, and then, a solution obtained by dissolving 250 g of Uniox MUS-8 (which is the same as used in Reference Example 1) in 250 g of dioxane was charged into the reactor over approximately 30 minutes at 60° C. while stirring. The resultant mixture in the reactor was stirred at 60° C. for 30 minutes. Subsequently, a solution obtained by dissolving 100 g of 5-hexen-2-one in 100 g of dioxane was charged into the reactor for approximately 30 minutes at 60° C. while stirring, and the resultant mixture in the reactor was stirred for one hour at 60° C., thereby obtaining a solution of an Si—H group-containing silicon compound (5) having a keto group (hereinafter referred to simply as "compound (5)").

When 100 g of water was added to 4 g of the obtained solution of compound (5), the resultant aqueous mixture was a dispersion which was slightly white turbid.

On the other hand, 8 g of butyl cellosolve was added to and mixed with 0.89 g of the solution of compound (5), and, then, 8 ml of a 1 N aqueous sodium hydroxide solution was added thereto, so that hydrogen gas was generated, and the volume of the generated hydrogen gas was 27.2 ml as measured at 23° C. The Si—H group content of compound (5), as calculated from the volume of the generated hydrogen gas, was 1.2 mmol per g of the solution of compound (5) (approximately 4.1 mmol per g of KF9901).

REFERENCE EXAMPLE 7

Synthesis of an Si—H Group-Containing Silicon Compound (6) Having a Methacryloyl Group 100 g of dioxane and 100 g of KF9901 (which is the same as used in Reference Example 1) were charged into a reactor equipped with a reflux condenser, a thermometer and a stirrer, and the resultant mixture in the reactor was heated to 60° C. while stirring.

5 g of a 0.25% by weight dioxane solution of dichloro (dicyclopentadienyl)platinum(II) was charged into the reactor, and then, a solution obtained by dissolving 50 g of Uniox MUS-8 (which is the same as used in Reference Example 1) in 50 g of dioxane was charged into the reactor over approximately one hour at 60° C. while stirring. Subsequently, a solution obtained by dissolving 20 g of allyl methacrylate and 0.01 g of 4-methoxyhydroquinone (polymerization inhibitor) in 20 g of dioxane was charged into the reactor for approximately 30 minutes at 60° C. while stirring, and the resultant mixture in the reactor was further stirred for one hour at 60° C., thereby obtaining a solution of an Si—H group-containing silicon compound (6) having a methacryloyl group (hereinafter referred to simply as "compound (6)").

When 100 g of water was added to 4 g of the obtained solution of compound (6), the resultant aqueous mixture was a dispersion which was slightly white turbid.

On the other hand, 8 g of butyl cellosolve was added to and mixed with 1.25 g of the solution of compound (6), and, then, 8 ml of a 1 N aqueous sodium hydroxide solution was added thereto, so that hydrogen gas was generated, and the volume of the generated hydrogen gas was 42.0 ml as measured at 23° C. The Si—H group content of compound (6), as calculated from the volume of the generated hydrogen gas, was 1.3 mmol per g of the solution of compound (1) (approximately 4.6 mmol per g of KF9901).

REFERENCE EXAMPLE 8

Preparation of an Emulsion of a Silicone-Modified Polymer Having a Keto Group 8 g of methacrylic acid, 3 g of diacetone acrylamide, 34 g of methyl methacrylate, 40 g of butyl acrylate, 15 g of cyclohexyl methacrylate, 300 g of water and 20 g of a 20% by weight aqueous solution of Latemul S-180A (trade name of ammonium salt of a sulfosuccinic diester having, in a molecule thereof, a double bond copolymerizable with an ethylenically unsaturated monomer) (manufactured and sold by Kao Corp., Japan) were charged into a reactor equipped with a stirrer, a reflux condenser and a thermometer and provided with two dropping funnel-like vessels for dropwise feeding (hereinafter referred to as "dropping vessels"). The internal temperature of the reactor was elevated to 78° C. Subsequently, 0.5 g of ammonium persulfate was charged into the reactor, and the resultant mixture in the reactor was stirred at 78° C. for one hour, thereby obtaining a seed latex. The seed latex had a pH value of 1.8.

To the obtained seed latex in the reactor was added a solution containing 3 g of methacrylic acid, 12 g of diacetone acrylamide, 165 g of methyl methacrylate, 160 g of butyl acrylate, 60 g of cyclohexyl methacrylate, 330 g of water, 20 g of a 20% by weight aqueous solution of Latemul S-180A and 1.0 g of ammonium persulfate, and another solution containing 2.5 g of γ-methacryloxypropyltrimethoxysilane, 25 g of dimethyldimethoxysilane and 25 g of methyltrimethoxysilane, wherein the two solutions were separately charged into the reactor through respective dropping vessels at 80° C. over 3 hours while stirring.

After the dropwise addition of the two solutions, the internal temperature of the reactor was elevated to 85° C., and the contents of the reactor were stirred for 6 hours and, then, cooled to room temperature, to thereby obtain a reaction mixture. The pH value of the reaction mixture in the reactor was measured and found to be 2.1.

A 25% by weight aqueous ammonia solution was charged into the reactor so as to adjust the pH value of the reaction mixture to 8. Then, the reaction mixture was filtered through a wire mesh (100-mesh size) to remove aggregates from the reaction mixture, thereby obtaining an emulsion. The amount of the aggregates was as small as 0.02% by weight, in terms of the weight percentage of the dried aggregates, based on the total weight of the monomers used.

The obtained emulsion had a solids content of 44.0% by weight, and the volume mean particle diameter of the particles in the emulsion was 128 μm.

REFERENCE EXAMPLE 9

Preparation of an Aqueous Solution of a Semicarbazide Derivative 230 g of isopropanol and 20 g of hydrazine monohydrate were charged into a reactor equipped with a reflux condenser, a thermometer and a stirrer at room temperature.

A solution of 42 g of Duranate 24A (trade name of a biuret type polyisocyanate; NCO content: 23.3% by weight) (manufactured and sold by Asahi Kasei Kogyo Kabushiki Kaisha, Japan) in 168 g of tetrahydrofuran was charged into the above-mentioned reactor over approximately one hour at 40° C. while stirring, and the resultant mixture in the reactor was stirred at 40° C. for 3 hours, thereby obtaining a reaction mixture.

Tetrahydrofuran, hydrazine, water and the like were removed from the obtained reaction mixture by distillation under reduced pressure, and an appropriate amount of water was added to the resultant mixture, to thereby obtain an aqueous solution of a semicarbazide derivative (solids content of the solution: 30% by weight).

EXAMPLE 14

300 g of Tinoc A-6 (which is the same as used in Example 1) was charged into a reactor equipped with a reflux condenser, a thermometer and a stirrer. Subsequently, 15.3 g of the solution of compound (5) obtained in Reference Example 6 was charged into the reactor over approximately 30 minutes at 30° C. while stirring, and the resultant mixture in the reactor was stirred at 30° C. for 5 hours to effect a reaction of Tinoc A-6 with compound (5) and modify the $TiO_2$ particles of Tinoc A-6 to thereby obtain a sol containing modified $TiO_2$ particles well dispersed therein, wherein the volume mean particle diameter of the modified $TiO_2$ particles was 18 nm. During the reaction of Tinoc A-6 with compound (5), hydrogen gas was generated. The volume of the generated hydrogen gas was 122 ml as measured at 23° C.

An IR spectrum was obtained in substantially the same manner as in Example 1. The obtained IR spectrum showed that the absorption ascribed to a Ti—OH group of $TiO_2$ particles in Tinoc A-6 disappeared, wherein the above-mentioned absorption had been observed in the IR spectrum of $TiO_2$ prior to the modification of the $TiO_2$ particles.

When the obtained sol was allowed to stand still at 30° C. for 100 days, the volume mean particle diameter of the modified $TiO_2$ particles was still as small as 23 nm.

On the other hand, 11.3 g of the aqueous solution of a semicarbazide derivative (obtained in Reference Example 9) was added to 200 g of the emulsion of a silicon-modified polymer having a keto group (obtained in Reference Example 8) over approximately 20 minutes at room temperature while stirring, thereby obtaining a mixture.

To the obtained mixture was added 230 g of the above-mentioned sol over approximately 30 minutes at room temperature while stirring, and the resultant mixture was stirred at room temperature for 3 hours, thereby obtaining a modified photocatalyst composition.

Using the obtained modified photocatalyst composition, a transparent and smooth film was formed on the surface of a glass plate in substantially the same manner as in Example 12. The surface of the film was evaluated with respect to the photocatalyst activity. The evaluation was good (◎). The retention ratio of the weight of the film after immersion in acetone was 97%, which shows that the film had an excellent solvent resistance.

EXAMPLE 15

100 g of STS-02 (which is the same as used in Example 5) and 50 g of water were charged into a first reactor equipped with a reflux condenser, a thermometer and a stirrer. Subsequently, 26 g of the solution of compound (6) obtained in Reference Example 7 was charged into the first reactor over approximately 30 minutes at 30° C. while stirring, and the resultant mixture in the first reactor was stirred at 30° C. for 7 hours to effect a reaction of STS-02 with compound (6) and modify the $TiO_2$ particles of STS-$O_2$, to thereby obtain a sol containing modified $TiO_2$ particles well dispersed therein, wherein the volume mean particle diameter of the modified $TiO_2$ particles was 38 nm. During the reaction of STS-02 with compound (6), hydrogen gas was generated. The volume of the generated hydrogen gas was 240 ml as measured at 24° C.

An IR spectrum was obtained in substantially the same manner as in Example 1. The obtained IR spectrum showed that the absorption ascribed to a Ti—OH group of $TiO_2$ particles in STS-02 disappeared, wherein the above-mentioned absorption had been observed in the IR spectrum of $TiO_2$ prior to the modification of the $TiO_2$ particles.

100 g of the above-mentioned sol, 353 g of water and 2 g of Adeca Rea soap SE-1025N (trade name of a 25% aqueous solution of a surfactant; manufactured and sold by ASAHI DENKA KOGYO K.K., Japan) were charged into a second reactor equipped with a stirrer, a reflux condenser, a dropping vessel and a thermometer. The internal temperature of the second reactor was elevated to 80° C. Subsequently, a solution containing 6 g of methacrylic acid, 61 g of butyl acrylate, 70 g of methyl methacrylate, 1.2 g of acrylamide, 80 g of water, 2.7 g of Adeca Rea soap SE-1025N, 1.4 g of sodium p-styrenesulfonate and 0.5 g of ammonium persulfate was dropwise added through the dropping vessel to the second reactor at 80° C. over 2 hours while stirring.

After the addition of the solution, the resultant mixture in the second reactor was stirred at 80° C. for 2 hours and, then, cooled to room temperature. A 25% aqueous ammonia solution was charged into the second reactor so as to adjust the pH value of the mixture in the second reactor to 8. The resultant mixture was filtered through a wire mesh (100-mesh size) so as to remove aggregates from the mixture, thereby obtaining a modified photocatalyst composition (a modified photocatalyst-acrylic composite emulsion). The modified photocatalyst composition had a solids content of 23.4% by weight, and the volume mean particle diameter of particles in the composition was 95 nm.

Using the obtained modified photocatalyst composition, a transparent and smooth film was formed on the surface of a glass plate in substantially the same manner as in Example 12. The surface of the film was evaluated with respect to the photocatalyst activity. The evaluation was good (◎).

REFERENCE EXAMPLE 10

Synthesis of Silicon Compound (7) Containing an Si—H Group, which is Self-Emulsifiable in Water 50 g of dioxane and 50 g of HMS-301-100GM (which is the same as used in Reference Example 2) were charged into a reactor equipped with a reflux condenser, a thermometer and a stirrer, and the resultant mixture in the reactor was heated to 80° C. while stirring.

On the other hand, 25 g of Uniox MUS-8 (which is the same as used in Reference Example 1) and 0.53 g of a 5% by weight isopropanol solution of hydrogen hexachloroplatinate(IV) hexahydrate were dissolved in 62.5 g of dioxane.

The resultant solution was charged into the reactor containing the above-mentioned mixture over approximately one hour at 80° C. while stirring, and the resultant mixture in the reactor was stirred at 80° C. for 2 hours and, then, cooled to room temperature, thereby obtaining a solution of silicon compound (7) containing an Si—H group (hereinafter referred to simply as "compound (7)").

When 100 g of water was added to 4 g of the above-obtained solution of compound (7), the resultant aqueous mixture was in the form of a dispersion which is slightly white turbid.

On the other hand, 8 g of butyl cellosolve was added to and mixed with 2.23 g of the solution of compound (7), and, then, 8 ml of a 1 N aqueous sodium hydroxide solution was added thereto, so that hydrogen gas was generated. The volume of the generated hydrogen gas was 45.2 ml as measured at 21° C. The Si—H group content of compound (7), as calculated from the volume of the generated hydrogen gas, was 0.825 mmol per g of the solution of compound (7) (approximately 3.1 mmol per g of HMS-301-100GM).

REFERENCE EXAMPLE 11

Synthesis of an Si—H Group-Containing Silicon Compound (8) which is Self-Emulsifiable in Water and has a Fluoroalkyl Group 50 g of methyl ethyl ketone and 50 g of HMS-301-100GM (which is the same as used in Reference Example 2) were charged into a reactor equipped with a reflux condenser, a thermometer and a stirrer, and the resultant mixture in the reactor was heated to 60° C. while stirring. Then, 1.6 g of a 0.25% by weight dioxane solution of dichloro(dicyclopentadienyl)platinum(II) was charged into the reactor to obtain a mixture.

On the other hand, 25 g of Uniox MUS-8 (which is the same as used in Reference Example 1) was dissolved in 25 g of methyl ethyl ketone.

The resultant solution was charged into the reactor containing the above-mentioned mixture over approximately 30 minutes at 60° C. while stirring, and the resultant mixture in the reactor was stirred at 60° C. for 30 minutes to obtain a mixture.

10 g of perfluoroctylethylene and 1.1 g of a 0.25 e by weight dioxane solution of dichloro(dicyclopentadienyl)platinum(II) were dissolved in 10 g of methyl ethyl ketone, and the resultant solution was added to the above-obtained mixture over approximately one hour at 60° C. while stirring, and the resultant mixture in the reactor was stirred at 60° C. for 8 hours and, then, cooled to room temperature, thereby obtaining a solution of an Si—H group-containing silicon compound (8) having a fluoroalkyl group (hereinafter referred to simply as "compound (8)").

When 100 g of water was added to 4 g of the above-obtained solution of compound (8), the resultant aqueous mixture was in the form of a dispersion which is slightly white turbid.

On the other hand, 8 g of butyl cellosolve was added to and mixed with 1.094 g of the solution of compound (8), and, then, 8 ml of a 1 N aqueous sodium hydroxide solution was added thereto, so that hydrogen gas was generated. The volume of the generated hydrogen gas was 25.5 ml as measured at 17° C. The Si—H group content of compound (8), as calculated from the volume of the generated hydrogen gas, was 0.962 mmol per g of the solution of compound (8) (approximately 3.31 mmol per g of HMS-301-100GM).

REFERENCE EXAMPLE 12

Measurement of the Surface Energy of a Film Prepared from an Organic Solvent Type Acrylic Coating Agent Pla-ace (trade name of an organic solvent-dissolved acrylic coating agent; solids content: 50% by weight) (manufactured and sold by MUSASHI PAINT CO., LTD., Japan) was cast on a glass plate in a thickness of 20 μm. The glass plate having cast thereon Pla-ace was dried at room temperature for 2 days, followed by heat drying at 50° C. for 3 days, thereby forming a transparent and smooth film on the surface of the glass plate.

The contact angle of water against the surface of the film was 84° as measured at 20° C. The surface energy of the film was 35.5 dyn/cm at 20° C., as calculated from the contact angle using the Sell and Neumann's empirical formula.

REFERENCE EXAMPLE 13

Measurement of the Surface Energy of an Aqueous Acrylic-Silicone Resin Emulsion

Using the aqueous acrylic-silicone emulsion (containing a film-forming assistant) prepared in Comparative Example 2, a transparent and smooth film was formed on the surface of a glass plate in substantially the same manner as in Reference Example 12.

The contact angle of water against the surface of the film was 89° as measured at 20° C. The surface energy of the film was 31.5 dyn/cm at 20° C., as calculated from the contact angle using the Sell and Neumann's empirical formula.

EXAMPLE 17

400 g of Tinoc A-6 (which is the same as used in Example 1) and 10.3 g of the solution of compound (7) obtained in Reference Example 10 were charged into a reactor equipped with a reflux condenser, a thermometer and a stirrer over approximately 30 minutes at room temperature (30° C.) while stirring, and the resultant mixture in the reactor was stirred at 30° C. for 3 hours to effect a reaction of Tinoc A-6 with compound (7) and modify the $TiO_2$ particles of Tinoc A-6 to thereby obtain a sol containing modified $TiO_2$ particles well dispersed therein, wherein the volume mean particle diameter of the modified $TiO_2$ particles was 17 nm. During the reaction of Tinoc A-6 with compound (7), hydrogen gas was generated. The volume of the generated hydrogen gas was 80 ml as measured at 16° C.

An IR spectrum was obtained in substantially the same manner as in Example 1. The obtained IR spectrum showed that the absorption ascribed to a Ti—OH group of $TiO_2$ particles in Tinoc A-6 disappeared, wherein the above-mentioned absorption had been observed in the IR spectrum of $TiO_2$ prior to the modification of the $TiO_2$ particles.

100 g of butyl cellosolve was added to 100 g of the obtained sol over approximately 10 minutes at room temperature (23° C.) while stirring and, then, water was removed from the resultant mixture under reduced pressure by means of an evaporator. Subsequently, an appropriate amount of butyl cellosolve was added to the mixture so that the solids content of the mixture became 5.8% by weight, thereby obtaining an organosol containing particles well dispersed therein, wherein the volume mean particle diameter of the particles was 25 nm.

The obtained organosol was spray-coated on a glass plate in a thickness of 2 μm. The coated glass plate was dried at 50° C. for one week, thereby forming a transparent and smooth film on the surface of the glass plate.

The contact angle of water against the surface of the film was 95.6° as measured at 20° C. The surface energy of the film was 26.5 dyn/cm at 20° C., as calculated from the contact angle using the Sell and Neumann's empirical formula.

20 g of the organosol was added to Pla-ace (which is the same as used in Reference Example 12) over approximately 10 minutes at room temperature while stirring, thereby obtaining a modified photocatalyst composition.

The modified photocatalyst composition was casted on an OHP film in a thickness of 20 μm. The casted OHP film was dried at room temperature for 2 days, followed by heat drying at 50° C. for 3 days, thereby forming a smooth film on the surface of the OHP film.

The distribution of titanium atoms in a cross-section of the film formed on the surface of the OHP film was measured by means of an energy-dispersive X-ray spectrometer. The result of the measurement is shown in FIG. 2.

Figure 2:
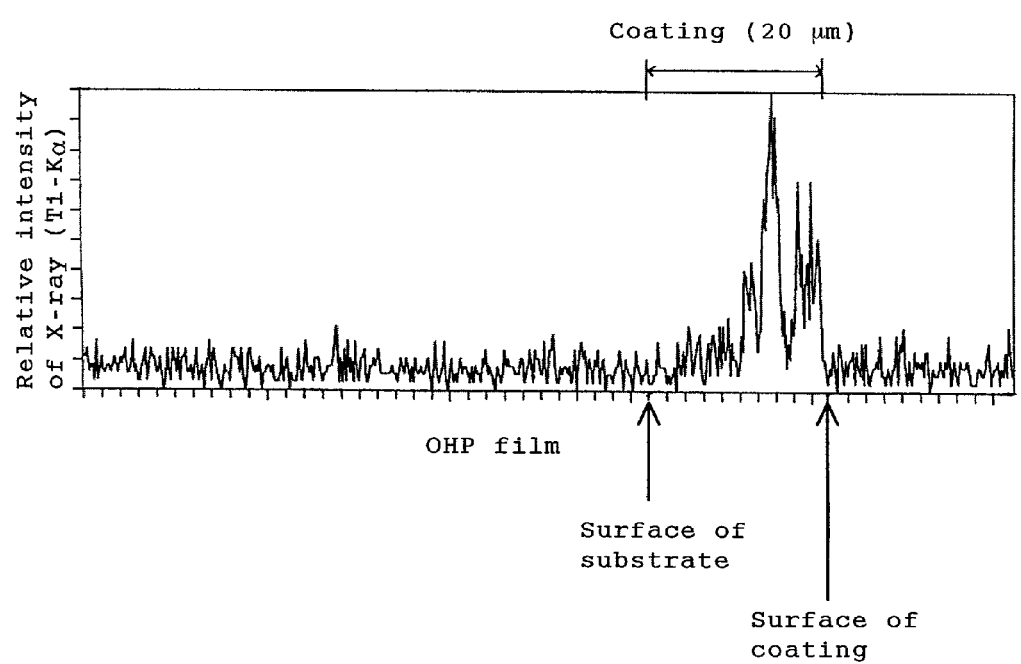
FIG. 2 is a graph showing the data obtained by measuring, by means of an energy-dispersive X-ray spectrometer, the distribution of the titanium atoms in a cross-section of a coating which has been formed on the surface of an OHP (overhead projector) film by using the modified photocatalyst composition produced in Example 17.

As can be seen from FIG. 2, in the film formed on the surface of the OHP film, $TiO_2$ particles were not present at the inside film surface (in contact with the OHP film as a substrate), and the film formed on the surface of the OHP film had a distribution of $TiO_2$ particles wherein the concentration of $TiO_2$ particles increases from the inside film surface (in contact with the OHP film) toward the outside film surface (opposite to the inside film surface in contact with the OHP film).

Further, the surface of the film formed on the surface of the OHP film was evaluated with respect to the photocatalyst activity. The evaluation was good (◎).

EXAMPLE 18

300 g of Tinoc A-6 (which is the same as used in Example 1) and 15.5 g of the solution of compound (8) obtained in Reference Example 11 were charged into a reactor equipped with a reflux condenser, a thermometer and a stirrer over approximately 30 minutes at room temperature (30° C.) while stirring, and the resultant mixture in the reactor was stirred at 30° C. for 5 hours to effect a reaction of Tinoc A-6 with compound (8) and modify the $TiO_2$ particles of Tinoc A-6 to thereby obtain a sol containing modified $TiO_2$ particles well dispersed therein, wherein the volume mean particle diameter of the modified $TiO_2$ particles was 30 nm. During the reaction of Tinoc A-6 with compound (8), hydrogen gas was generated. The volume of the generated hydrogen gas was 140 ml as measured at 16° C.

An IR spectrum was obtained in substantially the same manner as in Example 1. The obtained IR spectrum showed that the absorption ascribed to a Ti—OH group of $TiO_2$ particles in Tinoc A-6 disappeared, wherein the above-mentioned absorption had been observed in the IR spectrum of $TiO_2$ prior to the modification of the $TiO_2$ particles.

100 g of butyl cellosolve was added to 100 g of the obtained sol over approximately 10 minutes at room temperature (23° C.) while stirring and, then, the water was removed from the resultant mixture under reduced pressure by means of an evaporator, thereby obtaining a mixture. Subsequently, an appropriate amount of butyl cellosolve was added to the obtained mixture so that the solids content of the resultant mixture became 7.1% by weight, thereby obtaining an organosol comprising butyl cellosolve (as a dispersion medium) containing particles well dispersed therein.

Using the obtained organosol, a transparent and smooth film was formed on the surface of a glass plate in substantially the same manner as in Example 17.

The contact angle of water against the surface of the film was 106.0° as measured at 20° C. The surface energy of the film was 19.2 dyn/cm at 20° C., as calculated from the contact angle using the Sell and Neumann's empirical formula.

20 g of the organosol was added to 100 g of Pla-ace (which is the same as used in Reference Example 12) over approximately 10 minutes at room temperature (23° C.) while stirring, thereby obtaining a modified photocatalyst composition.

The modified photocatalyst composition was casted on an OHP film in a thickness of 20 μm. The casted OHP film was dried at room temperature for 2 days, followed by heat drying at 50° C. for 3 days, thereby forming a smooth film on the surface of the OHP film.

The distribution of titanium atoms in a cross-section of the film formed on the surface of the OHP film was measured by means of an energy-dispersive X-ray spectrometer. The result of the measurement is shown in FIG. 3.

Figure 3:
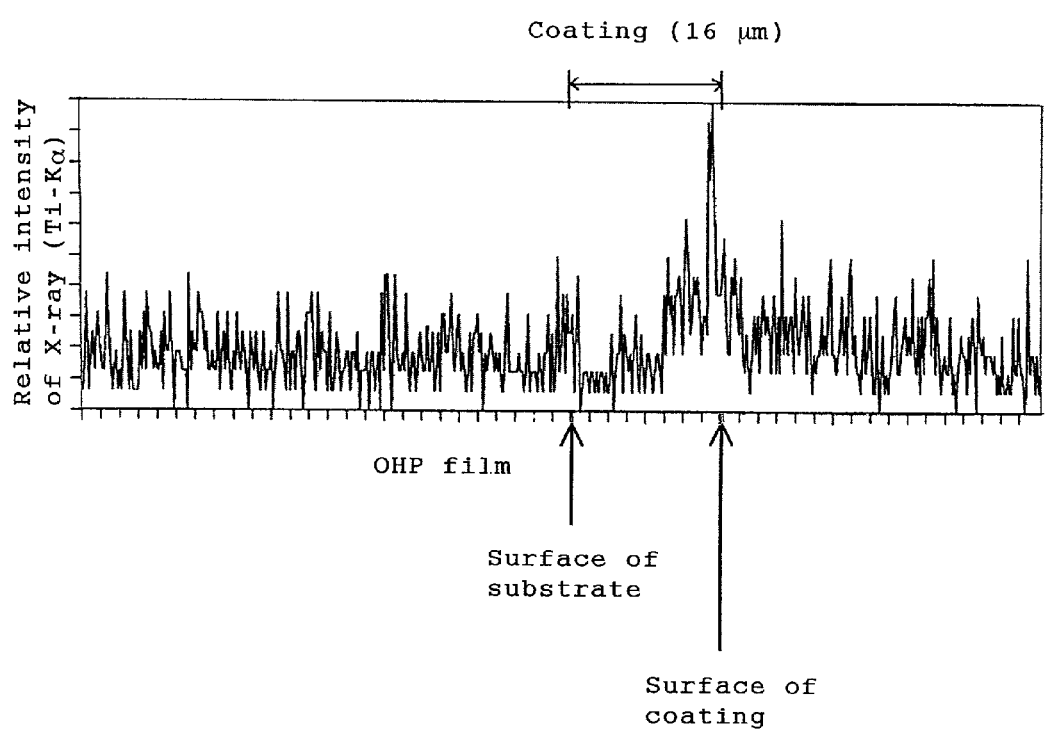
FIG. 3 is a graph showing the data obtained by measuring, by means of an energy-dispersive X-ray spectrometer, the distribution of the titanium atoms in a cross-section of a coating which has been formed on the surface of an OHP (overhead projector) film by using the modified photocatalyst composition produced in Example 18.

As can be seen from FIG. 3, in the film formed on the surface of the OHP film, $TiO_2$ particles were not present at the inside film surface (in contact with the OHP film as a substrate), and the film formed on the surface of the OHP film had a distribution of $TiO_2$ particles wherein the concentration of $TiO_2$ particles increases from the inside film surface (in contact with the OHP film) toward the outside film surface (opposite to the inside film surface in contact with the OHP film).

Further, the surface of the film formed on the surface of the OHP film was evaluated with respect to the photocatalyst activity. The evaluation was good (⊚).

EXAMPLE 19

19 g of the sol obtained in Example 18 was added to 100 g of the aqueous acrylic-silicon emulsion (containing a film-forming auxiliary) obtained in Comparative Example 2 over approximately 10 minutes at room temperature (23° C.) while stirring, thereby obtaining a modified photocatalyst composition.

Using the obtained modified photocatalyst composition, a smooth film was formed on the surface of an OHP film in substantially the same manner as in Example 18.

The distribution of titanium atoms in a cross-section of the film formed on the surface of the OHP film was measured by means of an energy-dispersive X-ray spectrometer. The result of the measurement showed that the film formed on the surface of the OHP film had a distribution of $TiO_2$ particles wherein the concentration of $TiO_2$ particles increases from the inside film surface (in contact with the OHP film) toward the outside film surface (opposite to the inside film surface in contact with the OHP film).

Further, the surface of the film formed on the surface of the OHP film was evaluated with respect to the photocatalyst activity. The evaluation was good (⊚).

COMPARATIVE EXAMPLE 8

Using Pla-ace (which is the same as used in Reference Example 12), a smooth film was formed on the surface of an OHP film in substantially the same manner as in Example 18.

However, no photocatalyst activity was observed at the surface of the formed film, i.e., the evaluation was "X".

COMPARATIVE EXAMPLE 9

KS-247 (trade name of an organosol of anatase-type titanium oxide; volume mean particle diameter of particles dispersed in the organosol: 6 nm which is a value described in the catalog, micell diameter: 30 to 60 nm which is a value described in the catalog, solids content: 15% by weight) (manufactured and sold by TAYCA CORP., Japan) was spray-coated on a glass plate in a thickness of 0.5 μm. The coated glass plate was dried at 50° C. for one week, thereby forming a film on the surface of the glass plate.

The contact angle of water against the surface of the film was 69.8° as measured at 20° C. The surface energy of the film was 48.0 dyn/cm at 20° C., as calculated from the empirical formula of Sell-Neumann.

8 g of the above-mentioned KS-247 was added to 100 g of Pla-ace (which is the same as used in Reference Example 12) over approximately 10 minutes at room temperature (23° C.) while stirring, thereby obtaining a composition. Using the obtained composition, a smooth film was formed on the surface of an OHP film in substantially the same manner as in Example 18.

The distribution of titanium atoms in a cross-section of the film formed on the surface of the OHP film was measured by means of an energy-dispersive X-ray spectrometer. The results of the measurement showed that the titanium atoms exhibited a random distribution and that the $TiO_2$ particles did not exhibit a distribution in which the concentration of the $TiO_2$ particles increases from the inside film surface toward the outside film surface (remote from the OHP film).

Further, the surface of the formed film was evaluated with respect to the photocatalyst activity. The evaluation was poor (i.e., "X" or "Δ").

COMPARATIVE EXAMPLE 10

30 g of ST-01 (which is the same as used in Comparative Example 4) and 120 g of toluene were charged into a reactor equipped with a reflux condenser, a thermometer and a stirrer, and the resultant mixture in the reactor was heated to 50° C. while stirring. However, in the liquid medium of the mixture, the particles were not dispersed but precipitated, so that no sol was formed.

Subsequently, 12.9 g of the solution of compound (7) obtained in Reference Example 10 was charged into the reactor over approximately 30 minutes at 50° C. while stirring, and the resultant mixture in the reactor was stirred at 50° C. for 3 hours to effect a reaction of ST-01 with compound (7) and modify the $TiO_2$ particles of ST-01 to thereby obtain a modified photocatalyst dispersion. During the reaction of ST-01 with compound (7), hydrogen gas was generated. The volume of the generated hydrogen gas was 70 ml as measured at 19° C. The obtained modified photocatalyst dispersion was an unstable dispersion wherein the dispersion state of the modified photocatalyst particles was unable to be maintained and the particles precipitated with the lapse of time.

The modified photocatalyst dispersion was placed under reduced pressure at 50° C. to remove the liquid medium from the modified photocatalyst dispersion, thereby obtaining a powder of a modified titanium oxide. The obtained powder of a modified titanium oxide was treated by a pelletizing machine for use in producing a sample for infrared absorption spectrometry, wherein the powder was compressed under a pressure of 750 kg/cm$^2$, thereby obtaining a pellet of a modified titanium oxide. The contact angle of water against the surface of the obtained pellet was 93.0° as measured at 20° C. The surface energy of the pellet was 28.4 dyn/cm at 20° C., as calculated from the empirical formula of Sell-Neumann.

1.2 g of the above-obtained powder of a modified titanium oxide was added to 100 g of Pla-ace (which is the same as used in Reference Example 12) at room temperature (23° C.) while stirring, thereby obtaining a composition.

Using the obtained composition, a film was formed on the surface of an OHP film in substantially the same manner as in Example 17.

The distribution of titanium atoms in a cross-section of the film formed on the surface of the OHP film was measured by means of an energy-dispersive X-ray spectrometer. The results of the measurement showed that the titanium atoms exhibited a random distribution and that a considerable amount of $TiO_2$ particles were in contact with the surface of the OHP film.

Further, the surface of the formed film was evaluated with respect to the photocatalyst activity. The evaluation was poor (i.e., "X" or "Δ").

REFERENCE EXAMPLE 14

Synthesis of Si—H Group-Containing Silicon Compound (9) Having a Cyclic Acid Anhydride Group 168 g of dioxane and 100 g of KF9901 (which is the same as used in Reference Example 1) were charged into a reactor equipped with a reflux condenser, a thermometer and a stirrer, and the resultant mixture in the reactor was heated to 80° C. while stirring.

50 g of Uniox MUS-8 (which is the same as used in Reference Example 1), 28 g of a 5-norbornene-2,3-dicarboxylic anhydrite, and 1.1 g of a 5% by weight isopropanol solution of hydrogen hexachloroplatinate(IV) hexahydrate were dissolved in 100 g of dioxane. The resultant solution was charged into the above-mentioned reactor over approximately one hour at 80° C. while stirring, and the resultant mixture in the reactor was stirred at 80° C. for 2 hours and, then, cooled to room temperature, thereby obtaining a solution of Si—H group-containing silicon compound (9) having a cyclic acid anhydride group (hereinafter referred to simply as "compound (9)").

8 g of butyl cellosolve was added to and mixed with 1.4 g of the solution of compound (9), and, then, 8 ml of a 1 N aqueous sodium hydroxide solution was added thereto, so that hydrogen gas was generated, and the volume of the generated hydrogen gas was 35.8 ml as measured at 21° C. The Si—H group content of compound (9), as calculated from the volume of the generated hydrogen gas, was 1.02 mmol per g of the solution of compound (9) (approximately 4.5 mmol per g of KF9901).

REFERENCE EXAMPLE 15

Synthesis of Si—H Group-Containing Silicon Compound (10) Having a Sensitizing Group 30 g of the solution of compound (9) obtained in Reference Example 14 was charged into a reactor equipped with a reflux condenser, a thermometer and a stirrer.

0.23 g of 2,4-dinitrophenylhydrazine was dissolved in 22.7 g of tetrahydrofuran. The resultant solution was charged into the above-mentioned reactor over approximately 30 minutes at 20° C. while stirring, and the resultant mixture in the reactor was stirred at 20° C. for 3 hours, thereby obtaining a solution of Si—H group-containing silicon compound (10) having a sensitizing group (hereinafter referred to simply as "compound (10)").

EXAMPLE 20

Preparation of a Modified Photocatalyst Sol by the Use of Si—H Group-Containing Compound (9) Having a Cyclic Acid Anhydride Group 200 g of STS-02 (which is the same as used in Example 5) and 100 g of water were charged into a reactor equipped with a reflux condenser, a thermometer and a stirrer, and the resultant mixture in the reactor was heated to 30° C. while stirring. Subsequently, 30 g of the solution of compound (9) obtained in Reference Example 14 was charged into the reactor over approximately 30 minutes at 30° C. while stirring, and the resultant mixture in the reactor was stirred at 30° C. for 3 hours to effect a reaction of STS-02 with compound (9) and modify the $TiO_2$ particles of STS-02 to thereby obtain a sol containing modified $TiO_2$ particles well dispersed therein, wherein the volume mean particle diameter of the modified $TiO_2$ particles was 29 nm. During the reaction of STS-02 with compound (9), hydrogen gas was generated. The volume of the generated hydrogen gas was 112 ml as measured at 20° C.

An IR spectrum was obtained in substantially the same manner as in Example 1. The obtained IR spectrum showed that the absorption ascribed to a Ti—OH group of $TiO_2$ particles in STS-02 disappeared, wherein the above-mentioned absorption had been observed in the IR spectrum of $TiO_2$ prior to the modification of the $TiO_2$ particles.

EXAMPLE 21

100 g of STS-02 (which is the same as used in Example 5) and 50 g of water were charged into a reactor equipped with a reflux condenser, a thermometer and a stirrer, and the resultant mixture in the reactor was heated to 30° C. while stirring. Subsequently, 26 g of the solution of compound (10) obtained in Reference Example 15 was charged into the reactor over approximately 30 minutes at 30° C. while stirring, and the resultant mixture in the reactor was stirred at 30° C. for 3 hours to effect a reaction of STS-02 with compound (10) and modify the $TiO_2$ particles of STS-02 to thereby obtain a sol containing orange, modified $TiO_2$ particles well dispersed therein, wherein the volume mean particle diameter of the modified $TiO_2$ particles was 36 nm. During the reaction of STS-02 with compound (10), hydrogen gas was generated. The volume of the generated hydrogen gas was 110 ml as measured at 20° C.

An IR spectrum was obtained in substantially the same manner as in Example 1. The obtained IR spectrum showed that the absorption ascribed to a Ti—OH group of $TiO_2$ particles in STS-02 disappeared, wherein the above-mentioned absorption had been observed in the IR spectrum of $TiO_2$ prior to the modification of the $TiO_2$ particles.

Using the obtained sol, a transparent (orange) and smooth film was formed on the surface of a glass plate in substantially the same manner as in Example 1. The surface of the film was evaluated by examining how the hydrophilicity or hydrophobicity of the film surface was changed by sunlight irradiation. The results are shown in Table 4.

EXAMPLE 22

100 g of the sol obtained in Example 20 was charged into a reactor equipped with a reflux condenser, a thermometer and a stirrer.

0.07 g of 2,4-dinitrophenylhydrazine was dissolved in 7 g of tetrahydrofuran. The resultant solution was charged into the above-mentioned reactor over approximately 30 minutes at 20° C. while stirring, and the resultant mixture in the reactor was stirred at 20° C. for 3 hours, thereby obtaining a sol containing orange, modified $TiO_2$ particles well dispersed therein, wherein the volume mean particle diameter of the modified $TiO_2$ particles was 33 nm.

Using the obtained sol, a transparent (orange) and smooth film was formed on the surface of a glass plate in substantially the same manner as in Example 1. The surface of the film was evaluated by examining how the hydrophilicity or hydrophobicity of the film surface was changed by sunlight irradiation. The results are shown in Table 4.

REFERENCE COMPARATIVE EXAMPLE 1

Using the sol obtained in Example 20, a transparent and smooth film was formed on the surface of a glass plate in substantially the same manner as in Example 1. The surface of the film was evaluated by examining how the hydrophilicity or hydrophobicity of the film surface was changed by sunlight irradiation. The results are shown in Table 4.

TABLE 4

How the hydrophilicity or hydrophobicity of the film surface was changed by sunlight irradiation

| Item | Example 21 | Example 22 | Reference Comparative Example 1 |
|---|---|---|---|
| Contact angle of water against film surface (prior to sunlight irradiation) | 76.7° | 77.0° | 80.7° |
| Contact angle of water against film surface (after 3 hours of sunlight irradiation) | 26.9° | 39.1° | 76.2° |

REFERENCE EXAMPLE 16

Synthesis of Si—H Group-Containing Silicon Compound (11) Having a Sensitizing Group 10 g of 4-aminofluorescein and 1,400 g of dioxane were charged into a reactor equipped with a reflux condenser, a thermometer and a stirrer.

2.4 g of allyl isocyanate was dissolved in 22.6 g of dioxane. The resultant solution was charged into the above-mentioned reactor over approximately 30 minutes at 30° C. while stirring, and the resultant mixture in the reactor was stirred at 30° C. for 5 hours. 500 g of KF9901 (which is the same as used in Reference Example 1) was charged into the reactor, and the resultant mixture in the reactor was heated to 80° C. while stirring.

1,370 g of Uniox MUS-8 (which is the same as used in Reference Example 1) and 5 g of a 5% by weight isopropanol solution of hydrogen hexachloroplatinate(IV) hexahydrate were dissolved in 1,370 g of dioxane. The resultant solution was charged into the above-mentioned reactor over approximately one hour at 80° C. while stirring, and the resultant mixture in the reactor was stirred at 80° C. for 2 hours and, then, cooled to room temperature, thereby obtaining a solution of Si—H group-containing silicon compound (11) having a sensitizing group (hereinafter referred to simply as "compound (11)").

When 100 g of water was added to 4 g of the above-obtained solution of compound (11), the resultant aqueous mixture was homogeneous and transparent and had fluorescence.

On the other hand, 8 g of butyl cellosolve was added to and mixed with 4 g of the solution of compound (11), and, then, 8 ml of a 1 N aqueous sodium hydroxide solution was added thereto, so that hydrogen gas was generated, and the volume of the generated hydrogen gas was 33 ml as measured at 23° C. The Si—H group content of compound (11), as calculated from the volume of the generated hydrogen gas, was 0.32 mmol per g of the solution of compound (11) (approximately 3.1 mmol per g of KF9901).

EXAMPLE 23

200 g of Tinoc A-6 (which is the same as used in Example 1) was charged into a reactor equipped with a reflux condenser, a thermometer and a stirrer. Subsequently, 12.5 g of the solution of compound (11) obtained in Reference Example 16 was charged into the reactor over approximately 30 minutes at 30° C. while stirring, and the resultant mixture in the reactor was stirred at 30° C. for 3 hours to effect a reaction of Tinoc A-6 with compound (11) and modify the $TiO_2$ particles of Tinoc A-6 to thereby obtain a sol containing fluorescent, modified $TiO_2$ particles well dispersed therein, wherein the volume mean particle diameter of the modified $TiO_2$ particles was 23 nm. During the reaction of Tinoc A-6 with compound (11), hydrogen gas was generated. The volume of the generated hydrogen gas was 120 ml as measured at 23° C.

An IR spectrum was obtained in substantially the same manner as in Example 1. The obtained IR spectrum showed that the absorption ascribed to a Ti—OH group of $TiO_2$ particles in Tinoc A-6 disappeared, wherein the above-mentioned absorption had been observed in the IR spectrum of $TiO_2$ prior to the modification of the $TiO_2$ particles.

Using the obtained sol, a transparent (yellow or green) and smooth film was formed on the surface of a glass plate in substantially the same manner as in Example 1. The surface of the film was evaluated by examining how the hydrophilicity or hydrophobicity of the film surface was changed by the irradiation of light containing almost no ultraviolet light. The results are shown in Table 5.

REFERENCE COMPARATIVE EXAMPLE 2

With respect to the film formed on the surface of a glass plate which film was obtained in Example 1, the surface of the film was evaluated by examining how the hydrophilicity or hydrophobicity of the film surface was changed by the irradiation of light containing almost no ultraviolet light. The results are shown in Table 5.

COMPARATIVE EXAMPLE 11

Tinoc A-6 (which is the same as used in Example 1) was spray-coated on a glass plate in a thickness of 0.5 μm. The coated glass plate was dried at room temperature for one week, thereby forming a transparent and smooth film on the surface of the glass plate. The surface of the film was evaluated by examining how the hydrophilicity or hydrophobicity of the film surface was changed by the irradiation of light containing almost no ultraviolet light. The results are shown in Table 5.

TABLE 5

How the hydrophilicity or hydrophobicity of the film surface was changed by the irradiation of light containing almost no ultraviolet light

| Item | Example 23 | Reference Comparative Example 2 | Comparative Example 11 |
|---|---|---|---|
| Contact angle of water against film surface (prior to light irradiation) | 25.7° | 37.0° | 15.7° |
| Contact angle of water against film surface (after 24 hours of light irradiation) | 102.9° | 38.3° | 16.2° |

INDUSTRIAL APPLICABILITY

When a film containing a modified photocatalyst is formed on the surface of a substrate by using the modified photocatalyst sol of the present invention or the modified photocatalyst composition of the present invention comprising the modified photocatalyst sol and a functional substance, not only can the modified photocatalyst be strongly immobilized on the surface of the substrate under moderate conditions without suffering a lowering of the activity of the modified photocatalyst, but also any of the film formed and the substrate covered with the film are not deteriorated by the action of the modified photocatalyst. Further, the above-mentioned film exhibits excellent properties with respect to transparency, durability, staining resistance, hardness and the like. Therefore, the above-mentioned modified photocatalyst sol and modified photocatalyst composition are extremely useful for, e.g., preventing dirt from adhering to the surfaces of various substrates, and preventing fogging from occurring on the surfaces of various substrates.

Further, each of the functional composite and the shaped article of the present invention enables the modified photocatalyst contained therein to exert a satisfactory effect at a surface of each of the functional composite and the shaped article, thereby effectively preventing dirt from adhering to the surface thereof and effectively preventing fogging from occurring on the surface thereof.

The invention claimed is:

1. A modified photocatalyst sol comprising a liquid medium having dispersed therein particles of a modified photocatalyst, said particles of a modified photocatalyst being prepared by subjecting particles of a photocatalyst to a modification treatment with at least one modifier compound comprising at least one structural unit selected from the group consisting of a monooxydiorganosilane unit represented by formula (1), a dioxyorganosilane unit represented by formula (2), and a difluoromethylene unit represented by formula (3):

wherein each of $R^1$ and $R^2$ independently represents a hydrogen atom, a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom,

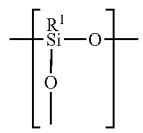

wherein $R^1$ is as defined for formula (1), and

—(CF$_2$)— (3), wherein said modifier compound contains at least one silicon atom having bonded thereto at least one hydrogen atom, wherein said modification treatment is conducted in the presence of a dehydrogenation-condensation catalyst which has dehydrogenation-condensation activity with respect to said hydrogen atom bonded to the silicon atom of the modifier compound, said modified photocatalyst particles having a volume mean particle diameter of 800 nm or less.

2. The modified photocatalyst sol according to claim 1, wherein said photocatalyst particles prior to said modification treatment have a volume mean particle diameter of 200 nm or less.

3. The modified photocatalyst sol according to claim 1, wherein said modified photocatalyst particles have a volume mean particle diameter of 200 nm or less to the exclusion of moieties of the particles which moieties are derived from the modifier compound.

4. The modified photocatalyst sol according to any one of claims 1 to 3, which, after allowed to stand at 30° C. for 100 days, maintains a volume mean particle diameter of said modified photocatalyst particles at 800 nm or less.

5. The modified photocatalyst sol according to any one of claims 1 to 3, wherein said modifier compound has a sensitizing group.

6. The modified photocatalyst sol according to any one of claims 1 to 3, wherein said modifier compound has at least one reactive group selected from the group consisting of an epoxy group, an acryloyl group, a methacryloyl group, an acid anhydride group, a keto group, a carboxyl group, a hydrazine group, an isocyanate group, an isothiocyanate group, a hydroxyl group, an amino group, a cyclic carbonate group and an ester group.

7. The modified photocatalyst sol according to claim 6, wherein said modifier compound has at least one reactive group selected from the group consisting of a hydrazine group and a keto group.

8. The modified photocatalyst sol according to any one of claims 1 to 3, wherein said modifier compound is self-emulsifiable or soluble in water.

9. The modified photocatalyst sol according to claim 1, wherein said dehydrogenation-condensation catalyst comprises at least one metal of the platinum group or a compound thereof.

10. The modified photocatalyst sol according to claim 1, wherein said modifier compound is a silicon compound having an average structural composition represented by the following formula (4):

wherein:
each R independently represents a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom, each Q independently represents a group having at least one function-imparting group selected from the group consisting of:
1) at least one hydrophobic group selected from the group consisting of a straight chain or branched $C_1$–$C_{30}$ alkyl group, a $C_5$–$C_{20}$ cycloalkyl group and a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom, and a $C_1$–$C_{30}$ fluoroalkyl group;
2) at least one hydrophilic group selected from the group consisting of a carboxyl group and a salt thereof, a phosphate group and a salt thereof, a sulfonic acid group and a salt thereof, and a polyoxyalkylene group;

3) at least one reactive group selected from the group consisting of an epoxy group, an acryloyl group, a methacryloyl group, an acid anhydride group, a keto group, a hydrazine group, an isocyanate group, an isothiocyanate group, a hydroxyl group, an amino group, a cyclic carbonate group and an ester group; and 4) at least one sensitizing group, each X independently represents a hydrolyzable group selected from the group consisting of a $C_1$–$C_{20}$ alkoxy group, a hydroxyl group, a hydroxyimino group, an enoxy group, an amino group, an amido group, a $C_1$–$C_{20}$ acyloxy group, an aminoxy group and a halogen atom, and p, q, r and s satisfy the following relationships:

$0<p<4$, $0<q<4$, $0 \leq r<4$, $0 \leq s<2$, and $(p+q+r+s)<4$.

11. The modified photocatalyst sol according to claim 10, wherein said silicon compound has an average structural composition represented by the following formula (5):

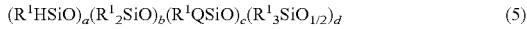
$(R^1HSiO)_a(R^1_2SiO)_b(R^1QSiO)_c(R^1_3SiO_{1/2})_d$ (5)

wherein:

$R^1$ is as defined for formula (1) and Q is as defined for formula (4), a represents an integer of 1 or more, each of b and c independently represents an integer of 0 or more, d is 0 or 2, wherein a, b and c satisfy the following relationship:

$(a+b+c) \leq 10,000$, and wherein when $(a+b+c) \geq 2$ and d is 0, the compound of formula (5) is a cyclic silicone compound, and when d is 2, the compound of formula (5) is a straight chain silicone compound.

12. A modified photocatalyst composition comprising the modified photocatalyst sol of any one of claims 1 to 3 and at least one functional substance selected from the group consisting of a monomer and a resin.

13. The modified photocatalyst composition according to claim 12, wherein said functional substance is a resin.

14. The modified photocatalyst composition according to claim 13, wherein said resin is at least one resin selected from the group consisting of a silicone resin and a fluoro resin.

15. The modified photocatalyst composition according to claim 13, wherein said modifier compound has at least one reactive group selected from the group consisting of an epoxy group, an acryloyl group, a methacryloyl group, an acid anhydride group, a keto group, a carboxyl group, a hydrazine group, an isocyanate group, an isothiocyanate group, a hydroxyl group, an amino group, a cyclic carbonate group and an ester group, and said resin is capable of reacting with said reactive group of said modified photocatalyst sol.

16. The modified photocatalyst composition according to claim 12, wherein said modifier compound has at least one reactive group selected from the group consisting of a hydrazine group and a keto group, and said functional substance is at least one compound selected from the group consisting of a polycarbonyl compound and a polyhydrazine compound.

17. The modified photocatalyst composition according to claim 12, wherein said functional substance is a coating resin composition.

18. The modified photocatalyst composition according to claim 12, wherein said functional substance is a compound having a surface energy larger than that of each modified photocatalyst particle.

19. The modified photocatalyst composition according to claim 12, wherein said functional substance is a coating composition comprising a resin having a surface energy larger than that of each modified photocatalyst particle.

20. A modified photocatalyst/resin composite composition which is produced by polymerizing at least one compound selected from the group consisting of a vinyl compound and a hydrolyzable silane compound in the presence of the modified photocatalyst sol of any one of claims 1 to 3.

21. A functional composite comprising a substrate and a film formed on said substrate, said film comprising the modified photocatalyst sol of any one of claims 1 to 3.

22. A shaped article produced by shaping the modified photocatalyst composition of claim 12.

23. A functional composite comprising a substrate and a film formed on said substrate, said film comprising the modified photocatalyst composition of claim 12.

24. A shaped article produced by shaping the modified photocatalyst composition of claim 18, which is anisotropic with respect to the distribution of the modified photocatalyst.

25. A functional composite comprising a substrate and a film formed on said substrate, said film comprising the modified photocatalyst composition of claim 18 and being anisotropic with respect to the distribution of the modified photocatalyst.

26. A shaped article produced by shaping the modified photocatalyst/resin composite composition of claim 20.

27. A functional composite comprising a substrate and a film formed on said substrate, said film comprising the modified photocatalyst/resin composite composition of claim 20.

28. A functional composite comprising a substrate and a film formed on said substrate, said film comprising the modified photocatalyst composition of claim 19 and being anisotropic with respect to the distribution of the modified photocatalyst.

29. The shaped article according to claim 22, which exhibits a photocatalyst activity and/or a hydrophilicity or a hydrophobicity when irradiated with light.

30. The shaped article according to claim 24, which exhibits a photocatalyst activity and/or a hydrophilicity or a hydrophobicity when irradiated with light.

31. The shaped article according to claim 26, which exhibits a photocatalyst activity and/or a hydrophilicity or a hydrophobicity when irradiated with light.

32. The shaped article according to claim 22, which has a photoelectric conversion function.

33. The shaped article according to claim 24, which has a photoelectric conversion function.

34. The shaped article according to claim 26, which has a photoelectric conversion function.

35. The functional composite according to claim 21, which exhibits a photocatalyst activity and/or a hydrophilicity or a hydrophobicity when irradiated with light.

36. The functional composite according to claim 23, which exhibits a photocatalyst activity and/or a hydrophilicity or a hydrophobicity when irradiated with light.

37. The functional composite according to claim 25, which exhibits a photocatalyst activity and/or a hydrophilicity or a hydrophobicity when irradiated with light.

38. The functional composite according to claim 27, which exhibits a photocatalyst activity and/or a hydrophilicity or a hydrophobicity when irradiated with light.

39. The functional composite according to claim 21, which has a photoelectric conversion function.

40. The functional composite according to claim 23, which has a photoelectric conversion function.

41. The functional composite according to claim 25, which has a photoelectric conversion function.

42. The functional composite according to claim 27, which has a photoelectric conversion function.

43. Modified photocatalyst particles having a volume mean particle diameter of 800 nm or less, which are obtained by removing the liquid medium from the modified photocatalyst sol of any one of claims 1 to 3.

44. The modified photocatalyst particles according to claim 43, wherein the modifier compound has at least one reactive group selected from the group consisting of an epoxy group, an acryloyl group, a methacryloyl group, an acid anhydride group, a keto group, a carboxyl group, a hydrazine group, an isocyanate group, an isothiocyanate group, a hydroxyl group, an amino group, a cyclic carbonate group and an ester group.

45. The modified photocatalyst particles according to claim 43, wherein the modifier compound has at least one reactive group selected from the group consisting of a hydrazine group and a keto group.

46. A modified photocatalyst composition comprising the modified photocatalyst particles of claim 43 and at least one functional substance selected from the group consisting of a monomer and a resin.

47. A modified photocatalyst composition comprising the modified photocatalyst particles of claim 44 and at least one functional substance selected from the group consisting of a monomer and a resin.

48. A modified photocatalyst composition comprising the modified photocatalyst particles of claim 45 and at least one functional substance selected from the group consisting of a monomer and a resin.

49. The modified photocatalyst composition according to claim 46, wherein said resin is at least one resin selected from the group consisting of a silicone resin and a fluoro resin.

50. The modified photocatalyst composition according to claim 47, wherein said resin is at least one resin selected from the group consisting of a silicone resin and a fluoro resin.

51. The modified photocatalyst composition according to claim 48, wherein said resin is at least one resin selected from the group consisting of a silicone resin and a fluoro resin.

52. The modified photocatalyst composition according to claim 46, wherein said resin is capable of reacting with a reactive group of said modified photocatalyst particles.

53. The modified photocatalyst composition according to claim 47, wherein said resin is capable of reacting with a reactive group of said modified photocatalyst particles.

54. The modified photocatalyst composition according to claim 48, wherein said resin is capable of reacting with a reactive group of said modified photocatalyst particles.

55. The modified photocatalyst composition according to claim 46, wherein said functional substance is at least one compound selected from the group consisting of a polycarbonyl compound and a polyhydrazine compound.

56. The modified photocatalyst composition according to claim 47, wherein said functional substance is at least one compound selected from the group consisting of a polycarbonyl compound and a polyhydrazine compound.

57. The modified photocatalyst composition according to claim 48, wherein said functional substance is at least one compound selected from the group consisting of a polycarbonyl compound and a polyhydrazine compound.

58. The modified photocatalyst composition according to claim 46, wherein said functional substance is a compound having a surface energy larger than that of each modified photocatalyst particle.

59. The modified photocatalyst composition according to claim 47, wherein said functional substance is a compound having a surface energy larger than that of each modified photocatalyst particle.

60. The modified photocatalyst composition according to claim 48, wherein said functional substance is a compound having a surface energy larger than that of each modified photocatalyst particle.

61. The modified photocatalyst composition according to claim 46, wherein said functional substance is a coating composition comprising a resin having a surface energy larger than that of each modified photocatalyst particle.

62. The modified photocatalyst composition according to claim 47, wherein said functional substance is a coating composition comprising a resin having a surface energy larger than that of each modified photocatalyst particle.

63. The modified photocatalyst composition according to claim 48, wherein said functional substance is a coating composition comprising a resin having a surface energy larger than that of each modified photocatalyst particle.

64. A shaped article produced by shaping the modified photocatalyst composition of claim 46.

65. A shaped article produced by shaping the modified photocatalyst composition of claim 47.

66. A shaped article produced by shaping the modified photocatalyst composition of claim 48.

67. A functional composite comprising a substrate and a film formed on said substrate, said film comprising the modified photocatalyst composition of claim 46.

68. A functional composite comprising a substrate and a film formed on said substrate, said film comprising the modified photocatalyst composition of claim 47.

69. A functional composite comprising a substrate and a film formed on said substrate, said film comprising the modified photocatalyst composition of claim 48.

70. A shaped article produced by shaping the modified photocatalyst composition of claim 58, which is anisotropic with respect to the distribution of the modified photocatalyst particles.

71. A shaped article produced by shaping the modified photocatalyst composition of claim 59, which is anisotropic with respect to the distribution of the modified photocatalyst particles.

72. A shaped article produced by shaping the modified photocatalyst composition of claim 60, which is anisotropic with respect to the distribution of the modified photocatalyst particles.

73. A functional composite comprising a substrate and a film formed on said substrate, said film comprising the modified photocatalyst composition of claim 58 and being anisotropic with respect to the distribution of the modified photocatalyst particles.

74. A functional composite comprising a substrate and a film formed on said substrate, said film comprising the modified photocatalyst composition of claim 59 and being anisotropic with respect to the distribution of the modified photocatalyst particles.

75. A functional composite comprising a substrate and a film formed on said substrate, said film comprising the modified photocatalyst composition of claim 60 and being anisotropic with respect to the distribution of the modified photocatalyst particles.

76. A functional composite comprising a substrate and a film formed on said substrate, said film comprising the modified photocatalyst composition of claim 61 and being anisotropic with respect to the distribution of the modified photocatalyst particles.

77. A functional composite comprising a substrate and a film formed on said substrate, said film comprising the modified photocatalyst composition of claim 62 and being anisotropic with respect to the distribution of the modified photocatalyst particles.

78. A functional composite comprising a substrate and a film formed on said substrate, said film comprising the modified photocatalyst composition of claim 63 and being anisotropic with respect to the distribution of the modified photocatalyst particles.

79. The shaped article according to claim 64, which exhibits a photocatalyst activity and/or a hydrophilicity or a hydrophobicity when irradiated with light.

80. The shaped article according to claim 65, which exhibits a photocatalyst activity and/or a hydrophilicity or a hydrophobicity when irradiated with light.

81. The shaped article according to claim 66, which exhibits a photocatalyst activity and/or a hydrophilicity or a hydrophobicity when irradiated with light.

82. The functional composite according to claim 67, which exhibits a photocatalyst activity and/or a hydrophilicity or a hydrophobicity when irradiated with light.

83. The functional composite according to claim 68, which exhibits a photocatalyst activity and/or a hydrophilicity or a hydrophobicity when irradiated with light.

84. The functional composite according to claim 69, which exhibits a photocatalyst activity and/or a hydrophilicity or a hydrophobicity when irradiated with light.

85. The shaped article according to claim 64, which has a photoelectric conversion function.

86. The shaped article according to claim 65, which has a photoelectric conversion function.

87. The shaped article according to claim 66, which has a photoelectric conversion function.

88. The functional composite according to claim 67, which has a photoelectric conversion function.

89. The functional composite according to claim 68, which has a photoelectric conversion function.

90. The functional composite according to claim 69, which has a photoelectric conversion function.

91. A modified photocatalyst composition comprising particles of a modified photocatalyst, and at least one functional compound selected from the group consisting of a monomer and a resin,
said particles of a modified photocatalyst being prepared by subjecting particles of a photocatalyst to a modification treatment with at least one modifier compound comprising at least one structural unit selected from the group consisting of a monooxydiorganosilane unit represented by formula (1), a dioxyorganosilane unit represented by formula (2), and a difluoromethylene unit represented by formula (3):

wherein each of $R^1$ and $R^2$ independently represents a hydrogen atom, a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom,

wherein $R^1$ is as defined for formula (1), and

wherein said at least one functional compound has a surface energy larger than that of each modified photocatalyst particle by 2 dyne/cm or more so that said modified photocatalyst composition in the form of a film or a shaped article exhibits anisotropy with respect to the distribution of the modified photocatalyst particles.

92. The modified photocatalyst composition according to claim 91, which further comprises a liquid medium having dispersed therein said modified photocatalyst particles, and wherein said modified photocatalyst particles have a volume mean particle diameter of 800 nm or less.

93. The modified photocatalyst composition according to claim 91 or 92, wherein said modifier compound has a sensitizing group.

94. The modified photocatalyst composition according to claim 91 or 92, wherein said modifier compound has at least one reactive group selected from the group consisting of an Si—H group, an alkoxysilyl group, a hydroxysilyl group, a halogenated silyl group, an acetoxysilyl group, an aminoxysilyl group, an acetoacetyl group, a thiol group, an acid anhydride group, an epoxy group, an acryloyl group, a methacryloyl group, a keto group, a carboxyl group, a hydrazine group, an isocyanate group, an isothiocyanate group, a hydroxyl group, an amino group, a cyclic carbonate group and an ester group.

95. The modified photocatalyst composition according to claim 91 or 92, wherein said modifier compound has at least one hydrophilic group selected from the group consisting of a carboxyl group and a salt thereof, a phosphate group and a salt thereof, a sulfonic acid group and a salt thereof, and a polyoxyalkylene group.

96. The modified photocatalyst composition according to claim 91 or 92, wherein said modifier compound contains at least one silicon atom having bonded thereto at least one hydrogen atom.

97. The modified photocatalyst composition according to claim 96, wherein said modification treatment is conducted in the presence of a dehydrogenation-condensation catalyst which has dehydrogenation-condensation activity with respect to said hydrogen atom bonded to the silicon atom of the modifier compound.

98. The modified photocatalyst composition according to claim 97, wherein said dehydrogenation-condensation catalyst comprises at least one metal of the platinum group or a compound thereof.

99. The modified photocatalyst composition according to claim 97, wherein said modifier compound is a silicon compound having an average structural composition represented by the following formula (4):

wherein:
each R independently represents a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom, each Q independently represents a group having at least one function-imparting group selected from the group consisting of:

1) at least one hydrophobic group selected from the group consisting of a straight chain or branched $C_1$–$C_{30}$ alkyl group, a $C_5$–$C_{20}$ cycloalkyl group and a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom, and a $C_1$–$C_{30}$ fluoroalkyl group;

2) at least one hydrophilic group selected from the group consisting of a carboxyl group and a salt thereof, a phosphate group and a salt thereof, a sulfonic acid group and a salt thereof, and a polyoxyalkylene group;

3) at least one reactive group selected from the group consisting of an epoxy group, an acryloyl group, a methacryloyl group, an acid anhydride group, a keto group, a hydrazine group, an isocyanate group, an isothiocyanate group, a hydroxyl group, an amino group, a cyclic carbonate group and an ester group; and 4) at least one sensitizing group, each X independently represents a hydrolyzable group selected from the group consisting of a $C_1$–$C_{20}$ alkoxy group, a hydroxyl group, a hydroxyimino group, an enoxy group, an amino group, an amido group, a $C_1$–$C_{20}$ acyloxy group, an aminoxy group and a halogen atom, and p, q, r and s satisfy the following relationships:

$0<p<4$, $0<q<4$, $0 \leq r<4$, $0 \leq s<2$, and $(p+q+r+s)<4$.

100. The modified photocatalyst composition according to claim 99, wherein said silicon compound is represented by the following formula (5):

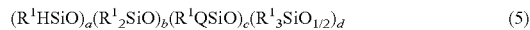

wherein:
$R^1$ is as defined for formula (1) and Q is as defined for formula (4), a represents an integer of 1 or more,
each of b and c independently represents an integer of 0 or more,
d is 0 or 2,
wherein a, b and c satisfy the following relationship:

$(a+b+c) \leq 10{,}000$, and wherein when $(a+b+c) \geq 2$ and d is 0, the compound of formula (5) is a cyclic silicone compound, and when d is 2, the compound of formula (5) is a straight chain silicone compound.

101. The modified photocatalyst composition according to claim 91 or 92, wherein said modifier compound has a $C_1$–$C_{30}$ fluoroalkyl group.

102. The modified photocatalyst composition according to claim 101, wherein said modifier compound is a fluoroalkyl compound represented by the following formula (11):

wherein:
g represents an integer of from 0 to 29;
Y represents an organic group having a valence of w and a molecular weight of from 14 to 50,000;
w represents an integer of from 1 to 20;
each V independently represents a functional group selected from the group consisting of an epoxy group, a hydroxyl group, an acetoacetyl group, a thiol group, an acid anhydride group, a carboxyl group, a sulfonic acid group, a polyoxyalkylene group and a group represented by the following formula:

wherein:
each W independently represents a functional group selected from the group consisting of a $C_1$–$C_{20}$ alkoxy group, a hydroxyl group, a $C_1$–$C_{20}$ acyloxy group, a halogen atom, a hydrogen atom, a $C_1$–$C_{20}$ oxime group, an enoxy group, an aminoxy group and an amido group;

each R independently represents a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom; and x represents an integer of from 1 to 3 and y represents an integer of from 0 to 2, wherein $x+y=3$.

103. The modified photocatalyst composition according to claim 91 or 92, wherein said modifier compound is a fluoroalkylene compound having a number average molecular weight of from 100 to 1,000,000.

104. The modified photocatalyst composition according to claim 102, wherein said modifier compound is a fluoroolefin polymer represented by the following formula (12):

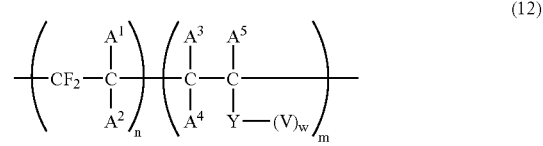

wherein:
each $A^1$ to $A^5$ independently represents an atom or group selected from the group consisting of a fluorine atom, a hydrogen atom, a chlorine atom, a $C_1$–$C_6$ alkyl group and a halogenated $C_1$–$C_6$ alkyl group;

m represents an integer of from 10 to 1,000,000;

n represents an integer of from 0 to 1,000,000;

Y represents an organic group having a valency of w and a molecular weight of from 14 to 50,000;

w represents an integer of from 1 to 20; and

V is as defined for formula (11) above.

105. The modified photocatalyst composition according to claim 91 or 92, wherein said functional substance is a coating resin composition.

106. A shaped article produced by shaping the modified photocatalyst composition of claim 91 or 92, which is anisotropic with respect to the distribution of the modified photocatalyst particles.

107. A functional composite comprising a substrate and a film formed on said substrate, said film comprising the modified photocatalyst composition of claim 91 or 92 and being anisotropic with respect to the distribution of the modified photocatalyst particles.

108. The shaped article according to claim 106, which exhibits a photocatalyst activity and/or a hydrophilicity or a hydrophobicity when irradiated with light.

109. The functional composite according to claim 107, which exhibits a photocatalyst activity and/or a hydrophilicity or a hydrophobicity when irradiated with light.

110. The shaped article according to claim 106, which has a photoelectric conversion function.

111. The functional composite according to claim 107, which has a photoelectric conversion function.

112. Modified photocatalyst particles prepared by subjecting particles of a photocatalyst to a modification treatment with at least one modifier compound selected from the group consisting of different compounds each of which independently comprises at least one structural unit selected from the group consisting of a monooxydiorganosilane unit represented by formula (1), a dioxyorganosilane unit represented by formula (2), and a difluoromethylene unit represented by formula (3):

(1)

wherein each of $R^1$ and $R^2$ independently represents a hydrogen atom, a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom,

(2)

wherein $R^1$ is as defined for formula (1), and

(3), said modifier compound having a sensitizing group.

113. The modified photocatalyst particles according to claim 112, wherein said sensitizing group has characteristics that an absorption is exhibited in the wavelength range of 400 nm or more and that the energy level of the lowest unoccupied molecular orbital is higher than the energy level of the conduction band of said photocatalyst.

114. The modified photocatalyst particles according to claim 112, which have a volume mean particle diameter of 800 nm or less.

115. The modified photocatalyst particles according to any one of claims 112 to 114, wherein said modifier compound has at least one reactive group selected from the group consisting of an epoxy group, an acryloyl group, a methacryloyl group, an acid anhydride group, a keto group, a carboxyl group, a hydrazine group, an isocyanate group, an isothiocyanate group, a hydroxyl group, an amino group, a cyclic carbonate group and an ester group.

116. The modified photocatalyst particles according to any one of claims 112 to 114, wherein said modifier compound has at least one hydrophilic group selected from the group consisting of a carboxyl group and a salt thereof, a phosphate group and a salt thereof, a sulfonic acid group and a salt thereof, and a polyoxyalkylene group.

117. The modified photocatalyst composition according to any one of claims 112 to 114, wherein said modifier compound contains at least one silicon atom having bonded thereto at least one hydrogen atom.

118. A modified photocatalyst sol comprising a liquid medium having dispersed therein the modified photocatalyst particles of any one of claims 112 to 114.

119. A modified photocatalyst composition comprising the modified photocatalyst particles of any one of claims 112 to 114 and at least one functional substance selected from the group consisting of a monomer and a resin.

120. The modified photocatalyst composition according to claim 119, wherein said resin is at least one resin selected from the group consisting of a silicone resin and a fluoro resin.

121. The modified photocatalyst composition according to claim 119, wherein said resin is capable of reacting with a reactive group of said modified photocatalyst particles.

122. The modified photocatalyst composition according to claim 119, wherein said functional substance is a coating resin composition.

123. A modified photocatalyst/resin composite composition which is produced by polymerizing at least one compound selected from the group consisting of a vinyl compound and a hydrolyzable silane compound in the presence of the modified photocatalyst particles of any one of claims 112 to 114.

124. A functional composite comprising a substrate and a film formed on said substrate, said film comprising the modified photocatalyst particles of any one of claims 112 to 114.

125. A shaped article produced by shaping the modified photocatalyst composition of claim 119.

126. A functional composite comprising a substrate and a film formed on said substrate, said film comprising the modified photocatalyst composition of claim 119.

127. The shaped article according to claim 125, which exhibits a photocatalyst activity and/or a hydrophilicity or a hydrophobicity when irradiated with light.

128. The functional composite according to claim 124, which exhibits a photocatalyst activity and/or a hydrophilicity or a hydrophobicity when irradiated with light.

129. The shaped article according to claim 125, which has a photoelectric conversion function.

130. The functional composite according to claim 124, which has a photoelectric conversion function.

131. Modified photocatalyst particles prepared by subjecting particles of a photocatalyst to a modification treatment, in the absence of a dehydrogenation-condensation catalyst, with at least one modifier compound comprising at least one structural unit selected from the group consisting of a monooxydiorganosilane unit represented by formula (1), a dioxyorganosilane unit represented by formula (2), and a difluoromethylene unit represented by formula (3):

$$—(R^1R^2SiO)—\qquad(1)$$

wherein each of $R^1$ and $R^2$ independently represents a hydrogen atom, a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom,

 (2)

wherein $R^1$ is as defined for formula (1), and $$—(CF_2)—\qquad(3),$$

said modifier compound having at least one group selected from the group consisting of:
at least one reactive group selected from the group consisting of an acid anhydride group, a keto group, a hydrazine group, and a cyclic carbonate group, and at least one hydrophilic group selected from the group consisting of a carboxyl group and a salt thereof, a phosphate group and a salt thereof, a sulfonic acid group and a salt thereof, and a polyoxyalkylene group.

132. The modified photocatalyst particles according to claim 131, which have a volume mean particle diameter of 800 nm or less.

133. The modified photocatalyst particles according to claims 131 or 132, wherein said modifier compound is self-emulsifiable or soluble in water.

134. The modified photocatalyst particles according to claim 131 or 132, wherein said modifier compound contains at least one silicon atom having bonded thereto at least one hydrogen atom.

135. A modified photocatalyst sol comprising a liquid medium having dispersed therein the modified photocatalyst particles of claim 131 or 132.

136. A modified photocatalyst composition comprising the modified photocatalyst particles of claim 131 or 132 and at least one functional substance selected from the group consisting of a monomer and a resin.

137. The modified photocatalyst composition according to claim 136, wherein said resin is at least one resin selected from the group consisting of a silicone resin and a fluoro resin.

138. The modified photocatalyst composition according to claim 136, wherein said functional substance is a coating resin composition.

139. A modified photocatalyst/resin composite composition which is produced by polymerizing at least one compound selected from the group consisting of a vinyl compound and a hydrolyzable silane compound in the presence of the modified photocatalyst particles of claim 131 or 132.

140. A functional composite comprising a substrate and a film formed on said substrate, said film comprising the modified photocatalyst particles of claim 131 or 132.

141. A shaped article produced by shaping the modified photocatalyst composition of claim 136.

142. A shaped article produced by shaping the modified photocatalyst/resin composite composition of claim 139.

143. A functional composite comprising a substrate and a film formed on said substrate, said film comprising the modified photocatalyst composition of claim 136.

144. A functional composite comprising a substrate and a film formed on said substrate, said film comprising the modified photocatalyst/resin composite of claim 139.

145. The shaped article according to claim 141, which exhibits a photocatalyst activity and/or a hydrophilicity or a hydrophobicity when irradiated with light.

146. The shaped article according to claim 142, which exhibits a photocatalyst activity and/or a hydrophilicity or a hydrophobicity when irradiated with light.

147. The functional composite according to claim 140, which exhibits a photocatalyst activity and/or a hydrophilicity or a hydrophobicity when irradiated with light.

148. The functional composite according to claim 143, which exhibits a photocatalyst activity and/or a hydrophilicity or a hydrophobicity when irradiated with light.

149. The functional composite according to claim 144, which exhibits a photocatalyst activity and/or a hydrophilicity or a hydrophobicity when irradiated with light.

150. The shaped article according to claim 141, which has a photoelectric conversion function.

151. The shaped article according to claim 142, which has a photoelectric conversion function.

152. The functional composite according to claim 140, which has a photoelectric conversion function.

153. The functional composite according to claim 143, which has a photoelectric conversion function.

154. The functional composite according to claim 144, which has a photoelectric conversion function.

155. A modified photocatalyst sol comprising a liquid medium having dispersed therein particles of a modified photocatalyst,
said particles of a modified photocatalyst being prepared by subjecting particles of a photocatalyst to a modification treatment with a modifier compound which is a silicon compound is represented by the following formula (5):

$$(R^1HSiO)_a(R^1{}_2SiO)_b(R^1QSiO)_c(R^1{}_3SiO_{1/2})_d \qquad(5)$$

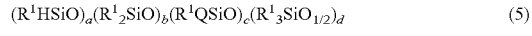

wherein:
each $R^1$ independently represents a hydrogen atom, a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group and a halogen atom, Q represents a group having at least one function-imparting group selected from the group consisting of:
1) at least one hydrophobic group selected from the group consisting of a straight chain or branched $C_1$–$C_{30}$ alkyl group, a $C_5$–$C_{20}$ cycloalkyl group and a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom, and a $C_1$–$C_{30}$ fluoroalkyl group;
2) at least one hydrophilic group selected from the group consisting of a carboxyl group and a salt thereof, a phosphate group and a salt thereof, a sulfonic acid group and a salt thereof, and a polyoxyalkylene group;

3) at least one reactive group selected from the group consisting of an epoxy group, an acryloyl group, a methacryloyl group, an acid anhydride group, a keto group, a hydrazine group, an isocyanate group, an isothiocyanate group, a hydroxyl group, an amino group, a cyclic carbonate group and an ester group; and 4) at least one sensitizing group, a represents an integer of 1 or more, each of b and c independently represents an integer of 0 or more, d is 0 or 2, wherein a, b and c satisfy the following relationship:

$(a+b+c) \leq 10{,}000$, and wherein when $(a+b+c) \geq 2$ and d is 0, the compound of formula (5) is a cyclic silicone compound, and when $(a+b+c) \geq 1$ and d is 2, the compound of formula (5) is a straight chain silicone compound, said modified photocatalyst particles having a volume mean particle diameter of 800 nm or less.

156. Modified photocatalyst particles which are prepared by subjecting particles of a photocatalyst to a modification treatment with a modifier compound which is a silicon compound is represented by the following formula (5):

  (5)

wherein:

each $R^1$ independently represents a hydrogen atom, a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group and a halogen atom, Q represents a group having at least one function-imparting group selected from the group consisting of:

1) at least one hydrophobic group selected from the group consisting of a straight chain or branched $C_1$–$C_{30}$ alkyl group, a $C_5$–$C_{20}$ cycloalkyl group and a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom, and a $C_1$–$C_{30}$ fluoroalkyl group;

2) at least one hydrophilic group selected from the group consisting of a carboxyl group and a salt thereof, a phosphate group and a salt thereof, a sulfonic acid group and a salt thereof, and a polyoxyalkylene group;

3) at least one reactive group selected from the group consisting of an epoxy group, an acryloyl group, a methacryloyl group, an acid anhydride group, a keto group, a hydrazine group, an isocyanate group, an isothiocyanate group, a hydroxyl group, an amino group, a cyclic carbonate group and an ester group; and 4) at least one sensitizing group, a represents an integer of 1 or more, each of b and c independently represents an integer of 0 or more, d is 0 or 2, wherein a, b and c satisfy the following relationship:

$(a+b+c) \leq 10{,}000$, and wherein when $(a+b+c) \geq 2$ and d is 0, the compound of formula (5) is a cyclic silicone compound, and when $(a+b+c) \geq 1$ and d is 2, the compound of formula (5) is a straight chain silicone compound, said modified photocatalyst particles having a volume mean particle diameter of 800 nm or less.

157. Modified photocatalyst particles which are prepared by subjecting particles of a photocatalyst to a modification treatment with at least one modifier compound comprising at least one structural unit selected from the group consisting of a monooxydiorganosilane unit represented by formula (1), a dioxyorganosilane unit represented by formula (2), and a difluoromethylene unit represented by formula (3):

  (1)

wherein each of $R^1$ and $R^2$ independently represents a hydrogen atom, a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom,

  (2)

wherein $R^1$ is as defined for formula (1), and

  (3), wherein said modifier compound contains at least one silicon atom having bonded thereto at least one hydrogen atom, wherein said modification treatment is conducted in the presence of a dehydrogenation-condensation catalyst which has dehydrogenation-condensation activity with respect to said hydrogen atom bonded to the silicon atom of the modifier compound, said modified photocatalyst particles having a volume mean particle diameter of 800 nm or less.

158. Modified photocatalyst particles which are prepared by subjecting particles of a photocatalyst to a modification treatment with at least one modifier compound comprising at least one structural unit selected from the group consisting of a monooxydiorganosilane unit represented by formula (1), a dioxyorganosilane unit represented by formula (2), and a difluoromethylene unit represented by formula (3):

  (1)

wherein each of $R^1$ and $R^2$ independently represents a hydrogen atom, a straight chain or branched $C_1$–$C_{30}$ alkyl group, a $C_5$–$C_{20}$ cycloalkyl group or a $C_6$–$C_{20}$ aryl group which is unsubstituted or substituted with at least one substituent selected from the group consisting of a $C_1$–$C_{20}$ alkyl group, a $C_1$–$C_{20}$ alkoxy group and a halogen atom,

  (2)

wherein $R^1$ is as defined for formula (1), and

  (3), said at least one modifier compound having a sensitizing group, said modified photocatalyst particles having a volume mean particle diameter of 800 nm or less.

159. A modified photocatalyst composition comprising:

a modified photocatalyst sol comprising a liquid medium having dispersed therein particles of a modified photocatalyst, said particles of a modified photocatalyst being prepared by subjecting particles of a photocatalyst to a modification treatment with at least one modifier compound comprising at least one structural unit selected from the group consisting of a monooxydiorganosilane unit represented by formula (1), a dioxyorganosilane unit represented by formula (2), and a difluoromethylene unit represented by formula (3):

—(R$^1$R$^2$SiO)—           (1)

wherein each of R$^1$ and R$^2$ independently represents a hydrogen atom, a straight chain or branched C$_1$–C$_{30}$ alkyl group, a C$_5$–C$_{20}$ cycloalkyl group or a C$_6$–C$_{20}$ aryl group which is unsubstituted or substituted with at least one substituent selected from the group consisting of a C$_1$–C$_{20}$ alkyl group, a C$_1$–C$_{20}$ alkoxy group and a halogen atom,

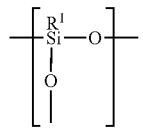
(2)

wherein R$^1$ is as defined for formula (1), and

—(CF$_2$)—           (3), said modified photocatalyst particles having a volume mean particle diameter of 800 nm or less; and at least one functional substance selected from the group consisting of a monomer and a resin.

160. A modified photocatalyst composition comprising:

particles of a modified photocatalyst which is prepared by subjecting particles of a photocatalyst to a modification treatment with at least one modifier compound comprising at least one structural unit selected from the group consisting of a monooxydiorganosilane unit represented by formula (1), a dioxyorganosilane unit represented by formula (2), and a difluoromethylene unit represented by formula (3):

—(R$^1$R$^2$SiO)—           (1)

wherein each of R$^1$ and R$^2$ independently represents a hydrogen atom, a straight chain or branched C$_1$–C$_{30}$ alkyl group, a C$_5$–C$_{20}$ cycloalkyl group or a C$_6$–C$_{20}$ aryl group which is unsubstituted or substituted with at least one substituent selected from the group consisting of a C$_1$–C$_{20}$ alkyl group, a C$_1$–C$_{20}$ alkoxy group and a halogen atom,

(2)

wherein R$^1$ is as defined for formula (1), and

—(CF$_2$)—           (3), said modified photocatalyst particles having a volume mean particle diameter of 800 nm or less; and at least one substance selected from the group consisting of a monomer and a resin.

* * * * *